United States Patent
Takahashi et al.

(10) Patent No.: US 9,228,710 B2
(45) Date of Patent: Jan. 5, 2016

(54) LIGHT PROJECTION APPARATUS, LIGHT CONDENSING UNIT, AND LIGHT EMITTING APPARATUS

(75) Inventors: Koji Takahashi, Osaka (JP); Yoshiyuki Takahira, Osaka (JP)

(73) Assignee: SHARP KABUSHIKI KAISHA, Osaka-Shi (JP)

(*) Notice: Subject to any disclaimer, the term of this patent is extended or adjusted under 35 U.S.C. 154(b) by 760 days.

(21) Appl. No.: 13/466,716

(22) Filed: May 8, 2012

(65) Prior Publication Data

US 2012/0314442 A1    Dec. 13, 2012

(30) Foreign Application Priority Data

Jun. 13, 2011  (JP) ................... 2011-130907
Jun. 24, 2011  (JP) ................... 2011-140327
Jan. 25, 2012  (JP) ................... 2012-013318

(51) Int. Cl.
  *B60Q 1/00*  (2006.01)
  *F21S 8/10*  (2006.01)

(52) U.S. Cl.
  CPC ......... *F21S 48/1145* (2013.01); *F21S 48/1241* (2013.01)

(58) Field of Classification Search
  CPC ................... F21S 48/1145; F21S 48/1241
  USPC ............ 362/538, 259, 327, 84, 230, 235
  See application file for complete search history.

(56) References Cited

U.S. PATENT DOCUMENTS

| | | |
|---|---|---|
| 2003/0223686 A1 | 12/2003 | Ota et al. |
| 2004/0041984 A1 | 3/2004 | Tani et al. |
| 2005/0105301 A1* | 5/2005 | Takeda et al. ............. 362/545 |
| 2011/0044070 A1 | 2/2011 | Takahashi |
| 2011/0216550 A1 | 9/2011 | Koike et al. |
| 2012/0039072 A1 | 2/2012 | Lell et al. |

FOREIGN PATENT DOCUMENTS

| | | |
|---|---|---|
| JP | 9-185336 | 7/1997 |
| JP | 2000-141073 | 5/2000 |
| JP | 2000-147331 | 5/2000 |
| JP | 2003-295319 | 10/2003 |
| JP | 2004-93623 | 3/2004 |
| JP | 2004-241142 | 8/2004 |
| JP | 2004-287181 | 10/2004 |
| JP | 2005-85549 | 3/2005 |

(Continued)

OTHER PUBLICATIONS

Takahashi, K. et al. "'Laser headlight' for Next Generation Automotive Lighting." Thesis Presented at 9th International Symposium on Automotive Lighting. Darmstadt. Sep. 26-28, 2011; 371-389 (with cover page).

*Primary Examiner* — Elmito Breval
*Assistant Examiner* — Jessica M Apenteng
(74) *Attorney, Agent, or Firm* — Morrison & Foerster LLP

(57) ABSTRACT

A light projection apparatus that can produce an elongate light projection pattern is provided. The light projection apparatus includes a fluorescent member which is excited with exciting light and a light projecting member which reflects or transmits the light emanating from the fluorescent member to project it outside. The fluorescent member includes an irradiated region which is irradiated with the exciting light, and the length of the irradiated region in a first direction is greater than its length in a second direction.

5 Claims, 50 Drawing Sheets

(56) References Cited

FOREIGN PATENT DOCUMENTS

| | | |
|---|---|---|
| JP | 2005-148538 | 6/2005 |
| JP | 2005-150041 | 6/2005 |
| JP | 2007-41623 | 2/2007 |
| JP | 2007-294754 | 11/2007 |
| JP | 2008-2836 | 1/2008 |
| JP | 2009-266437 | 11/2009 |
| JP | 2010-232044 | 10/2010 |
| JP | 2010-267546 | 11/2010 |
| JP | 2011-65979 | 3/2011 |
| JP | 2011-119086 | 6/2011 |
| JP | 2011-181381 | 9/2011 |
| JP | 2012-512508 | 5/2012 |
| WO | WO-2010/069282 | 6/2010 |

* cited by examiner

FIG.86

| MATERIAL | H1021a | W1021a | H1021b | W1021b | L1021 | θ1021c, θ1021d | θ1021e |
|---|---|---|---|---|---|---|---|
| BK7 | 3mm | 10mm | 2mm | 2mm | 50mm | 88.9° | 80.9° |
| ARTIFICIAL QUARTZ | 6mm | 24mm | 3mm | 3mm | 120mm | 88.6° | 80.1° |

LIGHT PROJECTION APPARATUS, LIGHT CONDENSING UNIT, AND LIGHT EMITTING APPARATUS

This nonprovisional application claims priority under 35 U.S.C. §119(a) on Patent Application No. 2011-130907 filed in Japan on Jun. 13, 2011, Patent Application No. 2011-140327 filed in Japan on Jun. 24, 2011, and Patent Application No. 2012-013318 filed in Japan on Jan. 25, 2012, the entire contents of all of which are hereby incorporated by reference.

BACKGROUND OF THE INVENTION

1. Field of the Invention

The present invention relates to a light projection apparatus, a light condensing unit, and a light emitting apparatus.

2. Description of Related Art

There are conventionally known light projection apparatus that are provided with a fluorescent member that is irradiated with laser light (see, for example, JP-A-2003-295319).

JP-A-2003-295319 mentioned above discloses a light source apparatus (light projection apparatus) provided with an ultraviolet LD element which functions as a laser light source, a phosphor (fluorescent or phosphorescent substance; fluorescent member) which converts the laser light emanating from the ultraviolet LD element into visible light, and a visible-light reflecting mirror which reflects the visible light emanating from the phosphor. In this light source apparatus, the visible-light reflecting mirror which reflects the visible light emanating from the phosphor is provided to illuminate a predetermined region ahead of the light source apparatus.

When the light source apparatus disclosed in JP-A-2003-295319 mentioned above is used, for example, as a headlamp of an automobile, the projection pattern of the light emitted from the light source apparatus needs to be controlled. Specifically, the light source apparatus needs to be designed to produce a laterally elongate light projection pattern. Although JP-A-2003-295319 mentioned above does not discuss any light projection pattern, the light projection pattern obtained is supposed to be circular. Inconveniently, this makes it difficult to use the light source apparatus disclosed in JP-A-2003-295319 mentioned above as, for example, a headlamp of an automobile, where a laterally elongate light projection pattern is required.

On the other hand, there are conventionally known light condensing members that guide laser light while condensing it (see, for example, JP-A-2007-41623). JP-A-2007-41623 discloses (paragraphs [0066]-[0069], and [0079]; FIGS. 8 to 10, and 16) an optical waveguide (light condensing member) that includes an entrance face through which laser light enters and an exit face which has a smaller area than the entrance face. In this optical waveguide, the laser light that has entered through the entrance face is guided to the exit face while being reflected on the side faces that connect between the entrance face and the exit face; the light eventually exits through the exit face in a condensed state.

Although JP-A-2007-41623 mentioned above does not discuss it, using an optical waveguide requires the use of a member that holds the optical waveguide. That is, the holding member inevitably makes contact with the surface of the optical waveguide. For example, in a case where the holding member makes contact with a side face of the optical waveguide, part of the laser light traveling inside the optical waveguide exits into, and is absorbed by, the holding member at where the optical waveguide and the holding member make contact with each other, because there the total reflection condition is not fulfilled. Inconveniently, this lowers the efficiency of use of light (laser light).

As an improvement, JP-A-2007-41623 mentioned above also discloses a structure in which an Ag layer for reflecting laser light is provided on the side faces of the optical waveguide. Since the reflectance of Ag is about 95%, however, the laser light is absorbed by the Ag layer each time it is reflected on it. This lowers the efficiency of use of light (laser light).

SUMMARY OF THE INVENTION

The present invention has been devised to overcome the inconveniences mentioned above, and an object of the invention is to provide a light projection apparatus, a light projection unit, and a light condensing member that can produce an elongate light projection pattern.

Another object of the invention is to provide a light condensing unit and a light emitting apparatus that can suppress lowering in the efficiency of use of light.

To achieve the above objects, according to one aspect of the invention, a light projection apparatus is provided with: a fluorescent member which is excited with exciting light; and a light projecting member which reflects or transmits light emanating from the fluorescent member to project the light outside. Here, the fluorescent member includes an irradiated region which is irradiated with the exciting light, and the length of the irradiated region in a first direction is greater than the length of the irradiated region in a second direction perpendicular to the first direction.

In this light projection apparatus, as mentioned above, the length of the irradiated region in the first direction is greater than its length in the second direction. Thus, the fluorescent member is excited in an area elongate in the first direction. As a result, projecting the light emanating from the fluorescent member outside through the light projecting member produces a light projection pattern having an elongate shape that is elongate in the first direction.

In the present specification, an elongate shape denotes a shape of which the length in a predetermined direction is greater than its length in the direction perpendicular to the predetermined direction; such shapes include, for example, elliptical, rectangular, and oval shapes, and may be asymmetric in the up-down or left-right direction.

In the above-described light projection apparatus, preferably, there is further provided a light condensing member which includes a light entrance face through which the exciting light enters and a light exit face that has a smaller area than the light entrance face and through which the exciting light exits. Here, the length of the light exit face in the first direction is greater than the length of the light exit face in the second direction. Making the length of the light exit face in the first direction greater than its length in the second direction in this way makes it easy to make the length of the irradiated region of the fluorescent member in the first direction greater than its length in the second direction. Moreover, forming the light exit face of the light condensing member with a smaller area than the light entrance face permits the exciting light that has entered through the light entrance face to exit through the light exit face in a condensed state.

In the above-described light projection apparatus, preferably, the irradiated region has a rectangular, elliptical, or elongate hexagonal shape.

In the above-described light projection apparatus, preferably, the irradiated region has a shape asymmetric in the first direction. With this design, it is easy to give the light projection pattern a shape asymmetric in the first direction.

In the above-described light projection apparatus, preferably, the focus of the light projecting member is located at an edge of the irradiated region. With this design, it is possible to change illuminance sharply at a part of the light projection pattern which corresponds to the edge of the irradiated region where the focus of the light projecting member is located.

In the above-described light projection apparatus where the focus of the light projecting member is located at an edge of the irradiated region, preferably, the light projection apparatus is used as a headlamp of an automobile, and the focus of the light projecting member is located at an edge of the irradiated region from where a cut-off line of the light projection pattern is projected. This design is particularly effective, making it possible to change illuminance sharply at the cut-off line In the present specification and the appended claims, a cut-off line denotes a line dividing between the bright and dim areas in the light projection pattern of a low beam (a passing-by headlamp). At a cut-off line, a sharp change in illuminance is required.

In this case, preferably, the focus of the light projecting member is located at a position on the irradiated region from where an elbow point of the light projection pattern is projected. This design is more effective, making it possible to change illuminance sharply near the elbow point. Moreover, it is possible to obtain the highest illuminance near the elbow point. That is, it is possible to illuminate a region right ahead of an automobile with the highest illumination.

In the present specification and the appended claims, an elbow point denotes the intersection between the left-half and right-half cut-off lines in the light projection pattern of a low beam (a passing-by headlamp).

In the above-described light projection apparatus, preferably, the length of the irradiated region in the first direction is three times or more as great as its length in the second direction. With this design, it is possible to make the ratio of the length of the light projection pattern in the first direction to its length in the second direction equal to three or more. For example, in a headlamp for an automobile, the aspect ratio of a proper light projection pattern is about 1:3 to 1:4, and thus using the light projection apparatus as a headlamp in an automobile makes it possible to illuminate ahead properly.

In the above-described light projection apparatus provided with the light condensing member, preferably, the light exit face is formed in a rectangular, elliptical, or elongate hexagonal shape. With this design, it is easy to define the shape of the irradiated region of the fluorescent member.

In the above-described light projection apparatus provided with the light condensing member, preferably, the light exit face has a shape asymmetric in the first direction. With this design, it is easy to give the light projection pattern a shape asymmetric in the first direction.

In the above-described light projection apparatus where the light exit face has a shape asymmetric in a first direction, preferably, the light projection apparatus is used as a headlamp of an automobile, and the light exit face is formed in a shape that corresponds to a light projection pattern of a passing-by headlamp. With his design, it is easy to realize a light projection pattern needed in a passing-by headlamp.

In the above-described light projection apparatus provided with the light condensing member, preferably, the length of the light exit face in the first direction is three times or more as great as its length in the second direction. With this design, it is possible to make the length of the irradiated region in the first direction three times or more as great as its length in the second direction; thus, it is possible to make the ratio of the length of the light projection pattern in the first direction to its length in the second direction equal to three or more. For example, in a headlamp for an automobile, the aspect ratio of a proper light projection pattern is about 1:3 to 1:4, and thus using the light projection apparatus as a headlamp in an automobile makes it possible to illuminate ahead properly.

In the above-described light projection apparatus, preferably, the light projecting member includes a reflecting member which reflects the light emanating from the fluorescent member to project the light outside. With this design, it is easy to project the light emanating from the fluorescent member in a predetermined direction.

In the above-described light projection apparatus, preferably, the light projecting member includes a lens which transmits the light emanating from the fluorescent member to project the light outside. With this design, it is easy to project the light emanating from the fluorescent member in a predetermined direction.

In the above-described light projection apparatus where the light projecting member includes a lens, preferably, the light projecting member includes the lens and a reflecting member having a reflecting face that reflects the light emanating from the fluorescent member, the reflecting face is formed as an ellipsoid, the first focus of the reflecting face is located in the irradiated region, and the second focus of the reflecting face coincides with the focus of the lens. With this design, the light emanating from the irradiated region is reflected on the reflecting face, passes through the second focus of the reflecting face, and is projected by the lens. Here, since the second focus of the reflecting face coincides with the focus of the lens, it is easier for the light projection pattern formed by the lens to reflect the shape of the irradiated region. Projecting light with a lens, as compared with projecting light with a reflecting member without providing a lens, makes it easier for the light projection pattern to reflect the shape of the irradiated region. Moreover, providing a reflective member, as compared with projecting light with a lens without providing a reflecting member, makes it possible to use more of the light emanating from the fluorescent member as illumination light. This helps improve the efficiency of use of light.

In the present specification and the appended claims, a first focus denotes, of the foci of the reflecting face, the one closer to its vertex, and a second focus denotes the one farther away from it.

In the above-described light projection apparatus where the light projecting member includes a reflecting member, preferably, the reflecting member includes a reflecting face which reflects the light emanating from the fluorescent member, the reflecting face is formed as a paraboloid, and the focus of the reflecting face is located in the irradiated region. With this design, it is easier for the light projection pattern formed by the reflecting member to reflect the shape of the irradiated region.

In the above-described light projection apparatus, preferably, the light projecting member includes a lens which transmits the light emanating from the fluorescent member to project the light outside, and the focus of the lens is located in the irradiated region. With this design, it is easier for the light projection pattern formed by the lens to reflect the shape of the irradiated region. Projecting light with a lens, as compared with projecting light with a reflecting member without providing a lens, makes it easier for the light projection pattern to reflect the shape of the irradiated region.

In the above-described light projection apparatus provided with the light condensing member, preferably, the light exit face is a coarse surface or a moth-eye surface. With this design, it is possible to suppress reflection on the inner side of the light exit face, and thus to take out light efficiently.

In the above-described light projection apparatus, preferably, the exciting light includes laser light.

According to another aspect of the invention, a light projection unit is provided with: a light condensing member which includes a light entrance face through which exciting light enters and a light exit face that has a smaller area than the light entrance face and through which the exciting light exits; a fluorescent member which is irradiated with the exciting light emanating from the light condensing member; and a reflecting member which includes a reflecting face that reflects the light emanating from the fluorescent member in a predetermined direction. Here, the fluorescent member includes an irradiated region which is irradiated with the exciting light, the focus of the reflecting face is located in the irradiated region, and the length from the focus of the reflecting face to the end of the irradiated region in a third direction is smaller than one-half of the length of the irradiated region in a fourth direction perpendicular to the third direction.

In this light projection unit, as described above, the length from the focus of the reflecting face to the end of the irradiated region in the third direction is smaller than one-half of the length of the irradiated region in the fourth direction perpendicular to the third direction. Thus, the distance from the end of the irradiated region in the third direction to the focus of the reflecting face is shorter than the distance from the end of the irradiated region in the fourth direction to the focus of the reflecting face. Thus, it is possible to make the length of the light projection pattern in the third direction smaller than its length in the fourth direction. That is, it is possible to obtain an elongate light projection pattern that is elongate in the fourth direction.

Moreover, forming the light exit face of the light condensing member with a smaller area than the light entrance face permits the exciting light that has entered through the light entrance face to exit through the light exit face in a condensed state. Moreover, providing the reflecting member makes it easy to project the light emanating from the fluorescent member in a predetermined direction.

According to yet another aspect of the invention, a light condensing member for condensing exciting light and shining the exciting light onto a fluorescent member is provided with: a light entrance face through which the exciting light enters; and a light exit face that has a smaller area than the light entrance face and through which the exciting light exits. Here, the length of the light exit face in a first direction is greater than the length of the light exit face in a second direction.

In this light condensing member, as described above, by making the length of the light exit face in the first direction greater than its length in the second direction, it is possible to make the length of the irradiated region of the fluorescent member in the first direction greater than its length in the second direction. Thus, the fluorescent member is excited in an area elongate in the first direction. This makes it possible to obtain an elongate light projection pattern that is elongate in the first direction. Moreover, forming the light exit face of the light condensing member with a smaller area than the light entrance face permits the exciting light that has entered through the light exit face to exit through the light exit face in a condensed state.

According to a still another aspect of the invention, a light projection unit is provided with: a light condensing member designed as described above; and a fluorescent member which is irradiated with the exciting light emanating from the light condensing member.

According to a further aspect of the invention, a light condensing unit is provided with: a light condensing member which includes a light entrance face through which laser light enters and a light exit face that has a smaller area than the light entrance face and through which the laser light exits; and a holding member which holds the light condensing member. Here, the light condensing member further includes a side face which connects between the light entrance face and the light exit face, the side face has a function of reflecting the laser light that has entered through the light entrance face to guide the laser light to the light exit face, the light condensing member is formed of a substance having a higher refractive index than the environment around the light condensing member, and the holding member holds the light entrance face, or holds the side face at a point or along a line.

In this light condensing unit, as described above, a light condensing member is provided which includes a light entrance face through which laser light enters and a light exit face that has a smaller area than the light entrance face and through which the laser light exits, and the light condensing member includes a side face which reflects the laser light that has entered the light condensing member through the light entrance face to guide the laser light to the light exit face. Thus, the laser light that has entered through the light entrance face is guided to the light exit face while being reflected on the side face, and exits through the light exit face in a condensed state. Moreover, the laser light that has entered through the light entrance face travels inside the light condensing member while being reflected on the side face, and exits through the light exit face with an even light intensity distribution.

Moreover, as described above, the holding member which holds the light condensing member holds the light entrance face, or holds the side face at a point or along a line. In a case where the holding member holds the light entrance face, when laser light is reflected on the side face, it is not absorbed by the holding member. In a case where the holding member holds the side face at a point or along a line, it is possible to sufficiently reduce the contact area between the light condensing member and the holding member. This makes it possible to prevent laser light from exiting into and being absorbed by the holding member at where the light condensing member and the holding member make contact with each other. That is, it is possible to reduce the amount of laser light absorbed by the holding member.

In the above-described light condensing unit, preferably, the holding member has a function of transmitting the laser light and in addition holds the light entrance face. With this design, it is possible to suppress absorption of laser light by the holding member, and this makes it possible to dispose the holding member so as to the cover the light entrance face. This makes it easy to hold the light entrance face with the holding member.

In the above-described light condensing unit where the holding member holds the light entrance face, preferably, the holding member holds the light entrance face via an adhesive layer. With this design, it is easy to hold the light entrance face with the holding member.

In the above-described light condensing unit, preferably, there is further provided a housing member which houses a laser generator which emits the laser light, and the housing member includes the holding member.

In the above-described light condensing unit, preferably, the holding member holds at least one of a light entrance face side part and a light exit face side part of the side face. The light condensing member is bulkier and heavier in its light entrance face side part than in its light exit face side part; therefore, letting the holding member hold the light entrance face side part of the side face allows more stable holding of the light condensing member. Moreover, less laser light reaches the side face in the light entrance face side part of the light condensing member than in its light exit face side part; thus, holding the light entrance face side part of the side face helps further reduce the amount of laser light absorbed by the holding member. The holding member may hold at least the light exit face side part of the side face.

In the above-described light condensing unit where the holding member holds at least one of a light entrance face side part and a light exit face side part of the side face, preferably, the holding member includes a line contact portion which makes line contact with the light condensing member, and the line contact portion is formed of metal. With this design, it is possible to further reduce the amount of laser light absorbed by the holding member.

In the above-described light condensing unit where the holding member holds at least one of a light entrance face side part and a light exit face side part of the side face, preferably, the holding member includes a point contact portion which makes point contact with the light condensing member, and the point contact portion has lower hardness than the light condensing member. With this design, it is possible to suppress damage inflicted by the point contact portion of the holding member on the light condensing member.

In the above-described light condensing unit where the holding member holds at least one of a light entrance face side part and a light exit face side part of the side face, preferably, the holding member includes a point contact portion which makes point contact with the light condensing member, and the part of the point contact portion at which it makes contact with the light condensing member is formed as a curved surface. This design is particularly effective, making it possible to make the contact area between the holding member and the light condensing member extremely small.

In the above-described light condensing unit where the holding member holds at least one of a light entrance face side part and a light exit face side part of the side face, preferably, the cross section of the light condensing member on a plane perpendicular to the light guide direction has a polygonal shape with a plurality of vertices, and the holding member makes contact with at least two of the vertices. With this design, the holding member can be brought into point contact or line contact with the light condensing member, and this makes it possible to further reduce the amount of laser light absorbed by the holding member. The laser light guided inside the light condensing member is less likely to reach the vertices of the cross section of the light condensing member; that is, the density of laser light at the vertices of the light condensing member is lower than the density of laser light elsewhere. This makes it possible to further reduce the amount of laser light absorbed by the holding member.

In the above-described light condensing unit where the holding member holds at least one of a light entrance face side part and a light exit face side part of the side face, preferably, the cross section of the light condensing member on a plane perpendicular to the light guide direction has a polygonal shape with a plurality of sides, and the holding member makes contact with at least one of the shortest of the sides. With this design, it is easy to hold the light condensing member stably.

In the above-described light condensing unit where the holding member holds at least one of a light entrance face side part and a light exit face side part of the side face, preferably, the holding member is formed so as to cover the side face of the light condensing member. With this design, it is possible to prevent the laser light exiting through the side face of the light condensing member from leaking out of the light condensing unit; thus, it is possible to suppress adverse effects of laser light on the human eye etc.

In the above-described light condensing unit, preferably, there is further provided a fluorescent member which is irradiated with the laser light emanating from the light condensing member and which converts at least part of the laser light into fluorescence to emit the fluorescence.

In the above-described light condensing unit provided with a fluorescent member, preferably, there is further provided a reflecting member which reflects the fluorescence emanating from the fluorescent member in a predetermined direction.

In the above-described light condensing unit, preferably, laser light emitted from a plurality of laser generators enters the light condensing member through the light entrance face. By use of this light condensing member, it is easy to condense the laser light emitted from a plurality of laser generators. Using this light condensing member is therefore particularly effective in a case where a plurality of laser generators are used as a laser light source.

In the above-described light condensing unit, preferably, the light exit face is a coarse surface or a moth-eye surface. With this design, it is possible to suppress reflection on the inner side of the light exit face, and thus to take out light efficiently.

According to a still further aspect of the invention, a light emitting apparatus is provided with: a light condensing unit designed as described above; and a laser generator which emits laser light toward the light condensing member of the light condensing unit.

According to an even further aspect of the invention, a light condensing unit is provided with: a light condensing member which includes a light entrance face through which laser light enters and a light exit face that has a smaller area than the light entrance face and through which the laser light exits; and a holding member which holds the light condensing member. Here, the light condensing member includes a passage region through which the laser light passes and a no-passage region through which the laser light does not pass, and the holding member holds the no-passage region.

In this light condensing unit, as described above, a light condensing member which includes a light entrance face through which laser light enters and a light exit face that has a smaller area than the light entrance face and through which the laser light exits is provided. Thus, the laser light that has entered through the light entrance face exits through the light exit face in a condensed state.

Moreover, as described above, the light condensing member includes a passage region through which the laser light passes and a no-passage region through which the laser light does not pass, and the holding member holds the no-passage region. Thus, the laser light is not absorbed by the holding member.

BRIEF DESCRIPTION OF THE DRAWINGS

FIG. 86 is a diagram showing relevant dimensions of a light condensing member in the eighth modified example of the invention;

DETAILED DESCRIPTION OF PREFERRED EMBODIMENTS

Hereinafter, embodiments of the present invention will be described with reference to the accompanying drawings. For the sake of easy understanding, hatching may occasionally be omitted even in sectional views, and may occasionally be applied elsewhere than in sectional views.

First Embodiment

First, with reference to FIGS. 1 to 23, the structure of a light projection apparatus 1 according to a first embodiment of the invention will be described. For the sake of simple illustration, not all semiconductor laser elements 11 are always illustrated.

Figure 1:
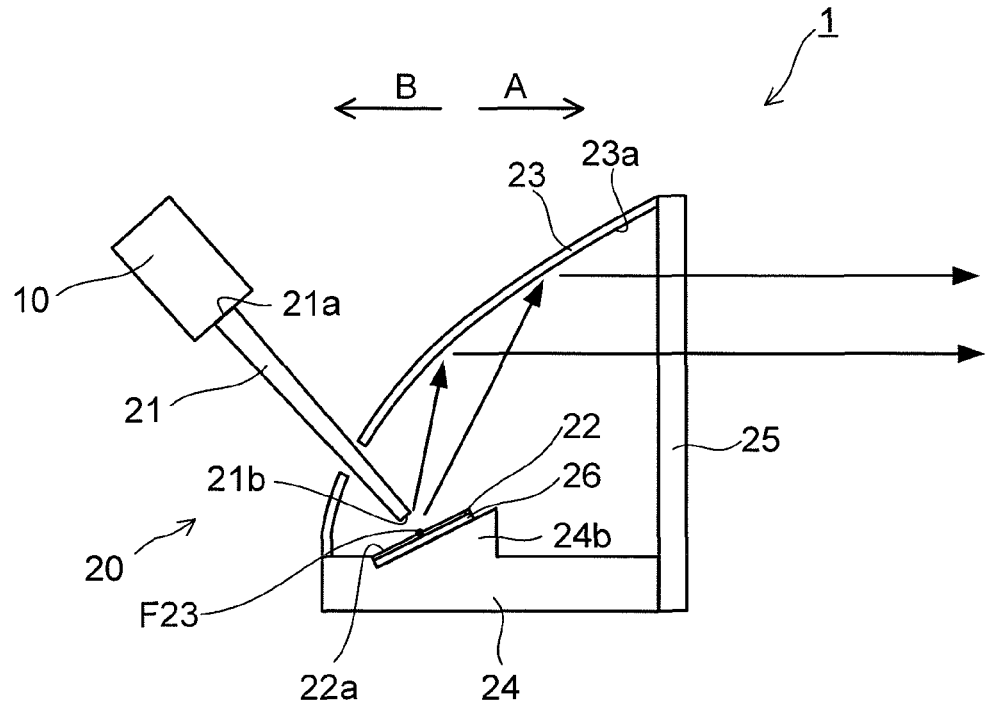
FIG. 1 is a sectional view showing the structure of a light projection apparatus provided with a light projection unit in a first embodiment of the invention.
Figure 2:
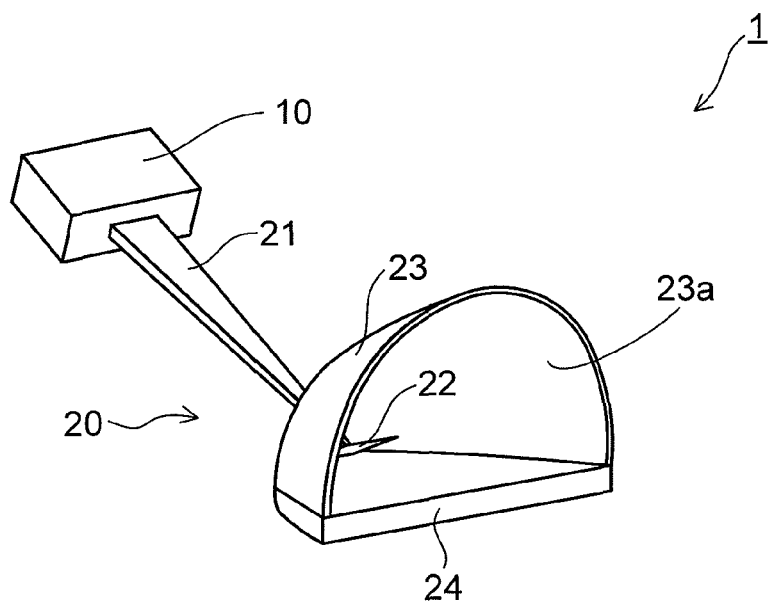
FIG. 2 is a perspective view showing the structure of the light projection apparatus in the first embodiment of the invention.

The light projection apparatus 1 according to the first embodiment of the invention is used as a headlamp for illuminating ahead of, for example, an automobile or the like. As shown in FIGS. 1 and 2, the light projection apparatus 1 is provided with a laser generating device 10 which functions as a laser light source (exciting light source) and a light projecting unit 20 which, by using the laser light emanating from the laser generating device 10, projects light in a predetermined direction (direction A). In FIG. 2, for the sake of easy understanding, a fitting portion 24b, a filter member 25, and a support plate 26, which will be described later, of the light projecting unit 20 are omitted.

Figure 3:
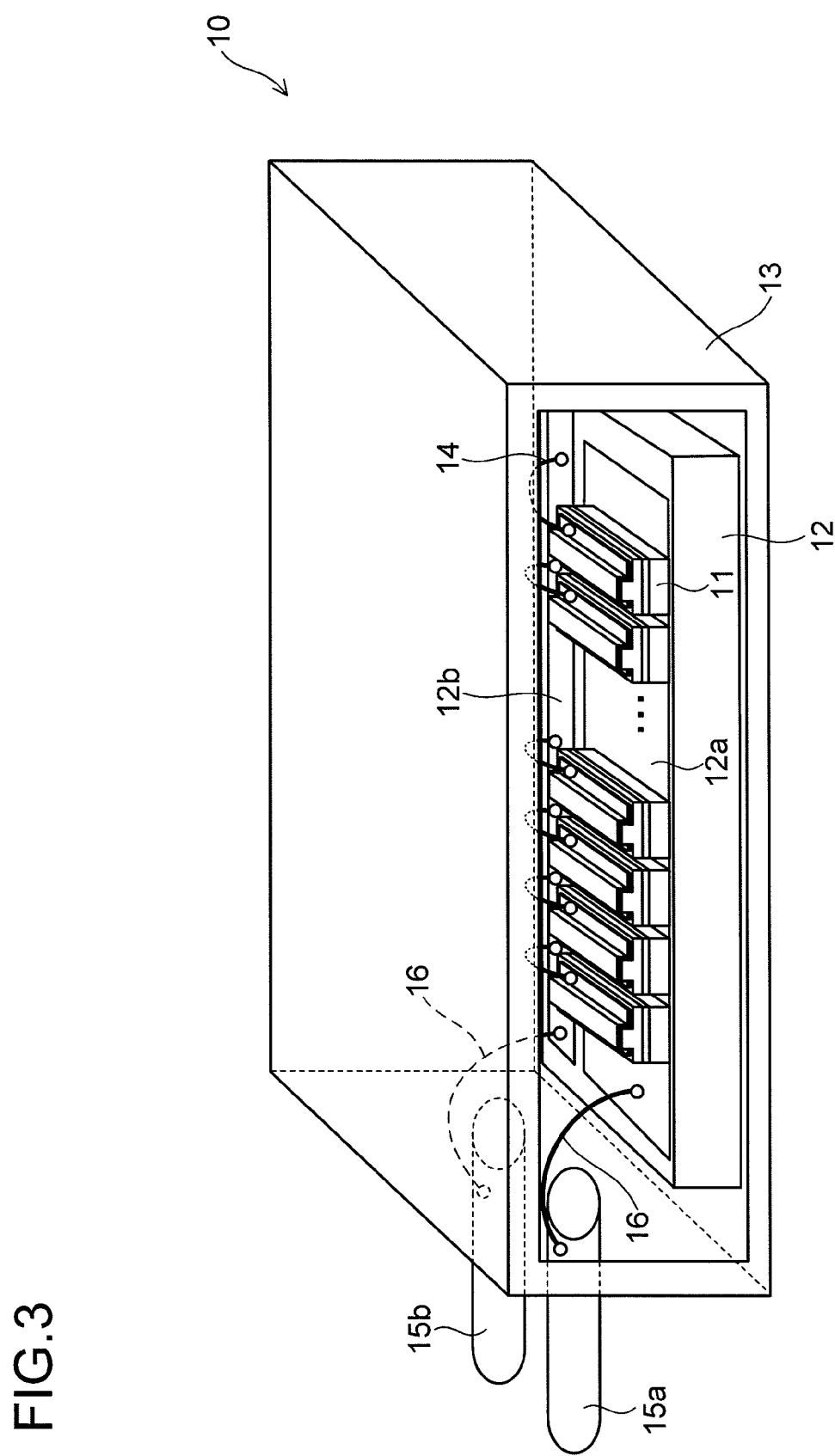
FIG. 3 is a perspective view showing the structure of a laser generating device in the first embodiment of the invention.

As shown in FIG. 3, the laser generating device 10 includes a plurality of semiconductor laser elements 11 (laser generators), a heat spreader 12 on which the semiconductor laser elements 11 are mounted, and a housing member 13 which houses them all.

Figure 4:
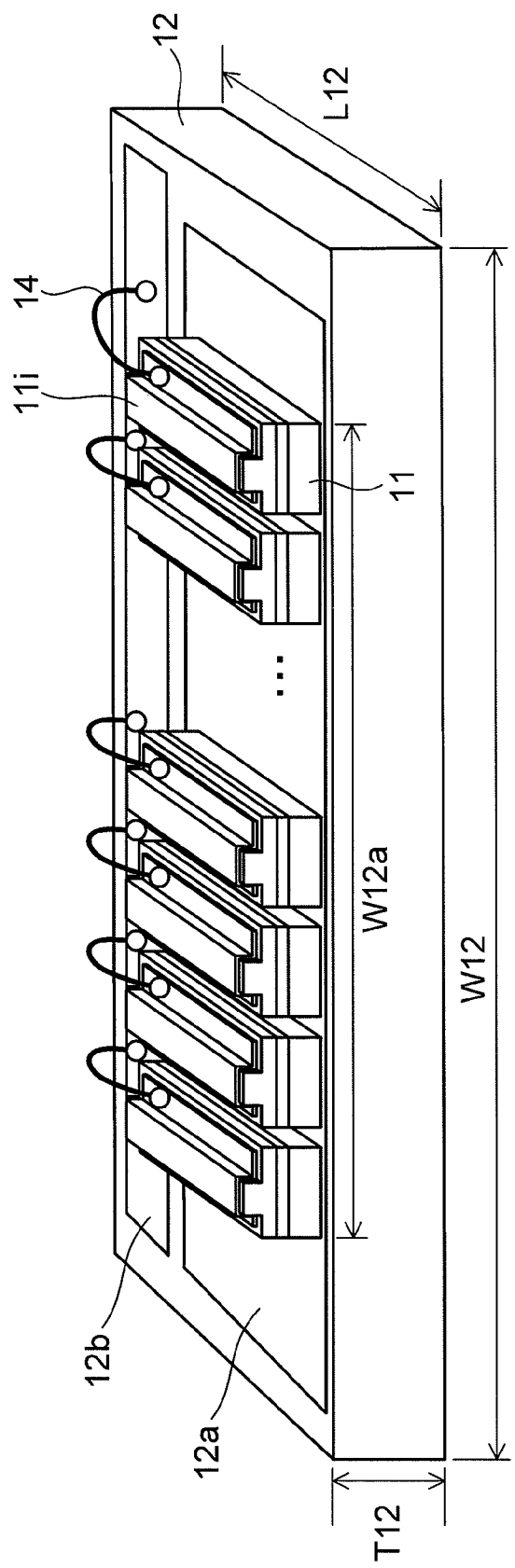
FIG. 4 is a perspective view showing the structure of semiconductor laser elements and a heat spreader in the first embodiment of the invention.

The heat spreader 12 is formed, for example, as a flat plate of aluminum nitride, and is soldered to the bottom face of the housing member 13. As shown in FIG. 4, the heat spreader 12 has, for example, a width (W12) of about 15 mm, a thickness (T12) of about 1 mm, and a depth (L12) of about 2 mm. On the mounting face of the heat spreader 12, electrode patterns 12a and 12b, each elongate, are formed. On the electrode pattern 12a, a plurality of semiconductor laser elements 11 arrayed in a row are mounted. In this embodiment, for example, 13 semiconductor laser elements 11 are mounted across a width (W12a) of about 10 mm. It is preferable that the width (W12a) here be smaller than the width (W21a) of the light entrance face 21a of a light condensing member 21, which will be described later, of the light projecting unit 20.

Figure 5:
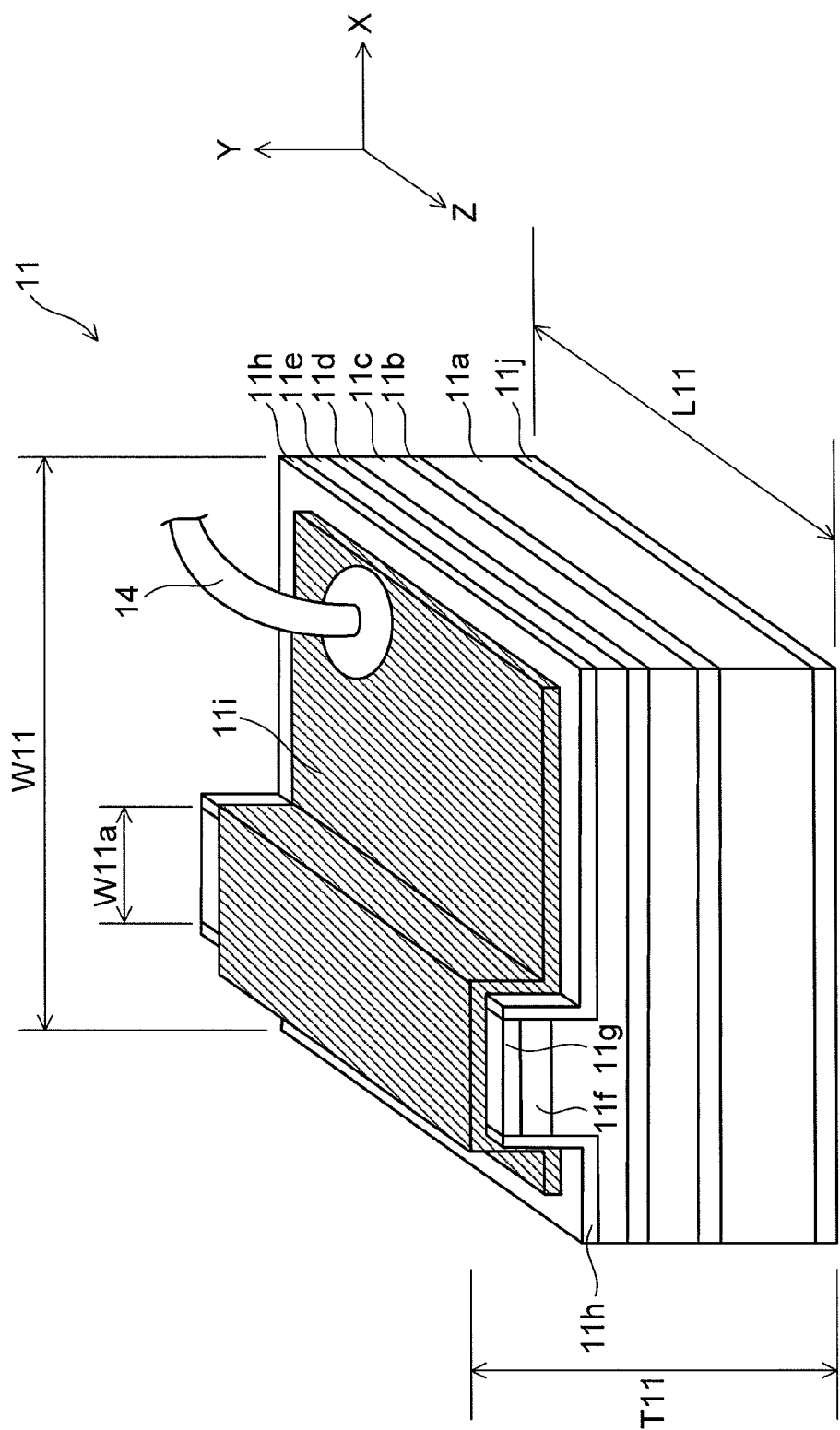
FIG. 5 is a perspective view showing the structure of a semiconductor laser element in the first embodiment of the invention.

The semiconductor laser elements 11 are, for example, broad area lasers, and emit laser light that functions as exciting light. The semiconductor laser elements 11 are designed to emit blue-violet laser light with a center wavelength of, for example, about 405 nm. Moreover, as shown in FIG. 5, each semiconductor laser element 11 has, for example, a width (W11) of about 200 µm, a thickness (T11) of about 100 µm, and a length (L11) of about 1000 µm.

The semiconductor laser element 11 includes a substrate 11a of n-type GaN with a thickness of about 100 µm and, formed on top of the substrate 11a in the order named, a buffer layer 11b of n-type GaN with a thickness of about 0.5 µm, a lower clad layer 11c of n-type $Al_{0.05}Ga_{0.95}N$ with a thickness of about 2 µm, an active layer 11d of InGaN composed of multiple quantum wells, and an upper clad layer 11e of p-type $Al_{0.05}Ga_{0.95}N$ with a thickness of about 0.5 µm (at its thickest part).

At a predetermined position on the upper clad layer 11e, a ridge is provided which extends in the Z direction (the length direction of the semiconductor laser element 11). On the ridge, there are formed a contact layer 11f of p-type GaN with a thickness of about 0.1 µm and an electrode 11g of Pd. The top face of the upper clad layer 11e and the side faces of the contact layer 11f and of the electrode 11g are covered by an insulating film 11h of $SiO_2$ formed on them. In a predetermined region on the insulating film 11h, a pad electrode 11i is formed which covers the ridge and makes ohmic contact with the electrode 11g. On the bottom face of the substrate 11a, a reverse-side electrode 11j of Hf/Al is formed.

As shown in FIG. 4, the pad electrode 11i of each semiconductor laser element 11 is electrically connected, via a Au wire 14, to the electrode pattern 12b on the heat spreader 12. The reverse-side electrode 11j (see FIG. 5) of each semiconductor laser element 11 is electrically connected, via an unillustrated solder layer or the like, to the electrode pattern 12a. The width of the light emitting portion 11k (see FIG. 7) of the semiconductor laser element 11 is defined by the ridge width (W11a in FIG. 5) of the upper clad layer 11e, and this ridge width is set at, for example, 7 µm. In this case, the width of the light emitting portion 11k is about 7 µm.

Figure 6:
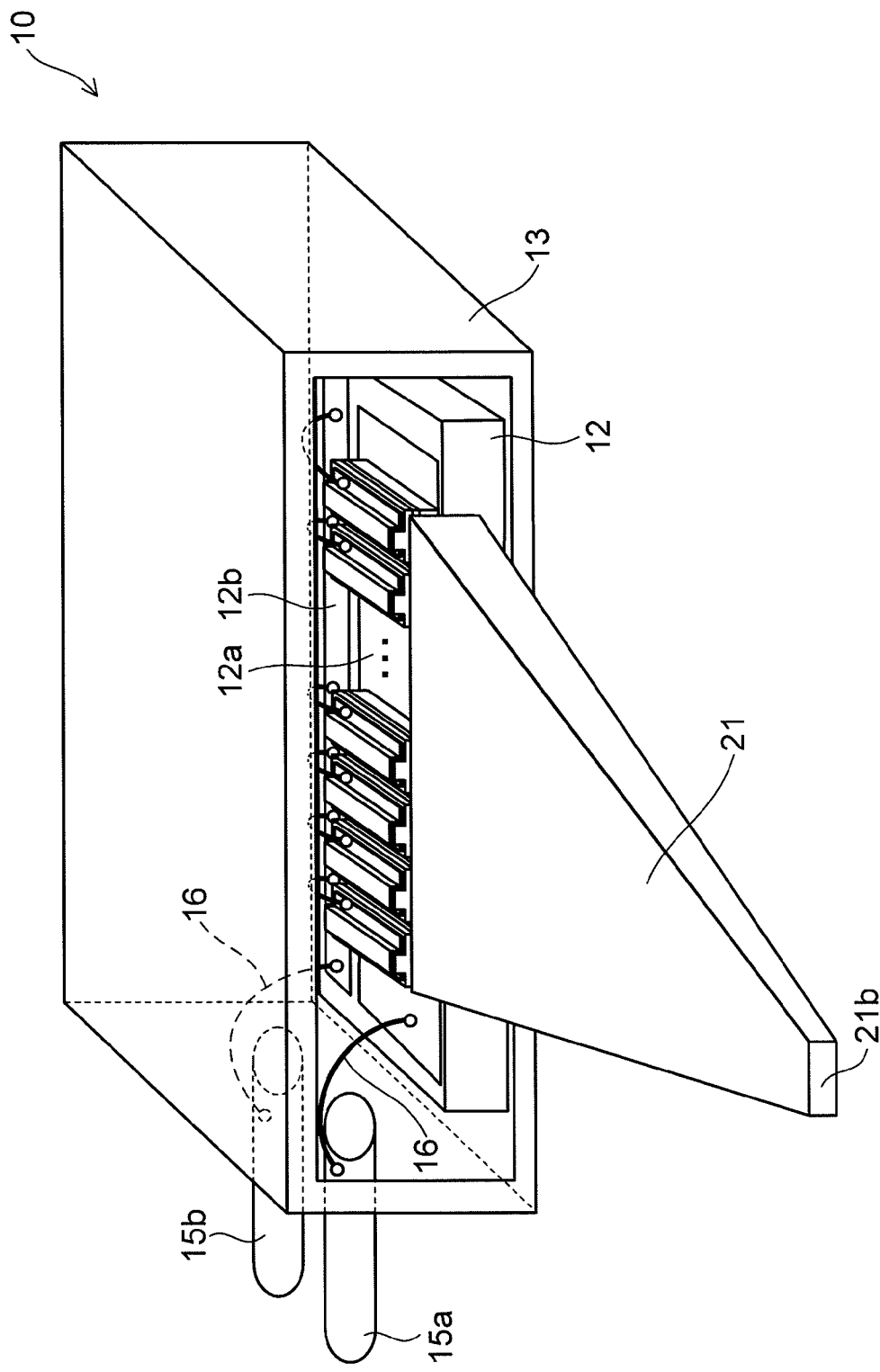
FIG. 6 is a perspective view showing a laser generating device fitted with a light condensing member in the first embodiment of the invention.

As shown in FIG. 3, the housing member 13 is formed in the shape of a box having an opening on the laser light exit side. The housing member 13 is penetrated by electrode pins 15a and 15b for supplying electric power to the semiconductor laser elements 11. These electrode pins 15a and 15b are electrically connected, via metal wires 16, to the electrode patterns 12a and 12b, respectively, on the heat spreader 12. The opening in the housing member 13 is fitted with an unillustrated glass plate, and the inside of the housing member 13 is filled with an inert gas. The housing member 13 may be fitted with heat dissipating fins or the like (unillustrated), and the housing member 13 may be, for example, air-cooled. As shown in FIG. 6, at a predetermined position on the glass plate, the light condensing member 21, which will be described later, of the light projecting unit 20 is fixed with a transparent adhesive layer in between. Thus, the laser light emanating from the semiconductor laser elements 11 enters the light condensing member 21.

Figure 7:
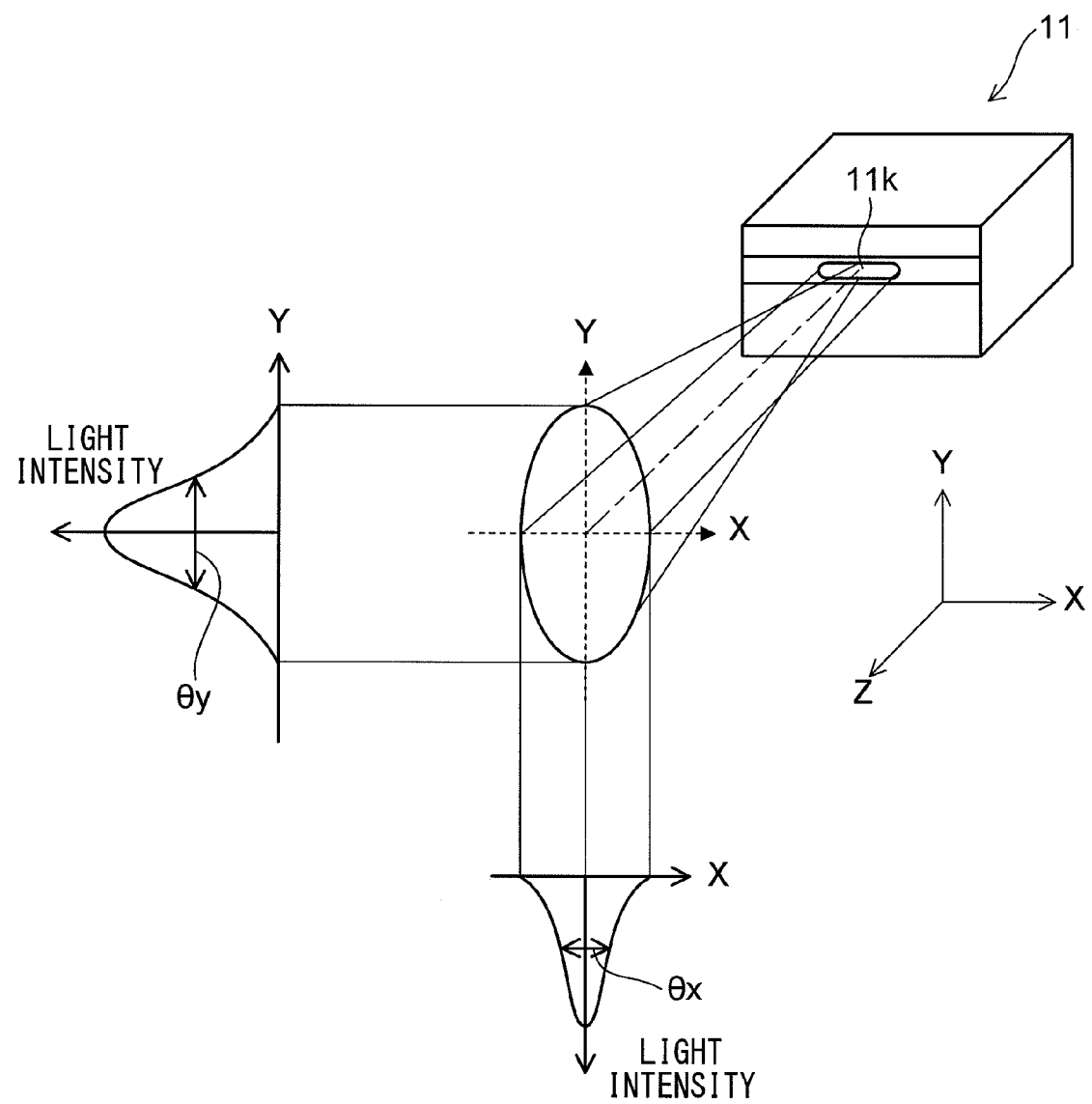
FIG. 7 is a diagram illustrating laser light emitted from a semiconductor laser element in the first embodiment of the invention.

When a DC (direct-current) electric current is applied between the pad electrode 11i and the reverse-side electrode 11j of the semiconductor laser element 11, as shown in FIG. 7, laser light spreading elliptically in the X direction (the width direction of the semiconductor laser element 11) and in the Y direction (the thickness direction of the semiconductor laser element 11) emanates from the light emitting portion 11k. The elliptical light projected on an XY plane perpendicular to the travel direction (the Z direction) of the laser light has a light intensity distribution that is Gaussian both in the X and Y directions. The light intensity distribution has, in the X direction, a full-width-at-half-maximum ($\theta x$) of about 10 degrees and, in the Y direction, a full-width-at-half-maximum ($\theta y$) of about 20 degrees. Thus, the laser light has, in the Y direction, a spread angle about twice as large as that in the X direction. Thus, the laser light travels while spreading in the X direction as a minor-axis direction and in the Y direction as a major-axis direction.

When the laser generating device 10 is supplied with an electric power of about 57 W, the laser generating device 10 yields an output of about 9.4 W. At that time, the illuminance at the maximum illuminance spot at 25 m ahead of the light projection apparatus 1 is about 120 lux (lx), and the luminous flux emitted outside via a reflecting member 23, which will be described later, is about 530 lumens (lm).

As shown in FIG. 1, the light projecting unit 20 includes a light condensing member 21 which is disposed on the laser light exit side of the laser generating device 10 (the semiconductor laser elements 11) and which guides the laser light from the laser generating device 10 while condensing it, a fluorescent member 22 which converts at least part of the laser light emanating from the light condensing member 21 to emit fluorescence, a reflecting member 23 (light projecting member) which reflects the fluorescence emanating from the fluorescent member 22 in a predetermined direction (direction A), a fitting member 24 to which the fluorescent member 22 is fixed, and a filter member 25 which is disposed at an opening of the reflecting member 23.

Figure 8:
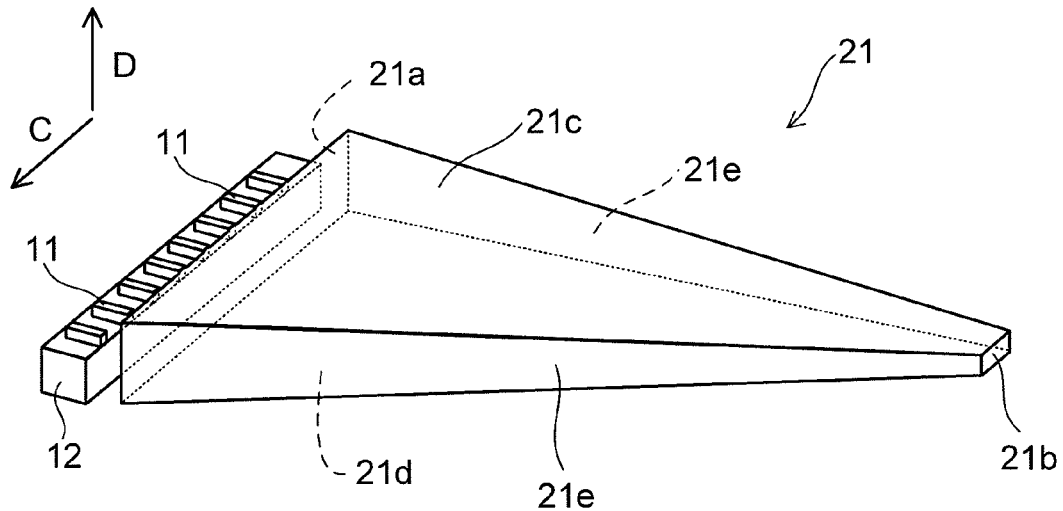
FIG. 8 is a perspective view illustrating the structure of a light condensing member in the first embodiment of the invention.

The light condensing member 21 is formed as a member that transmits light. Examples of the material for the light condensing member 21 include glass, such as borosilicate crown glass (BK7) and artificial quartz, and resin. As shown in FIG. 8, the light condensing member 21 includes a light entrance face 21a through which the laser light emanating from the semiconductor laser elements 11 enters; a light exit face 21b through which the laser light exits; and a top face 21c, a bottom face 21d, and a pair of side faces 21e which are located between the light entrance face 21a and the light exit face 21b.

Figure 9:
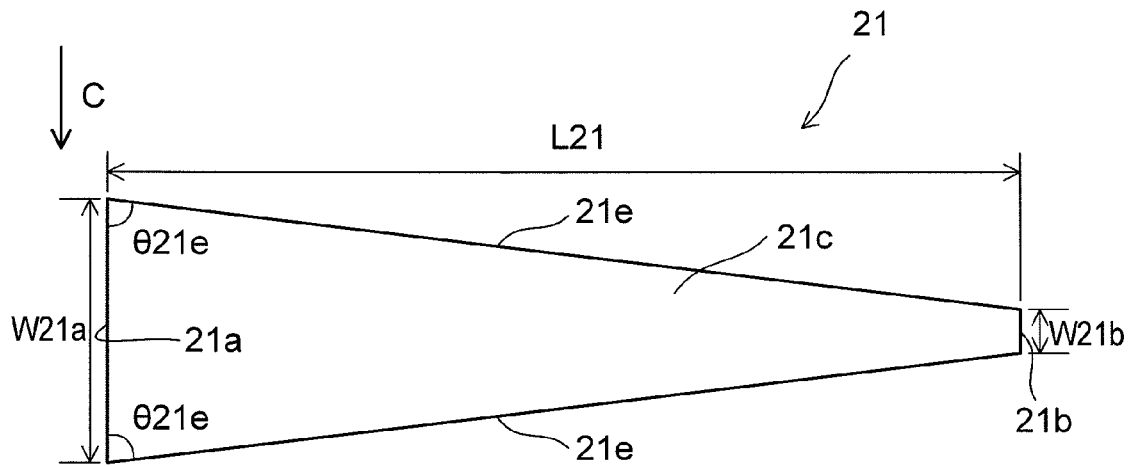
FIG. 9 is a top view showing the structure of a light condensing member in the first embodiment of the invention.
Figure 10:
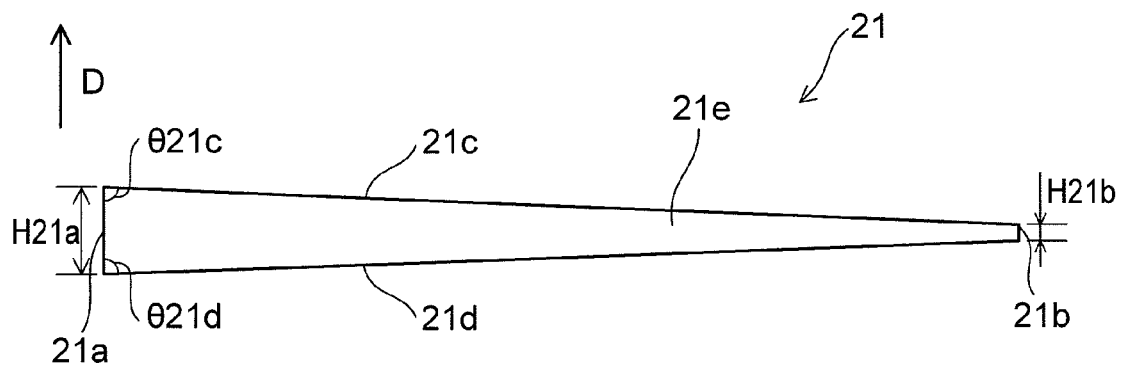
FIG. 10 is a side view showing the structure of a light condensing member in the first embodiment of the invention.

The light entrance face 21a is formed as, for example, a substantially rectangular flat surface. The light exit face 21b is formed as, for example, a substantially rectangular flat surface, and has a smaller area than the light entrance face 21a. Thus, the light condensing member 21 is formed in a shape that tapers off both in the width direction (direction C) and in the thickness direction (direction D). Specifically, as shown in FIGS. 9 and 10, the light entrance face 21a has a height (H21a) of about 0.96 mm and a width (W21a) of about 10.51 mm; the light exit face 21b has a height (H21b) of about 0.34 mm and a width (W21b) of about 1.19 mm. Thus, the length (W21b) of the light exit face 21b in direction C (a first direction) is three times or more as great as the length (H21b) of the light exit face 21b in direction D (a second direction). The light entrance face 21a and the light exit face 21b may be coated with an unillustrated anti-reflection (AR) film. In the first embodiment, in a case where the light exit face 21b of the light condensing member 21 and the irradiated region on the fluorescent member 22 are rectangular, the direction in which their longer ends extend is taken as a "first direction" according to the invention. That is, the direction in which the longest of the sides of the light exit face 21b and of the irradiated region is taken as a "first direction" according to the invention. Put another way, a "first direction" according to the invention may be defined as the direction that is perpendicular to the light projection direction (direction A) and that is simultaneously horizontal. On the other hand, a "second direction" according to the invention may be defined as the direction that is perpendicular to the "first direction" and that is simultaneously parallel to the surface of the fluorescent member.

The light exit face 21b may be formed as a coarse surface like the surface of ground glass or a so-called moth-eye surface. This, as experimentally verified, greatly improved the efficiency with which laser light is taken out of the light condensing member 21 through the light exit face 21b. In a case where the light exit face 21b is a flat surface, when the laser light reaches the light exit face 21b inside the light condensing member 21, part of it is reflected on the inner side of the light exit face 21b and thus cannot be taken out. By contrast, forming the light exit face 21b as a coarse surface like the surface of ground glass or a so-called moth-eye surface helps suppress reflection on the inner side of the light exit face 21b, and thus makes it possible to take out light efficiently.

The top face 21c and the bottom face 21d are formed in the same shape, and the two side faces 21e are formed in the same shape. The top face 21c, the bottom face 21d, and the side faces 21e all have a length (L21) of about 50 mm.

The angles (θ21c and θ21d) of the top face 21c and the bottom face 21d, respectively, with respect to the light entrance face 21a are larger than the angle (θ21e) of the side faces 21e with respect to the light entrance face 21a.

The top face 21c, the bottom face 21d, and the side faces 21e have a function of reflecting the laser light that has entered through the light entrance face 21a to guide it to the light exit face 21b.

Figure 11:
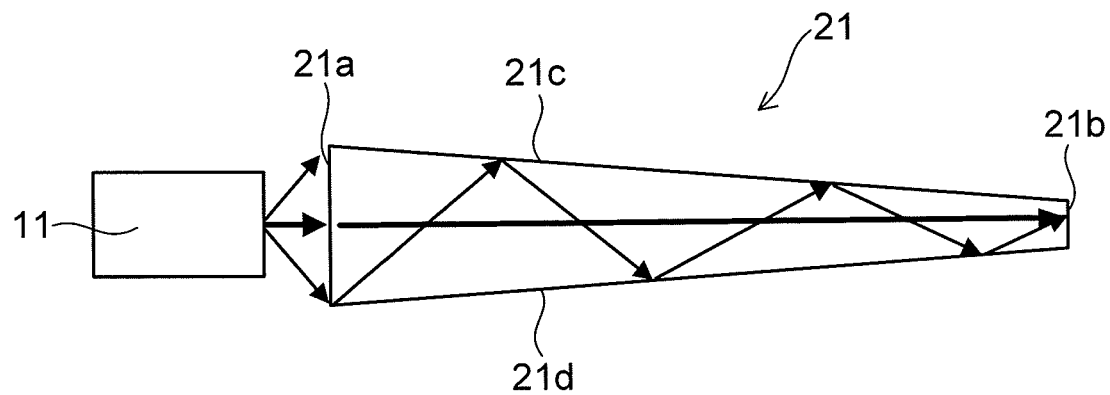
FIG. 11 is a side view illustrating the travel of laser light that has entered a light condensing member in the first embodiment of the invention.
Figure 12:
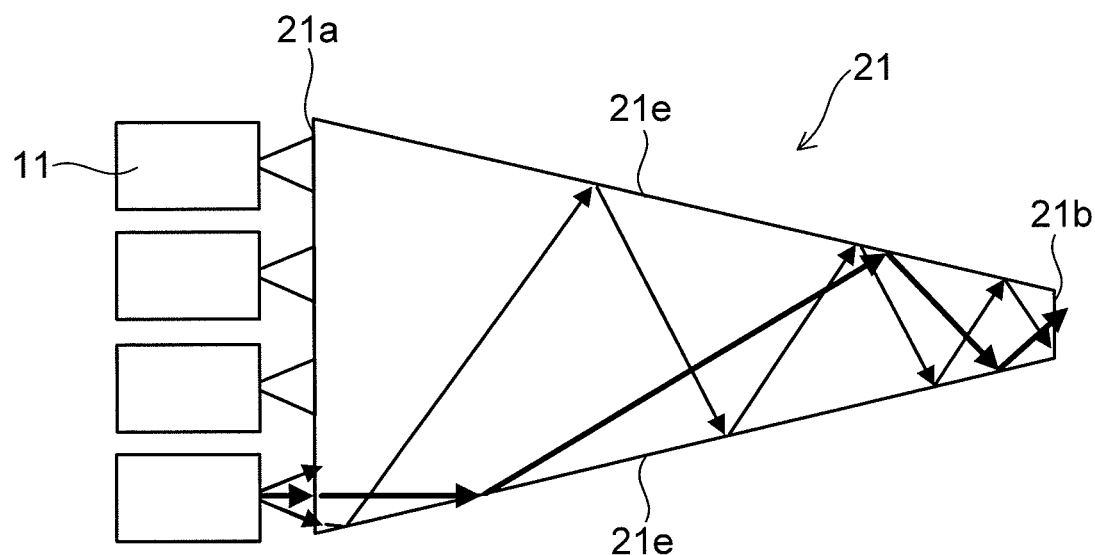
FIG. 12 is a top view illustrating the travel of laser light that has entered a light condensing member in the first embodiment of the invention.

Now, how the laser light that has entered the light condensing member 21 travels will be described briefly. As shown in FIGS. 11 and 12, the laser light emanating from the semiconductor laser elements 11 travels while spreading in the major- and minor-axis directions, and enters the light condensing member 21 through the light entrance face 21a. The laser light is then subjected to repeated total reflection on the top face 21c, the bottom face 21d, and the side faces 21e so that it is, while being condensed, guided to the light exit face 21b; the laser light then exits through the light exit face 21b. Thus, the light condensing member 21 has a function of guiding the laser light that has entered through the light entrance face 21a to the light exit face 21b while altering the travel direction of the laser light inside the light condensing member 21. The laser light emanating from the semiconductor laser elements 11 has a larger spread angle in the major-axis direction than in the minor-axis direction, and thus the total reflection condition is more difficult to fulfill on the top face 21c and the bottom face 21d. To cope with this, the angles (θ21c and θ21d; see FIG. 10) of the top face 21c and the bottom face 21d with respect to the light entrance face 21a is made larger than the angle (θ21e; see FIG. 9) of the side faces 21e with respect to the light entrance face 21a, so that the total reflection condition is easier to fulfill on the top face 21c and the bottom face 21d.

Figure 13:
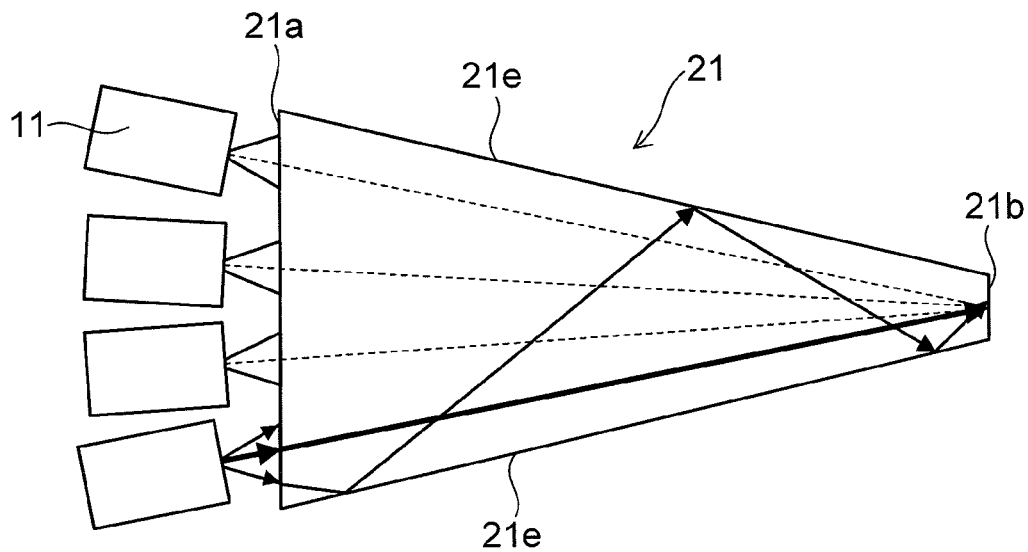
FIG. 13 is a top view showing a modified example of arrangement directions of semiconductor laser elements in the first embodiment of the invention.
Figure 14:
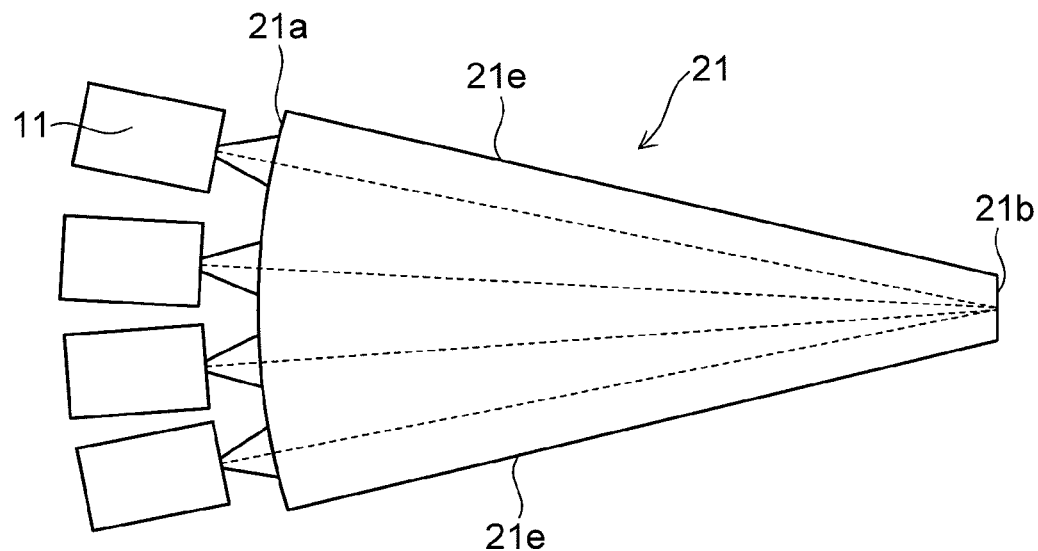
FIG. 14 is a top view showing a modified example of a light condensing member in the first embodiment of the invention.

As shown in FIG. 13, arranging the semiconductor laser elements 11 such that their respective laser light emission directions (the directions of the optical axes of the laser light they emit) point to about the center of the light exit face 21b of the light condensing member 21 is particularly effective, because doing so makes the total reflection condition easier to fulfill on the side faces 21e. In a case where the semiconductor laser elements 11 are arranged such that their respective laser light emission directions point to about the center of the light exit face 21b, as shown in FIG. 14, the light entrance face 21a may be formed so as to be perpendicular to those laser light emission directions. This helps suppress lowering in the efficiency with which laser light enters the light condensing member 21. The light condensing member 21 is not limited to one that guides light by exploiting total reflection, but may instead be one that guides light by exploiting simple reflection.

Figure 15:
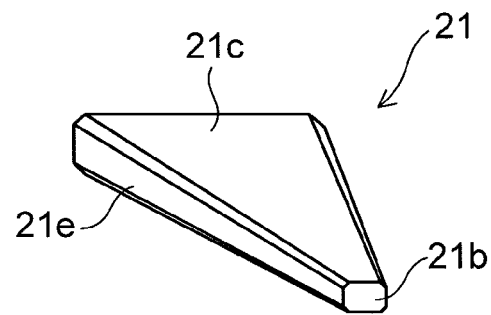
FIG. 15 is a perspective view showing a modified example of a light condensing member in the first embodiment of the invention.
Figure 16:
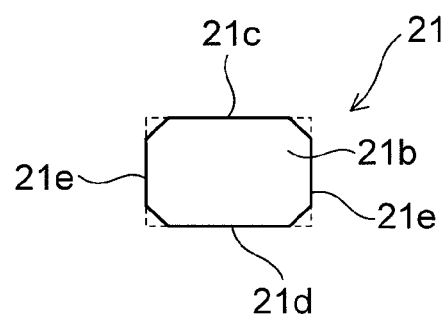
FIG. 16 is a front view showing the light exit face of the light condensing member shown in FIG. 15.
Figure 17:
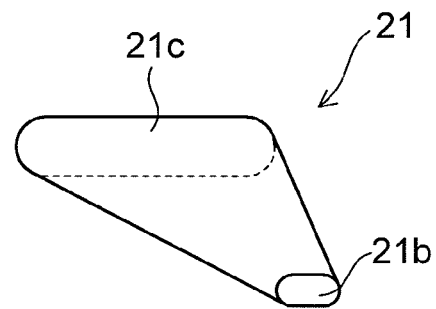
FIG. 17 is a perspective view showing a modified example of a light condensing member in the first embodiment of the invention.

As shown in FIGS. 15 to 17, the light condensing member 21 may be chamfered at edges. Specifically, the light condensing member 21 may be given, on a plane perpendicular to its light guide direction, a cross section in the shape of a rectangle chamfered at corners. In that case, as shown in FIGS. 15 and 16, the light condensing member 21 may be flat-chamfered at edges (corners in the cross section); instead, as shown in FIG. 17, the light condensing member 21 may be round-chamfered at edges. The light guide direction of the light condensing member 21 denotes the direction pointing from the center of the light entrance face 21a to the center of the light exit face 21b. Giving the light condensing member 21, on a plane perpendicular to its light guide direction, a cross section in the shape of a rectangle chamfered at corners makes it possible to suppress scattering of laser light at edges (corners in the cross section) of the light condensing member 21. This helps suppress leakage of laser light out of the light condensing member 21, and thus helps improve the efficiency of use of laser light.

Figure 18:
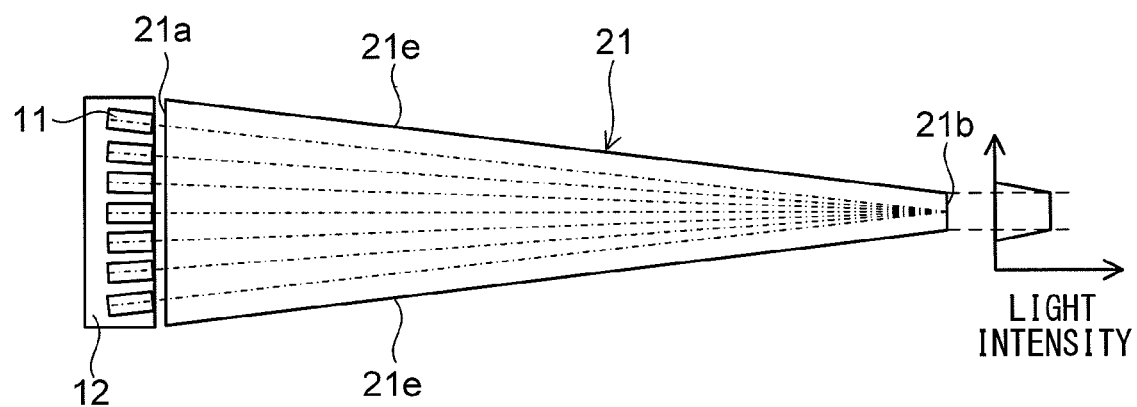
FIG. 18 is a diagram illustrating a light intensity distribution of laser light on the light exit face of a light condensing member in the first embodiment of the invention.

In this embodiment, the light intensity distribution of the laser light on the light exit face 21b of the light condensing member 21 is even as shown in FIG. 18. That is, the light intensity distribution of the laser light emanating from the light exit face 21b is not Gaussian. This helps prevent excessive light density in part of the irradiated face 22a, which will be described later, of the fluorescent member 22. In this way, it is possible to prevent heat-induced deterioration, and deterioration through a light-induced chemical reaction, of the phosphor and binder contained in the fluorescent member 22.

Figure 19:
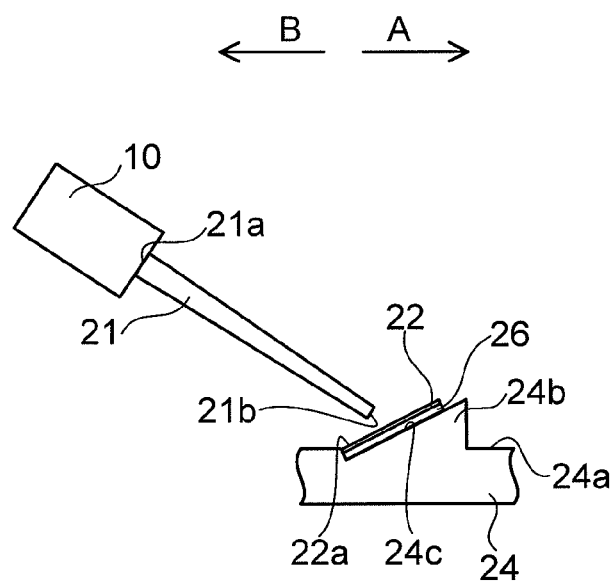
FIG. 19 is a diagram showing the structure of and around a fluorescent member in the first embodiment of the invention.

As shown in FIG. 19, the light condensing member 21 is inclined in direction B (the direction opposite to the light projection direction (the predetermined direction, direction A)). Moreover, between the light exit face 21b of the light condensing member 21 and the irradiated face 22a of the fluorescent member 22, a gap (space) is formed. The light projection direction is the direction pointing to the spot, for example at 25 m ahead of the light projection apparatus 1, that is to be illuminated most, and is the direction pointing to, for example, the maximum illuminance spot at 25 m ahead of the center of the opening of the reflecting face 23a.

Figure 20:
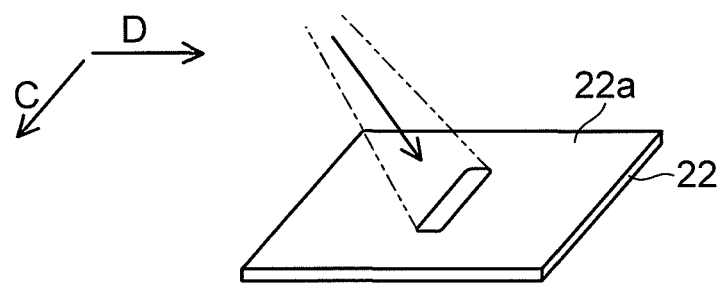
FIG. 20 is a perspective view showing a fluorescent member of which only a central part is irradiated with laser light.
Figure 21:
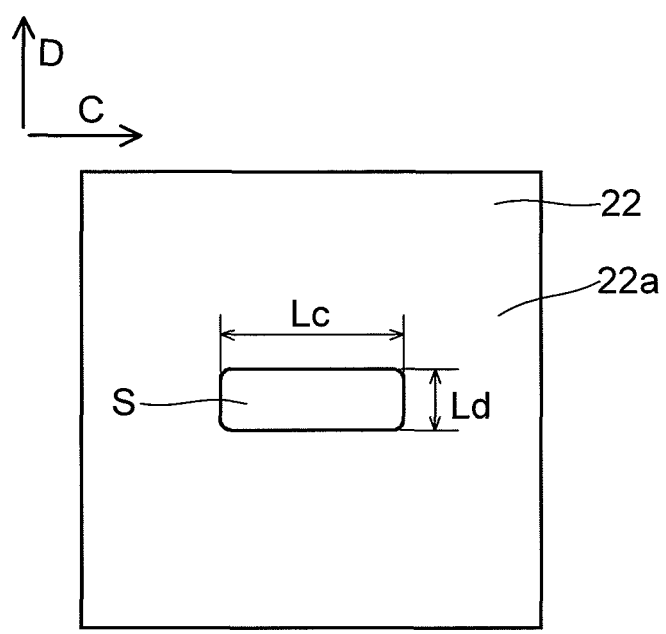
FIG. 21 is a diagram illustrating an irradiated region on a fluorescent member in the first embodiment of the invention.

The fluorescent member 22 has an irradiated face 22a which is irradiated with laser light. The rear face (the face opposite from the irradiated face 22a) of the fluorescent member 22 makes contact with the support plate 26, which is made of aluminum. The fluorescent member 22 is formed by being deposited on the support plate 26, for example, by electrophoresis. The support plate 26 has a width of about 10 mm, a length of about 10 mm, and a thickness of about 1 mm. The fluorescent member 22 has a width of about 10 mm, a length of about 10 mm, and an even thickness of about 0.1 mm. As shown in FIG. 20, a central part of the irradiated face 22a of the fluorescent member 22 is irradiated with the laser light condensed through the light condensing member 21. The length of the light exit face 21b of the light condensing member 21 in direction C is three times or more (here, about 3.5 times) as great as the length of the light exit face 21b in direction D. Thus, as shown in FIG. 21, the length (Lc) in direction C of the irradiated region S, that is, the central part of the irradiated face 22a which is irradiated with laser light, is tree times or more (here, about 3.5 times) as great as the length (Ld) of the irradiated region S in direction D. Thus, the fluorescent member 22 is excited in a substantially rectangular area that is elongate in direction C. In other words, the fluorescent member 22 is excited with a distribution spreading in the direction (direction C) perpendicular to the light projection direction (direction A) about the focus F23, which will be described later, of the reflecting face 23a. Thus, fluorescent emanates from a substantially rectangular region. A fluorescent member 22 may instead be used that only has an area as large as the area irradiated with laser light, so that the entire irradiated face 22a of the fluorescent member 22 is irradiated with laser light.

The fluorescent member 22 is formed by use of particles of three kinds of phosphors (fluorescent or phosphorescent substances) that convert, for example, blue-violet light (exciting light) into red, green, and blue light respectively and emit the results. An example of the phosphor that converts blue-violet light into red light is $CaAlSiN_3$:Eu. An example of the phosphor that converts blue-violet light into green light is β-SiAlON:Eu. An example of the phosphor that converts blue-violet light into blue light is $(Ba,Sr)MgAl_{10}O_{17}$:Eu. These phosphors are bound together by an inorganic binder (such as silica or $TiO_2$). The red, green, and blue fluorescence emanating from the fluorescent member 22 mixes to produce white light. Here, red light is light with a center wavelength of, for example, about 640 nm, green light is light with a center wavelength of, for example, about 520 nm, and blue light is light with a center wavelength of, for example, about 450 nm.

As shown in FIG. 1, the fluorescent member 22 is disposed in a region on the reflecting member 23 which includes the focus F23 of the reflecting face 23a, and the center of the irradiated face 22a of the fluorescent member 22 approximately coincides with the focus F23 of the reflecting face 23a. The fluorescent member 22 may be disposed near the focus F23 of the reflecting face 23a on the reflecting member 23. As shown in FIG. 19, the irradiated face 22a of the fluorescent member 22 is inclined upward in the light projection direction (direction A).

Figure 22:
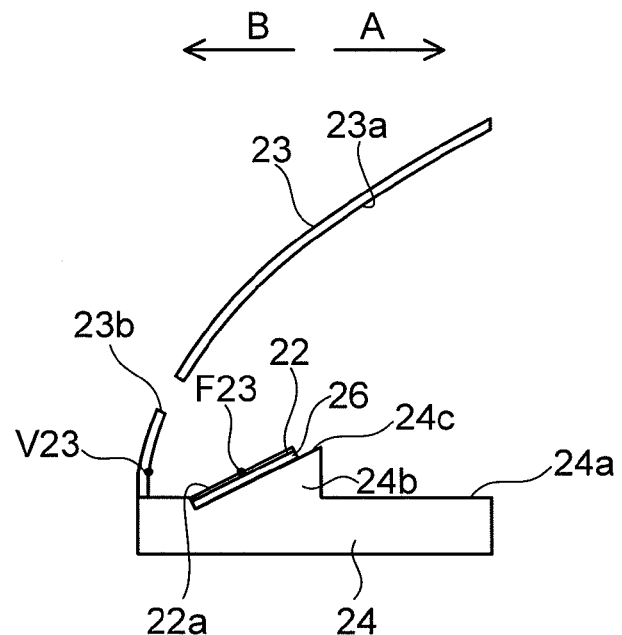
FIG. 22 is a sectional view illustrating the structure of a reflecting member in the first embodiment of the invention.
Figure 23:
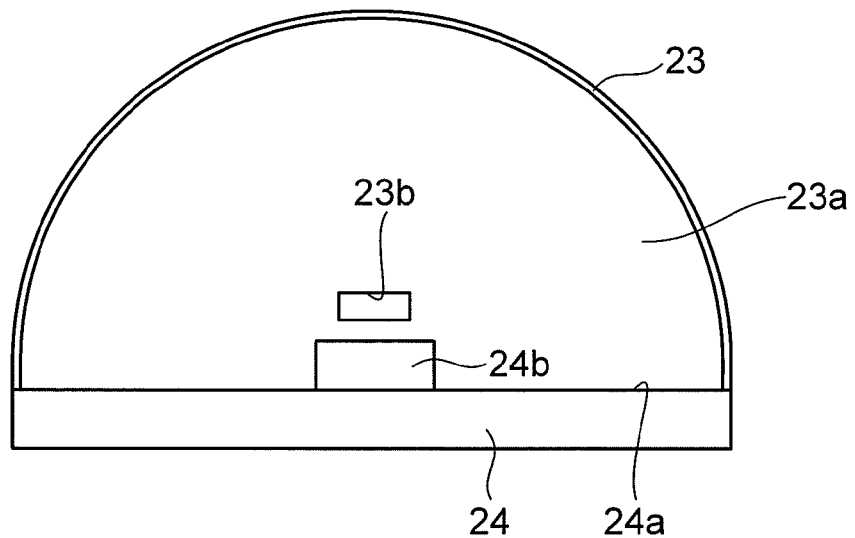
FIG. 23 is a front view illustrating the structure of a reflecting member in the first embodiment of the invention.

As shown in FIG. 22, the reflecting face 23a of the reflecting member 23 is disposed so as to face the irradiated face 22a of the fluorescent member 22. The reflecting face 23a is formed so as to include, for example, part of a paraboloid. Specifically, the reflecting face 23a is formed in the shape of a paraboloid that is split on the plane perpendicular to (crossing) the axis through its vertex V23 and focus F23 and that is further split on the plane parallel to the axis through the vertex V23 and focus F23. As shown in FIGS. 22 and 23, the reflecting face 23a has a depth (length in direction B) of about 30 mm, and is formed substantially in a semicircular shape with a radius of about 30 mm as seen from the light projection direction (direction A).

The reflecting face 23a has a function of reflecting the light from the fluorescent member 22 in a predetermined direction (direction A). The light emanating from the fluorescent member 22 at the focus F23 of the reflecting face 23a is formed into parallel light by the reflecting face 23a, whereas the light emanating from the fluorescent member 22 at a position deviated from the focus F23, for example, in direction C is projected in a state spread in direction C by the reflecting face 23a. In a part of the reflecting member 23 deviated from the center of the fluorescent member 22 in direction B, a through hole 23b is formed. In the through hole 23b, a tip-end part of the light condensing member 21 is inserted.

The reflecting member 23 may be formed of metal, or may be formed by coating the surface of resin with a reflective film.

To the reflecting member 23, a fitting member 24 is fixed. Preferably, the top face 24a of the fitting member 24 is formed so as to have a function of reflecting light. The fitting member 24 is formed of metal with good thermal conductivity, such as Al or Cu, so as to have a function of dissipating the heat generated in the fluorescent member 22. On the top face 24a of the fitting member 24, a fitting portion 24b on which to fix the fluorescent member 22 and the support plate 26 is formed integrally. As shown in FIG. 19, the fitting face 24c of the fitting portion 24b is inclined upward in the light projection direction (direction A). Preferably, on the bottom face of the fitting member 24, heat dissipating fins (unillustrated) are provided.

As shown in FIG. 1, the opening (the end in direction A) of the reflecting member 23 is fitted with a filter member 25 which shields (absorbs or reflects) exciting light (light with a wavelength of about 405 nm) but transmits the fluorescence (red, green, and blue light) resulting from the wavelength conversion by the fluorescent member 22. Specifically, the filter member 25 may be formed of a glass material such as, for example, ITY-418 manufactured by Isuzu Glass Co., Ltd., which absorbs light with wavelengths of 418 nm or less and transmits light with wavelengths more than 418 nm, or, for example, L42 manufactured by Hoya Corporation, which absorbs light with wavelengths of 420 nm or less and transmits light with wavelengths more than 420 nm. Providing the filter member 25 at the opening of the reflecting member 23 helps suppress leakage of laser light.

Figure 24:
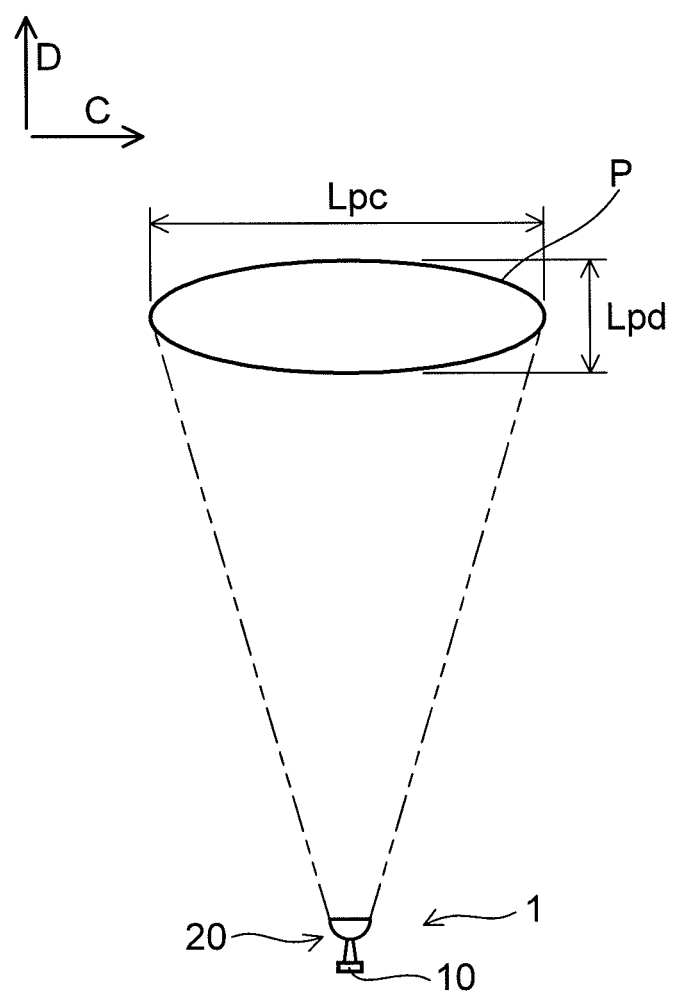
FIG. 24 is a diagram illustrating a light projection pattern produced by the light projection apparatus in the first embodiment of the invention.

Next, with reference to FIG. 24, the projection pattern of the light emitted from the light projection apparatus 1 will be described. FIG. 24 illustrates, assuming that a virtual screen is disposed at 25 m ahead of the light projection apparatus 1, a light projection pattern P on the virtual screen. The light projection pattern P obtained by projection of fluorescence by the reflecting member 23 had an elliptical shape with the length (Lpc) in the horizontal direction (direction C) three to four times as great as the length (Lpd) in the up-down direction (direction D). That is, a laterally elongate light projection pattern P was obtained. A laterally elongate light projection pattern P like this is, in a case where the light projection apparatus 1 is used as a headlamp of an automobile, necessary to efficiently illuminate the center of a road along with the side walks at left and right as well as road signs. In a case where the light exit face 21b of the light condensing member 21 has the same length in directions C and D, the light projection pattern P has a circular shape with the same length in the horizontal and up-down directions.

In this embodiment, as described above, the length Lc of the irradiated region S in direction C is greater than the length Ld of the irradiated region S in direction D. Thus, the fluorescent member 22 is excited in an area elongate in direction C. Accordingly, when the light emanating from fluorescent member 22 is reflected outside by the reflecting member 23, it is possible to obtain a light projection pattern P that is elongate in direction C (elliptical).

When, as described above, the length (width W21b) of the light exit face 21b of the light condensing member 21 in direction C is made greater than the length (height H21b) of the light exit face 21b in direction D, it is easy to make the length Lc of the irradiated region S of the fluorescent member 22 in direction C greater than the length Ld of the irradiated region S in direction D. Moreover, when the light exit face 21b of the light condensing member 21 is formed to have a smaller area than the light entrance face 21a, the laser light that has entered through the light entrance face 21a exits through the light exit face 21b in a condensed state. This helps increase the density of the laser light emanating from the light condensing member 21.

Moreover, as described above, the length (width W21b) of the light exit face 21b in direction C is three times or more as great as the length (height H21b) of the light exit face 21b in direction D. Thus, it is possible to make the length Lc of the irradiated region S in direction C three times or more as great as the length Ld of the irradiated region S in direction D. In this way, it is possible to set the ratio of the length (Lpc) of the light projection pattern P in direction C to its length (Lpd) in direction D at about three or more. For example, in headlamps for automobiles, the aspect ratio of a proper light projection pattern P is about 1 to 1:4; thus, when used as a headlamp of an automobile, the light projection apparatus 1 can illuminate ahead properly.

This embodiment is characterized in that, in a system that projects light obtained by exciting a fluorescent member with laser light, the fluorescent member is excited in a laterally elongate area (in a shape elongate in a predetermined direction) so that laterally elongate light is projected, and is further characterized in that, for more favorable implementation, a light guide member (light condensing member) having a laterally elongate light exit face is used.

Moreover, providing the reflecting member 23 as described above makes it easy to project the light emanating from the fluorescent member 22 in a desired direction.

Moreover, forming the light exit face 21b as a coarse surface or a moth-eye surface as described above helps reduce reflection on the inner side of the light exit face 21b, and thus makes it possible to take out light efficiently.

Second Embodiment

As a second embodiment, with reference to FIG. 25, a description will now be given of a case where, unlike in the first embodiment described above, the fluorescence emanating from the rear face (the face opposite from the irradiated face 22a) of the fluorescent member 22 is reflected on the reflecting member 23.

Figure 25:
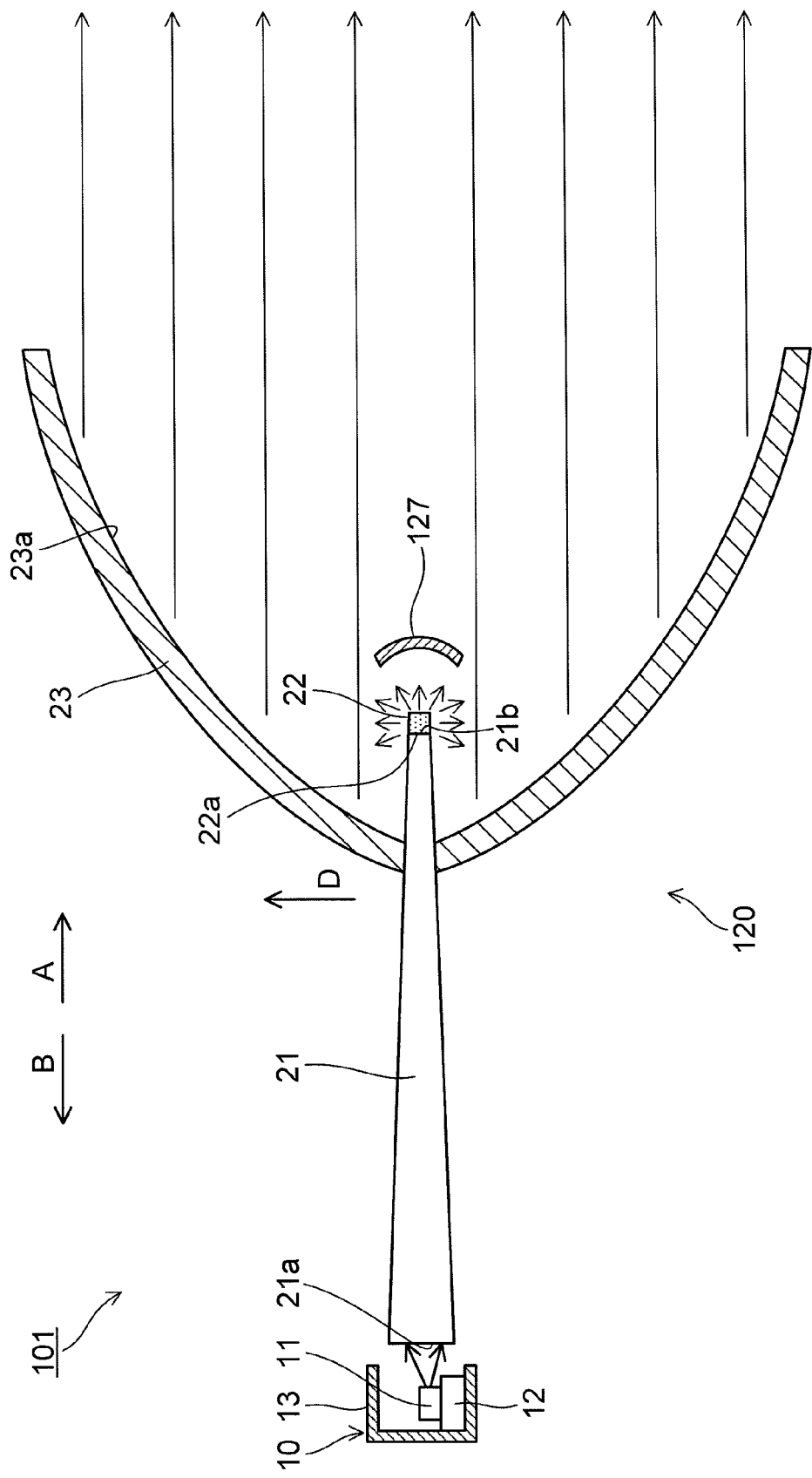
FIG. 25 is a sectional view showing the structure of a light projection apparatus in a second embodiment of the invention.

In a light projection apparatus 101 according to the second embodiment of the invention, as shown in FIG. 25, a light projection unit 120 includes a light condensing member 21, a fluorescent member 22, a reflecting member 23, and a subsidiary reflecting member 127.

The fluorescent member 22 has a thickness of about 0.1 mm to about 1 mm, and the irradiated face 22a and the rear face of the fluorescent member 22 are formed in the same size as the light exit face 21b of the light condensing member 21. The fluorescent member 22 is fixed on the light exit face 21b of the light condensing member 21. Thus, as in the first embodiment described previously, the fluorescent member 22 is excited in a rectangular area elongate in direction C (in FIG. 25, the direction perpendicular to the plane of paper). The length of the irradiated region (the entire irradiated face 22a) of the fluorescent member 22 in direction C is three times or more (here, about 3.5 times) as large as the length of the irradiated region in direction D. Fluorescence emanates from a rectangular region.

In this embodiment, the fluorescent member 22 has a lower density of phosphor particles than that in the first embodiment described previously, and when irradiated with laser light, emits fluorescence from the rear face (the face opposite from the irradiated face 22a). The fluorescent member 22 may emit fluorescence also from a side face (any of the faces that connect between the irradiated face 22a and the rear face).

The reflecting face 23a of the reflecting member 23 is formed in the shape of a paraboloid that is split on the plane perpendicularly to (crossing) the axis through its vertex and focus. The reflecting face 23a has a depth (length in direction B) of about 15 mm, and is formed in a circular shape with a radius of about 15 mm as seen from the light projection direction (direction A).

In this light projection apparatus 101, as in the light projection apparatus 1 of the first embodiment described previously, the light projection pattern P of the fluorescence projected by the reflecting member 23 has an elliptical shape with its length in horizontal direction (direction C) three to four times as large as its length in the up-down direction (direction D).

The subsidiary reflecting member 127 is disposed in front of the fluorescent member 22. The subsidiary reflecting member 127 is formed in a shape that includes part of a spherical face, and is formed in a circular shape with a diameter of about 5 mm as seen from the light projection direction (direction A). The subsidiary reflecting member 127 serves to reflect the fluorescence that tends to travel outside without striking the reflecting member 23, and the laser light that has passed through the fluorescent member 22, to direct it back to the fluorescent member 22. The light directed back to the fluorescent member 22 is scattered, or converted into fluorescence, by the fluorescent member 22, and then emanates from the fluorescent member 22 again; this time, the light emanates from the rectangular region.

In other respects, the structure and benefits of the second embodiment are similar to those of the first embodiment described previously.

Third Embodiment

As a third embodiment, with reference to FIGS. 26 to 29, a description will be given of a case where, unlike in the first and second embodiments described above, the light exit face 21b of the light condensing member 21 is formed in an elongate hexagonal shape.

Figure 26:
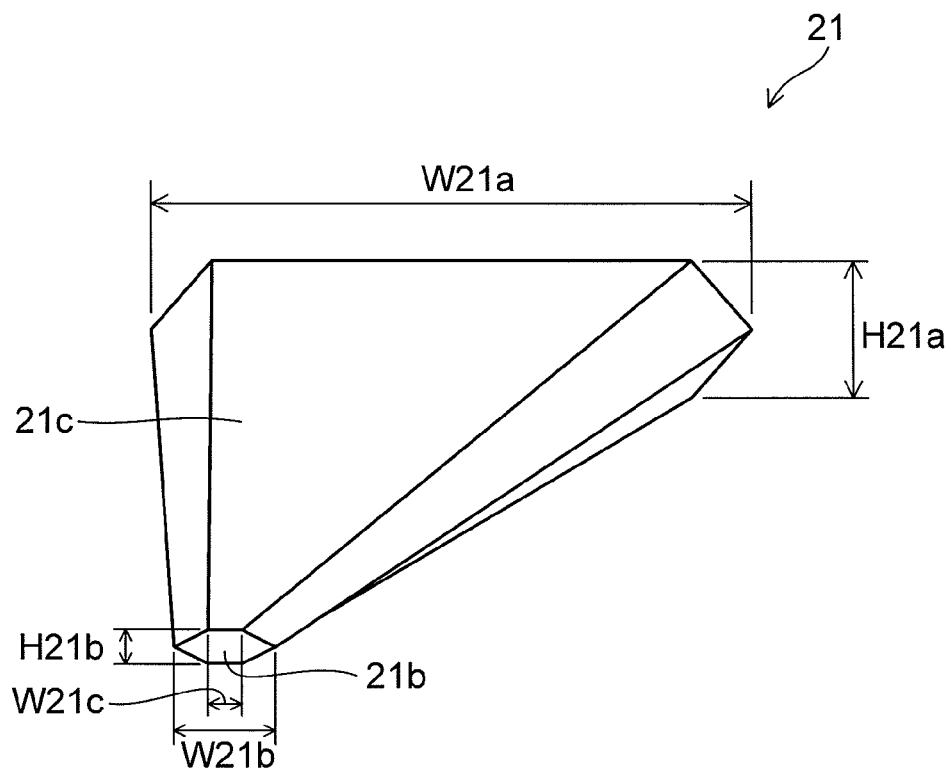
FIG. 26 is a perspective view showing the structure of a light condensing member in a third embodiment of the invention.

In the light condensing member 21 in this embodiment, as shown in FIG. 26, the light entrance face 21a and the light exit face 21b are formed in an elongate hexagonal shape. Specifically, the light entrance face 21a has a height (H21a) of about 3 mm and a width (W21a) of about 15 mm. The light exit face 21b has a height (H21b) of about 2 mm and a width (W21b) of about 6 mm. The top face 21c and the bottom face 21d have, at their light exit face 21b side end, a width (W21c) of about 2 mm.

Figure 27:
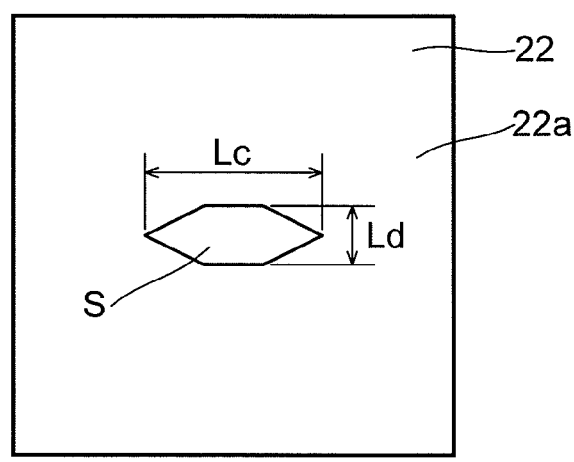
FIG. 27 is a diagram illustrating an irradiated region on a fluorescent member in the third embodiment of the invention.
Figure 28:
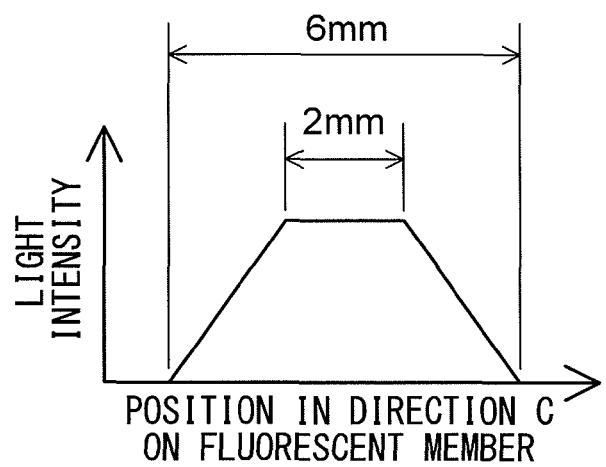
FIG. 28 is a diagram showing a light intensity distribution of laser light on a fluorescent member in the third embodiment of the invention.

Thus, when laser light is shone onto the fluorescent member 22, the irradiated region S on the fluorescent member 22 appears as shown in FIG. 27, and the length (Lc) of the irradiated region S in direction C is three times or more (here, about three times) as large as the length (Ld) of the irradiated region S in direction D. The light intensity distribution on the fluorescent member 22 in direction C is as shown in FIG. 28.

Figure 29:
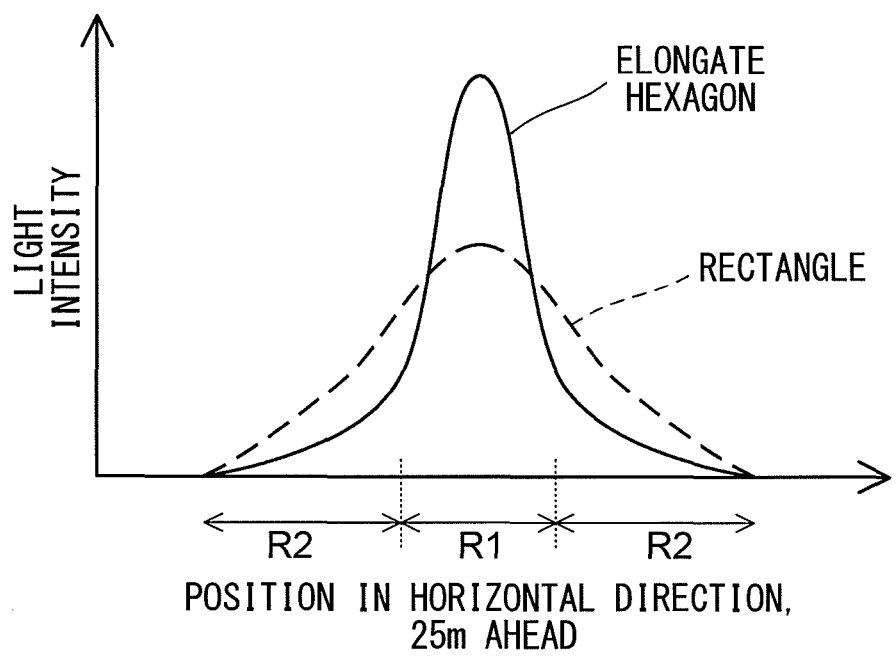
FIG. 29 is a diagram showing a light intensity distribution of fluorescence at 25 m ahead of a light projection apparatus in the third embodiment of the invention.

When the light condensing member 21 of this embodiment is used, the light intensity distribution of the fluorescence at 25 m ahead of the light projection apparatus is as plotted by the solid line in FIG. 29. In FIG. 29, the broken line plots the light intensity distribution of the fluorescence in a case where the light exit face 21b of the light condensing member 21 is formed in the shape of a rectangle with a height of about 2 mm and a width of about 6 mm. Forming the light exit face 21b in an elongate hexagonal shape (the solid-line plot in FIG. 29), as compared with forming the light exit face 21b in a rectangular shape (the broken-line plot in FIG. 29), helps increase the light intensity in a 2 m-wide front region R1 (a region corresponding to the center of a road) and reduce the light intensity in peripheral regions R2 (regions corresponding to side walks, roadside trees, road signs, etc.). That is, forming the light exit face 21b in an elongate hexagonal shape makes it possible to spread the light projection pattern in the horizontal direction (direction C), and to reduce the light unnecessarily distributed to the peripheral regions R2.

In the third embodiment, the direction in which the longest of the lines traversing the light exit face 21b and the irradiated region extends is defined as a "first direction" according to the invention. Put otherwise, a "first direction" according to the invention is the direction that is perpendicular to the light projection direction (direction A) and that is simultaneously horizontal. On the other hand, a "second direction" according to the invention can be said to be the direction that is perpendicular to the "first direction" and that is simultaneously parallel to the surface of the fluorescent member.

In other respects, the structure and benefits of the third embodiment are similar to those of the first and second embodiments described previously.

Fourth Embodiment

Next, with reference to FIGS. 30 to 33, the structure of a light projection apparatus 201 according to a fourth embodiment of the invention will be described.

Figure 30:
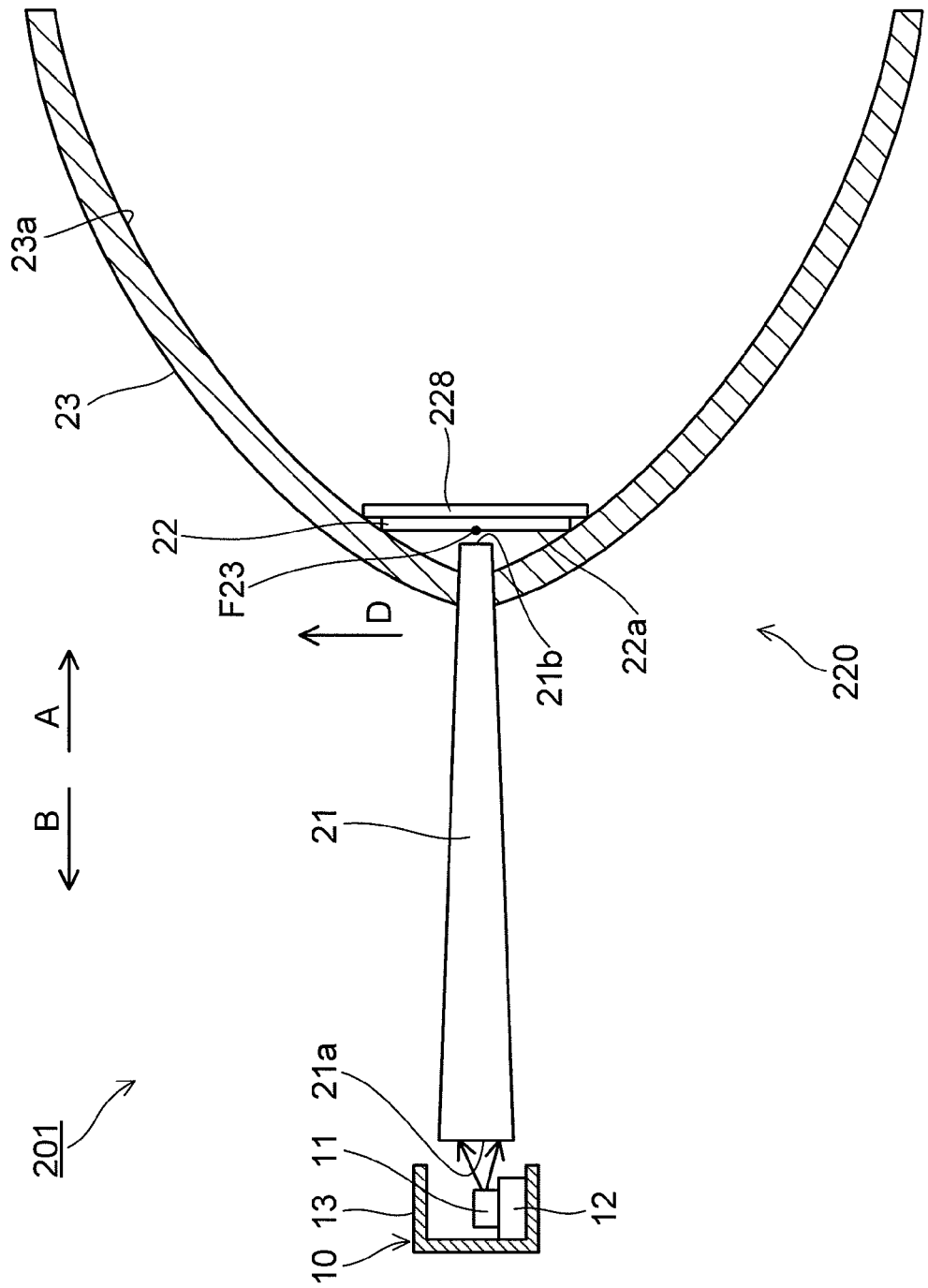
FIG. 30 is a sectional view showing the structure of a light projection apparatus in a fourth embodiment of the invention.

In the light projection apparatus 201 according to the fourth embodiment of the invention, as shown in FIG. 30, a light projecting unit 220 includes a light condensing member 21, a fluorescent member 22, a reflecting member 23, and a base plate 228 which supports the fluorescent member 22.

Figure 31:
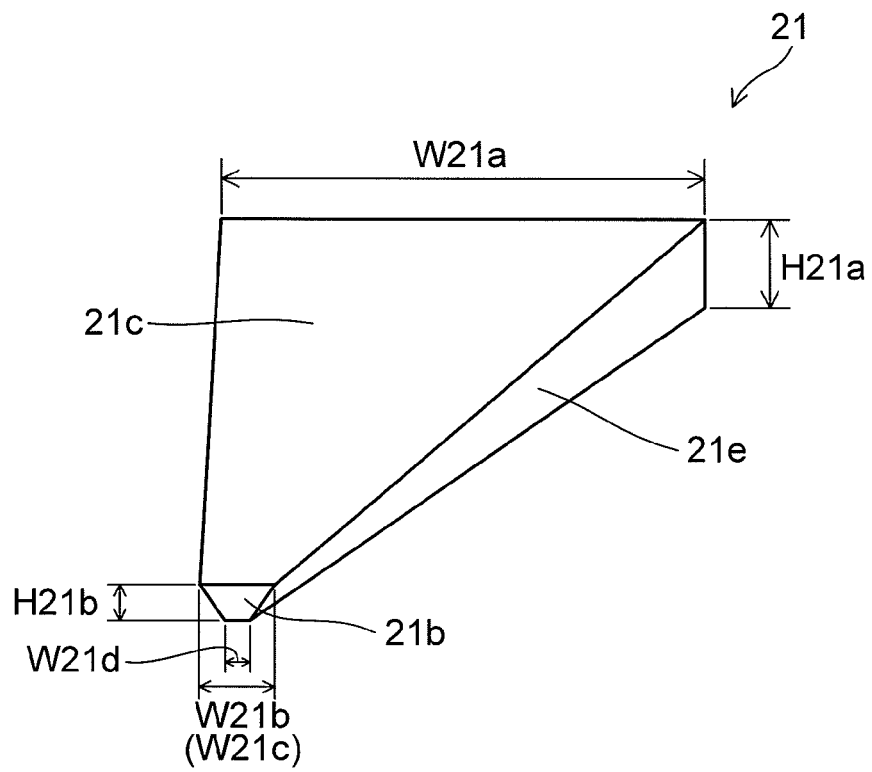
FIG. 31 is a perspective view showing the structure of a light condensing member in the fourth embodiment of the invention.

As shown in FIG. 31, in the light condensing member 21 in this embodiment, the light entrance face 21a is formed in a rectangular shape, and the light exit face 21b is formed in the shape of an inverted trapezoid. Specifically, the light entrance face 21a has a height (H21a) of about 3 mm and a width (W21a) of about 10 mm. The light exit face 21b has a height (H21b) of about 3 mm and a width (W21b) of about 3 mm. The top face 21c has, at its light exit face 21b side end, a width (W21c) of about 3 mm, and the bottom face 21d has, at its light exit face 21b side end, a width (W21d) of about 1 mm.

Figure 32:
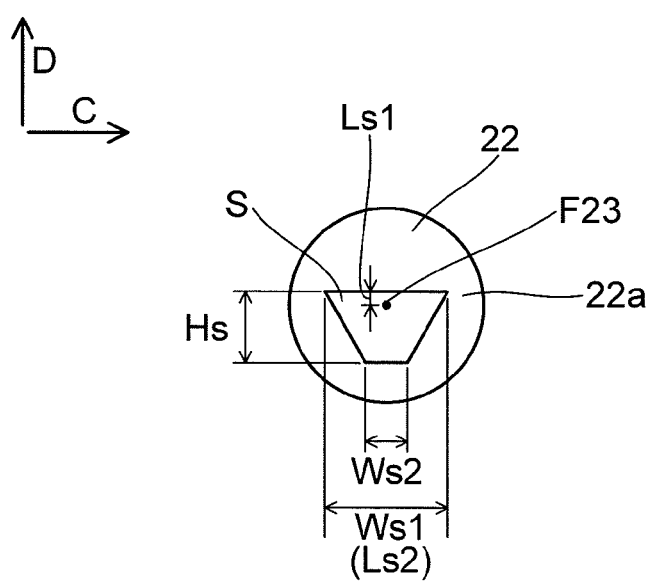
FIG. 32 is a diagram illustrating an irradiated region on a fluorescent member in the fourth embodiment of the invention.

As shown in FIG. 30, the fluorescent member 22 is disposed at a distance of about 1.9 mm from the vertex of the reflecting face 23a of the reflecting member 23, and has a diameter of about 7.5 mm. The circumferential face of the fluorescent member 22 makes contact with the reflecting face 23a of the reflecting member 23. As shown in FIG. 32, the fluorescent member 22 is disposed in a region on the reflecting member 23 which includes the focus F23 of the reflecting face 23a, and the center of the irradiated face 22a of the fluorescent member 22 approximately coincides with the focus F23 of the reflecting face 23a. The fluorescent member 22 is provided on the base plate 228. The fluorescent member 22 is formed, for example, by applying and then curing resin containing phosphor particles to the base plate 228.

As shown in FIG. 30, the base plate 228 has a function of transmitting the fluorescence emanating from the fluorescent member 22, and is fixed to the reflecting face 23a of the reflecting member 23.

The reflecting face 23a of the reflecting member 23 is formed in the shape of a paraboloid that is split on the plane perpendicular to (crossing) the axis through its vertex and focus. The reflecting face 23a has a depth (length in direction B) of about 30 mm, and is formed substantially in a circular shape with a radius of about 15 mm as seen from the light projection direction (direction A).

In this embodiment, when laser light is shone onto the fluorescent member 22, as shown in FIG. 32, the irradiated region S on the fluorescent member 22 has the shape of an inverted trapezoid. Specifically, the irradiated region S has a height (Hs) of about 3 mm, the upper side of the irradiated region S has a width (Ws1) of about 3 mm, and the lower side of the irradiated region S has a width (Ws2) of about 1 mm.

The center of the irradiated region S is located at a position deviated from the focus F23 of the reflecting face 23a. Specifically, the length (Ls1) from the focus F23 to the end of the irradiated region S in direction D (third direction) is smaller than one-half of the length (Ls2 (=Ws1)) of the irradiated region S in direction C (fourth direction). That is, the irradiated region S is formed so as to spread in the left-right direction and in the downward direction (toward the ground) with respect to the focus F23.

Figure 33:
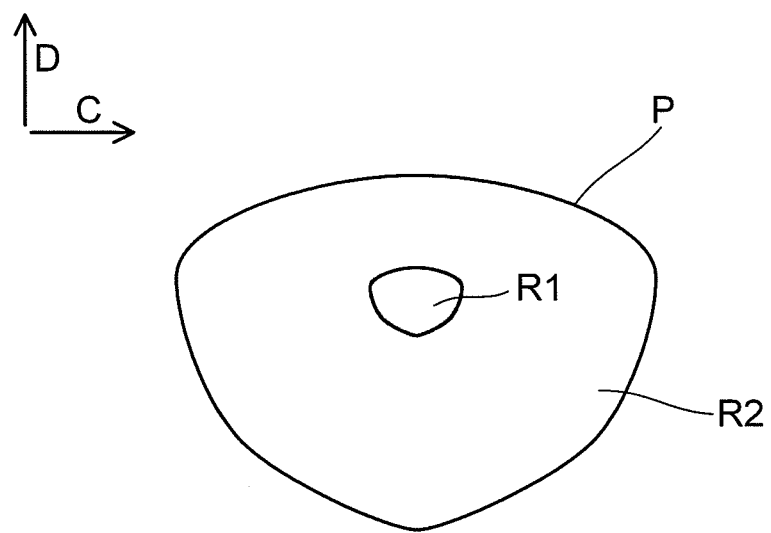
FIG. 33 is a diagram illustrating a light projection pattern produced by a light projection apparatus in the fourth embodiment of the invention.

Thus, the light projection pattern at 25 m ahead of the light projection apparatus 201 is as shown in FIG. 33. Specifically, the light projection pattern P does not spread in the upward direction, but spreads in the left-right direction (in the horizontal direction) and in the downward direction. Thus, it is possible to illuminate an area around a road while reducing unnecessary illumination toward the sky (upward). The light intensity in a front region R1 with a diameter of about 2 m (a region corresponding to the center of a road) is high, and the light intensity in peripheral regions R2 (regions corresponding to side walks, roadside trees, road signs, etc.) is low.

In other respects, the structure of the fourth embodiment is similar to that of the first to third embodiment described previously.

In this embodiment, as described above, the length (Ls1) from the focus F23 of the reflecting face 23a to the end of the irradiated region S in direction D is smaller than one-half of the length (Ls2) of the irradiated region S in direction C, which is perpendicular to direction D. Thus, the distance from the end of the irradiated region S in direction D to the focus F23 of the reflecting face 23a is shorter than the distance from the end of the irradiated region S in direction C to the focus F23 of the reflecting face 23a. Thus, it is possible to make the length (Lpd) of the light projection pattern P in direction D smaller than the length (Lpc) of the light projection pattern P in direction C. That is, it is possible to obtain a light projection pattern P that is elongate in direction C (elliptical).

In other respects, the benefits of the fourth embodiment are similar to those of the first to third embodiment described previously.

Fifth Embodiment

Next, with reference to FIGS. 34 to 38, the structure of a light projection apparatus 301 according to a fifth embodiment of the invention will be described.

Figure 34:
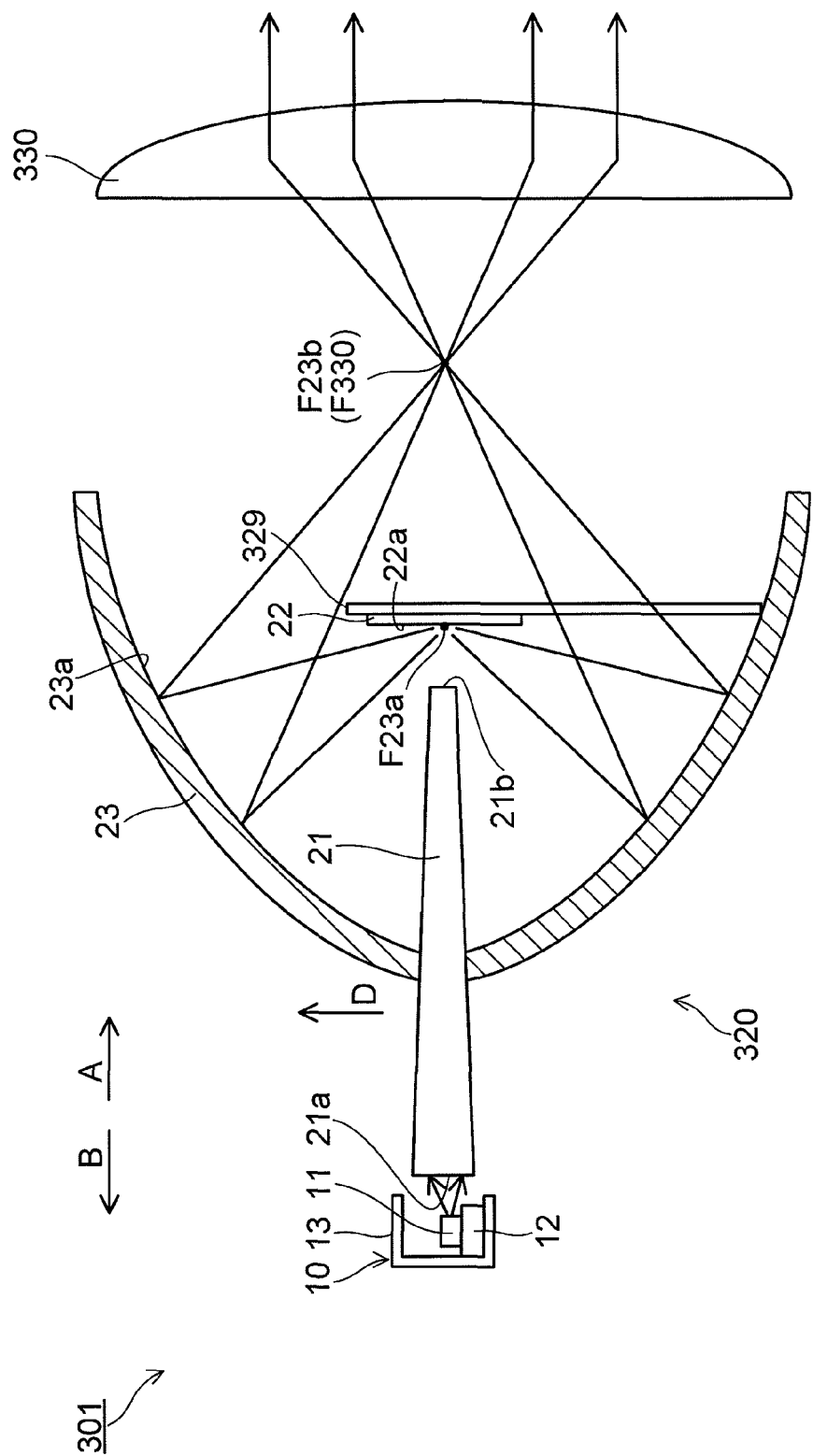
FIG. 34 is a sectional view showing the structure of a light projection apparatus in a fifth embodiment of the invention.

In the light projection apparatus 301 according to the fifth embodiment of the invention, as shown in FIG. 34, a light projecting unit 320 includes a light condensing member 21, a fluorescent member 22, a reflecting member 23, a support member 329 which supports the fluorescent member 22, and a lens (projection lens) 330.

Figure 35:
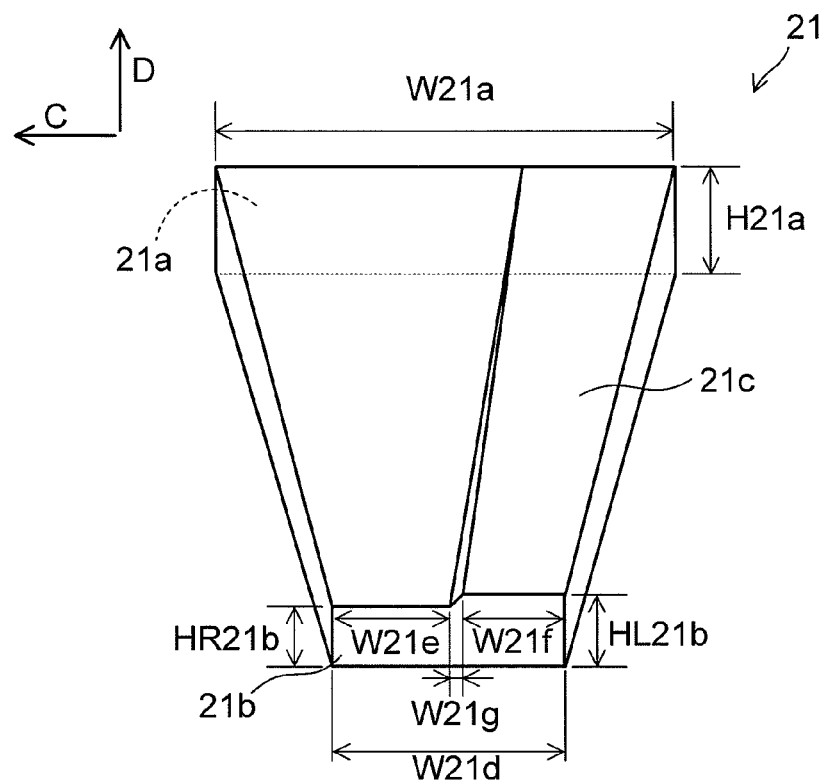
FIG. 35 is a perspective view showing the structure of a light condensing member in the fifth embodiment of the invention.

In the light condensing member 21 in this embodiment, as shown in FIG. 35, the light entrance face 21a is formed in a rectangular shape. Unlike in the embodiments described previously, the light exit face 21b is formed so as to be asymmetric in the left-right direction, and is formed in a shape corresponding to a light projection pattern P of a low beam (a passing-by headlamp). Specifically, the light entrance face 21a has a height (H21a) of about 3 mm and a width (W21a) of about 10 mm. Moreover, the light exit face 21b is formed in a shape having an upper right part thereof cut out, so as to have different heights at left and right. Here, left denotes the left side (opposite to direction C) of an automobile pointing in its travel direction, and corresponds to the right side in FIG. 35; right denotes the right side (in direction C) of an automobile pointing in its travel direction, and corresponds to the left side in FIG. 35. Of the light exit face 21b, a left part has a height (HL21b) of about 1.9 mm, and a right part has a height (HR21b) of about 1.5 mm. The bottom face 21d has, at its light exit face 21b side end, a width (W21d) of about 6 mm. In FIG. 35, the width W21e is about 3 mm, the width W21f is about 2.6 mm, and the width W21g is about 0.4 mm.

In this embodiment, the light intensity distribution of the laser light on the light exit face 21b of the light condensing member 21 is even as in the first embodiment described previously.

As shown in FIG. 34, the fluorescent member 22 is disposed in a region on the reflecting member 23 which includes the first focus F23a of the reflecting face 23a. The fluorescent member 22 is provided on a bar-form support member 329 made of, for example, metal. The fluorescent member 22 is formed, for example, by applying and then curing resin containing phosphor particles to the support member 329. The support member 329 is fixed on the reflecting face 23a of the reflecting member 23. The support member 329 may instead be formed of a material, such as glass or resin, that transmits the light emanating from the fluorescent member 22.

Figure 36:
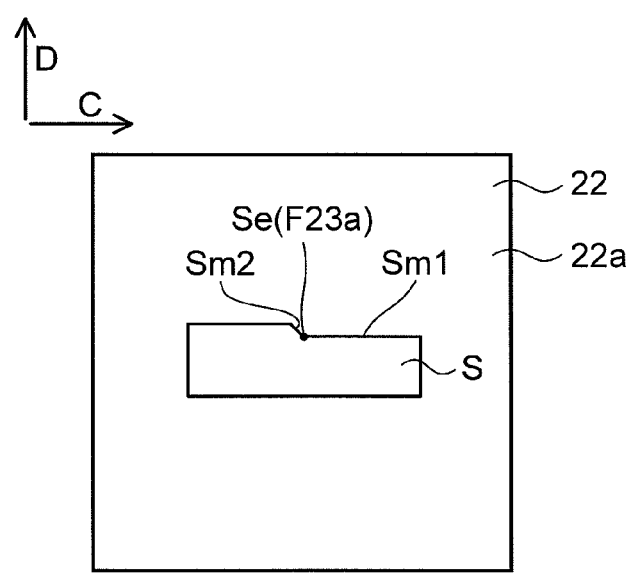
FIG. 36 is a diagram illustrating an irradiated region on a fluorescent member in the fifth embodiment of the invention.

In this embodiment, when laser light is shone onto the fluorescent member 22, the irradiated region S on the fluorescent member 22 appears asymmetric in the left-right direction as shown in FIG. 36. Specifically, like the light exit face 21b of the light condensing member 21, the irradiated region S is formed so that its projection image is a light projection pattern P of a low beam (a passing-by headlamp), and has a shape having an upper right portion thereof cut out. Moreover, in the irradiated region S, lines Sm1 and Sm2 and a point Se are formed whose projection images are cut-off lines M1 and M2 and an elbow point E, which will be described later, in the light projection pattern P. These lines Sm1 and Sm2 form part of the edges of the irradiated region S. The point Se is the intersection between the lines Sm1 and Sm2.

As shown in FIG. 34, the reflecting face 23a of the reflecting member 23 is formed so as to include part of an ellipsoid. Specifically, the reflecting face 23a is formed in the shape of an ellipsoid that is split on the plane perpendicular to (crossing) the axis through its first focus F23a and second focus F23b. The reflecting face 23a has a depth (length in direction B) of about 30 mm, and is formed in a circular shape with a radius of about 15 mm as seen from the light projection direction (direction A).

The first focus F23a of the reflecting face 23a of the reflecting member 23 is located so as to approximately coincide with the point Se (the intersection between the lines Sm1 and Sm2) in the irradiated region S on the fluorescent member 22. In other words, the first focus F23a is located at a position in the irradiated region S from where the elbow point E, which will be described later, in the light projection pattern P is projected.

The lens 330 is disposed in front of the reflecting member 23. The lens 330 has a radius of about 15 mm. The focus F330 of this lens 330 approximately coincides with the second focus F23b of the reflecting face 23a of the reflecting member 23. The lens 330 may be a planoconvex lens, a biconvex lens, or a lens of any other shape.

Figure 37:
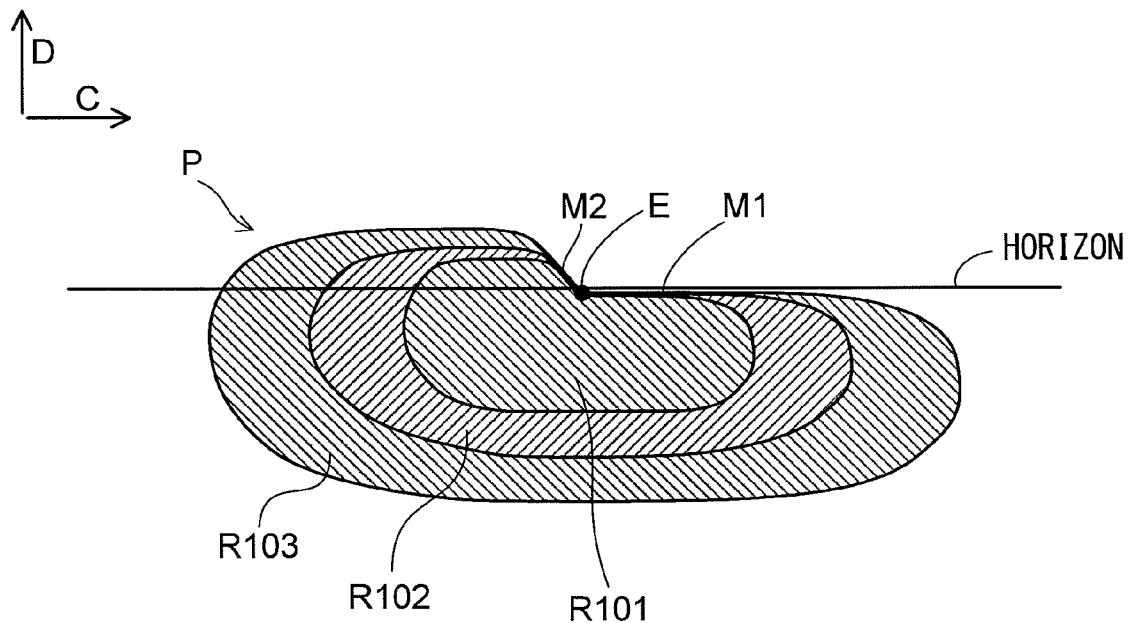
FIG. 37 is a diagram illustrating a light projection pattern at 25 m ahead of a light projection apparatus in the fifth embodiment of the invention.

In this embodiment, the light emanating from the irradiated region S on the fluorescent member 22 is reflected on the reflecting face 23a of the reflecting member 23, passes through the second focus F23b of the reflecting face 23a, and is projected by the lens 330. The light projection pattern P at 25 m ahead of the light projection apparatus 301 has, as shown in FIG. 37, a shape that reflects the irradiated region S.

Specifically, the light projection pattern P does not spread in a right-upward direction but spreads in the left-right direction (horizontal direction) and in the downward direction. In this light projection pattern P, illuminance sharply changes at the cut-off lines M1 and M2, so that the region above the cut-off lines M1 and M2 is not irradiated with illumination light. That is, the light projection pattern P is formed in a shape having an upper right part thereof cut out. This helps suppress glare light that reaches a passing-by driver. Moreover, illuminance is highest in a region R101 (a region right ahead of an automobile) near the elbow point E, which is the intersection between the cut-off lines M1 and M2, and decreases away from the region R101. Thus, illuminance is increasingly low in regions R101, R102, and R103 in this order.

Figure 38:
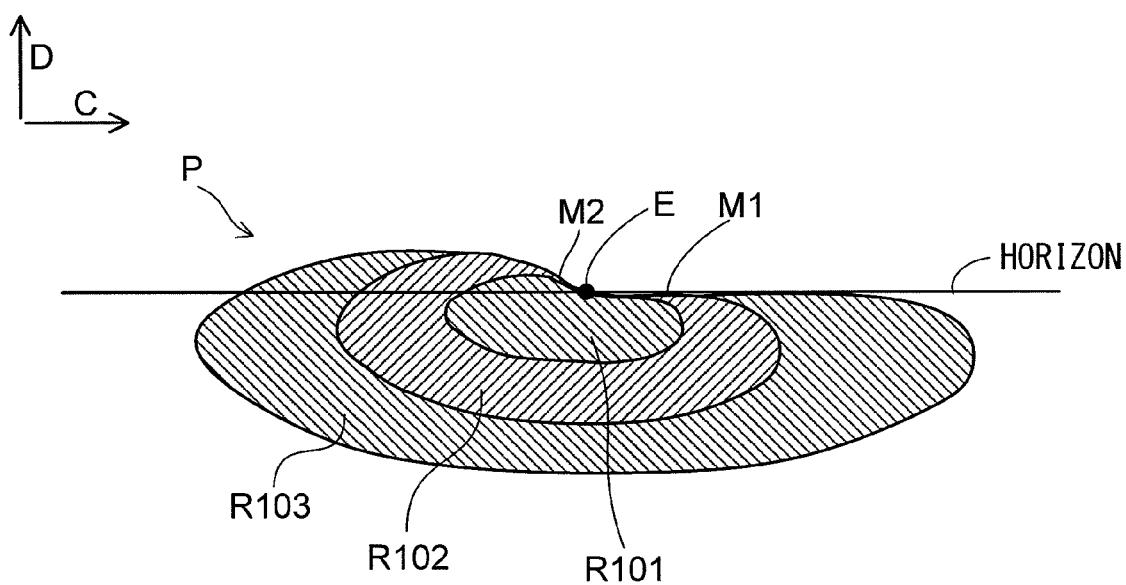
FIG. 38 is a diagram illustrating a light projection pattern required in a low beam of an automobile.

In left-hand traffic countries such as Japan, a low beam of an automobile is required to have a light projection pattern P having an upper right part thereof cut out as shown in FIG. 38. The cut-off lines M1 and M2 need to be such that illuminance changes sharply at them so that no glare light reaches a passing-by driver.

As described above, the light projection apparatus 301 of this embodiment provides a satisfactory light projection pattern P as required in a low beam of an automobile.

In other respects, the structure of the fifth embodiment is similar to that of the first to fourth embodiments described previously.

In this embodiment, as described above, the light exit face 21b has a shape that is asymmetric in the left-right direction. This makes it easy to give the irradiated region S a shape that is asymmetric in the left-right direction, and thus it is easy to give the light projection pattern P a shape that is asymmetric in the left-right direction.

Moreover, as described above, the first focus F23a of the reflecting face 23a of the reflecting member 23 is located on the lines Sm1 and Sm2 on the irradiated region S from where the cut-off lines M1 and M2 in the light projection pattern P are projected. This is particularly effective because it permits a sharp change in illuminance at the cut-off lines M1 and M2.

Moreover, as described above, the first focus F23a of the reflecting face 23a of the reflecting member 23 is located at a position on the irradiated region S from where the elbow point E in the light projection pattern P is projected. This is more effective because it permits a sharp change in illuminance near the elbow point E. Moreover, the highest illuminance is obtained near the elbow point. That is, a region (region R101) right ahead of an automobile can be illuminated with the highest illuminance. Moreover, by locating the first focus F23a at a position on the irradiated region S (the center of the irradiated region S in the left-right direction) from which the elbow point E in the light projection pattern P is projected, it is possible to make a lower part of the light projection pattern P substantially symmetric in the left-right direction.

Moreover, as described above, the light emanating from the irradiated region S is reflected on the reflecting face 23a, passes through the second focus F23b of the reflecting face 23a, and is projected by the lens 330. Here, since the second focus F23b of the reflecting face 23a coincides with the focus F330 of the lens 330, it is easier for the light projection pattern P formed by the lens 330 to reflect the shape of the irradiated region S. Projecting light by use of the lens 330, as compared with projecting light with the reflecting member 23 without providing the lens 330, makes it easier for the light projection pattern P to reflect the shape of the irradiated region S. Moreover, providing the reflecting member 23, compared with projecting light with the lens 330 without providing the reflecting member 23, makes it possible to use more of the light emanating from the fluorescent member 22 as illumination light. This helps improve the efficiency of use of light.

In other respects, the benefits of the fifth embodiment are similar to those of the first to fourth embodiments described previously.

Sixth Embodiment

Next, with reference to FIGS. 39 and 40, the structure of a light projection apparatus 401 according to a sixth embodiment of the invention will be described.

Figure 39:
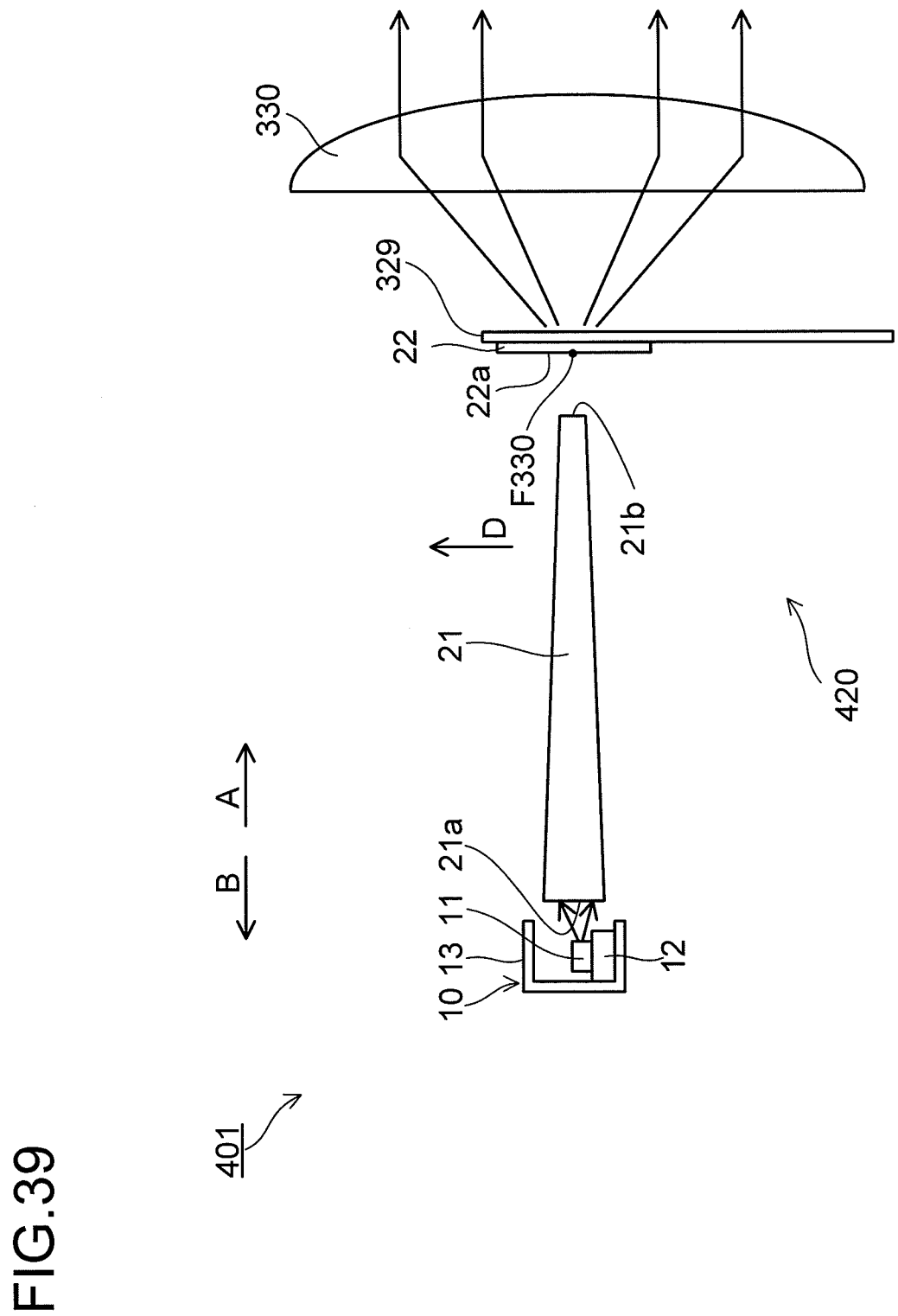
FIG. 39 is a sectional view showing the structure of a light projection apparatus in a sixth embodiment of the invention.

In the light projection apparatus 401 according to the sixth embodiment of the invention, as shown in FIG. 39, a light projection unit 420 includes a light condensing member 21, a fluorescent member 22, a support member 329 which supports the fluorescent member 22, and a lens 330.

The support member 329 is formed so as to transmit the light emanating from the fluorescent member 22. The support member 329 may instead be formed so as to shield (absorb) only excited light.

The lens 330 is disposed in front of the fluorescent member 22. The focus F330 of this lens 330 is located so as to approximately coincide with the point Se (the intersection between the lines Sm1 and Sm2) in the irradiated region S on the fluorescent member 22.

Figure 40:
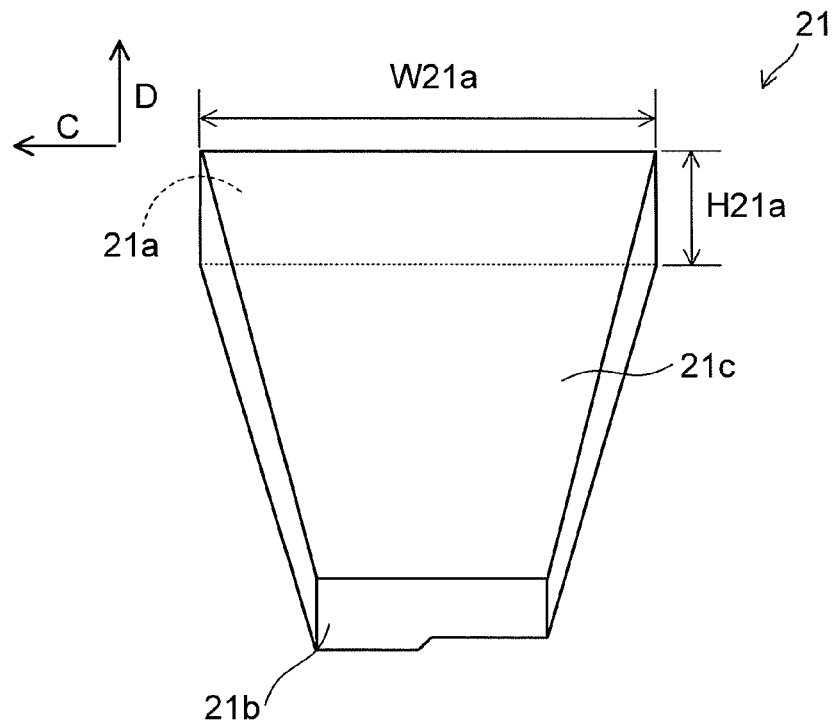
FIG. 40 is a perspective view showing the structure of a light condensing member in the sixth embodiment of the invention.

As shown in FIG. 40, the light condensing member 21 in this embodiment is disposed as if the light condensing member 21 in the fifth embodiment described previously were rotated by 180 degrees. This is because, in the light projection apparatus 401, the shape of the irradiated region S on the fluorescent member 22 is reflected, in a state rotated by 180 degrees, in the light projection pattern P.

In this light projection apparatus 401, the light emanating from the rear face of the reflecting member 23 is projected by the lens 330.

In other respects, the structure of the sixth embodiment is similar to that of the fifth embodiment described previously.

In this embodiment, as described above, the focus F330 of the lens 330 is located in the irradiated region S. Thus, the light projection pattern P formed by the lens 330 reflects the shape of the irradiated region S. Projecting light by use of the lens 330, as compared with projecting light with the reflecting member 23 without providing the lens 330, makes it easier for the light projection pattern P to reflect the shape of the irradiated region S.

In other respects, the benefits of the sixth embodiment are similar to those of the fifth embodiment described previously.

Seventh Embodiment

Next, with reference to FIG. 41, the structure of a light projection apparatus 501 according to a seventh embodiment of the invention will be described.

Figure 41:
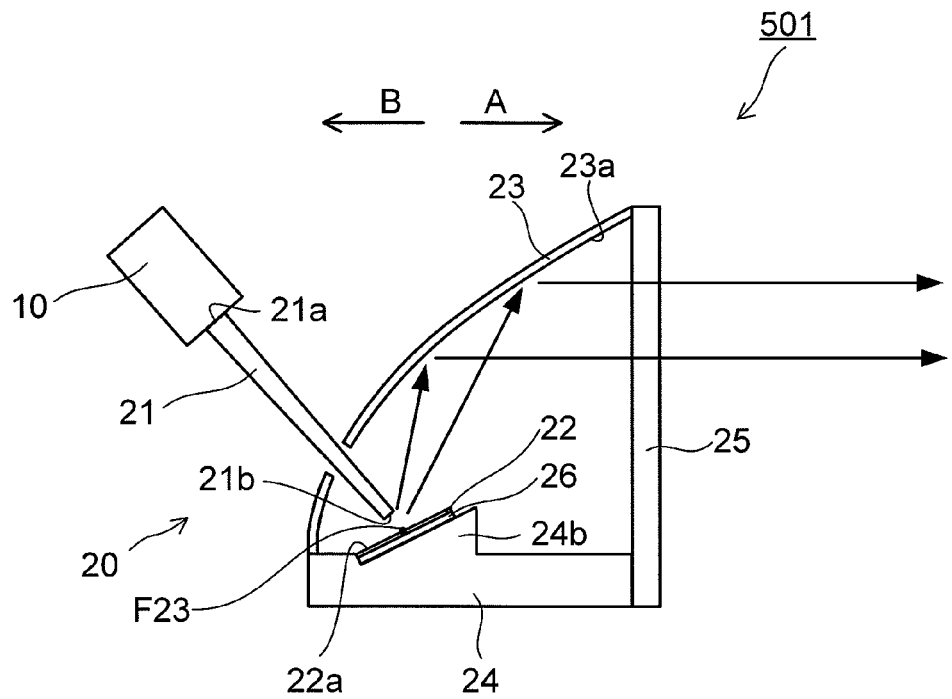
FIG. 41 is a sectional view showing the structure of a light projection apparatus in a seventh embodiment of the invention.

In the light projection apparatus 501 according to the seventh embodiment of the invention, as shown in FIG. 41, a light condensing member 21 is formed in a similar manner to the light condensing member 21 in the sixth embodiment described previously.

A reflecting member 23 is formed in a similar manner to the reflecting member 23 in the first embodiment described previously.

As in the fifth and sixth embodiments described previously, the focus F23 of the reflecting face 23a of the reflecting member 23 is located so as to approximately coincide with the point Se (the intersection between the lines Sm1 and Sm2) in the irradiated region S on the fluorescent member 22.

In this embodiment, the light emanating from the irradiated region S on the fluorescent member 22 is projected by being reflected on the reflecting face 23a of the reflecting member 23.

In other respects, the structure of the seventh embodiment is similar to that of the first embodiment described previously.

The benefits of the seventh embodiment are similar to those of the first and fifth embodiments described previously.

It should be understood that the first to seventh embodiments presented above are in every respect only illustrative and not restrictive. The scope of the present invention is defined not by the description of the first to seventh embodiments presented above but by the appended claims, and encompasses all variations and modifications made within the spirit and scope equivalent to the claims.

For example, although the first to seventh embodiments presented above deal with examples where a light projection apparatus according to the invention is used as a headlamp of an automobile, this is not meant to be any limitation. A light projection apparatus according to the invention may be used as a headlamp of an airplane, ship, robot, motorcycle, bicycle, or any other mobile body.

Although the first to seventh embodiments presented above deal with examples where a light projection apparatus according to the invention is applied to a headlamp, this is not meant to be any limitation. A light projection apparatus according to the invention may be applied to a downlight, spotlight, or any other type of light projection apparatus.

Although the first to seventh embodiments presented above deal with examples where the exciting light is converted into visible light, this is not meant to be any limitation; the exciting light may instead be converted into any light other than visible light. For example, a design that converts the exciting light into infrared light finds application in, for example, night vision illumination apparatus for surveillance CCD cameras.

Although the first to seventh embodiments presented above deal with examples where the exciting light source (semiconductor laser element) and the fluorescent member are designed to emit white light, this is not meant to be any limitation. The exciting light source and the fluorescent member may be designed to emit light other than white light.

Although the first to seventh embodiments presented above deal with examples where a semiconductor laser element is used as the laser generator for emitting laser light, this is not meant to be any limitation; any laser generator other than a semiconductor laser element may instead be used.

All specific values mentioned above in connection with the first to seventh embodiments presented above are merely examples, and are not meant to be any limitation.

In the first to seventh embodiments presented above, the center wavelength of the laser light emitted by the semiconductor laser element, and the kind of phosphor used in the fluorescent member, may be changed as desired. For example, it is possible to use a semiconductor laser element that emits blue laser light with a center wavelength of about 450 nm in combination with a phosphor that converts part of the blue laser light into yellow light. In a case where the exciting light (laser light) is diffused by the fluorescent member sufficiently to be safe, no filter member for shielding the exciting light needs to be provided. In that case, blue and yellow light produces white light. One example of the phosphor that converts part of blue laser light into yellow light is $(Y_{1-x-y}Gd_xCe_y)_3Al_5O_{12}$ ($0.1 \leq x \leq 0.55$, $0.01 \leq y \leq 0.4$). This is not meant to be any limitation; the center wavelength of the laser light emitted by the semiconductor laser element may be selected as desired within the spectrum ranging from ultraviolet to visible light.

Figure 42:
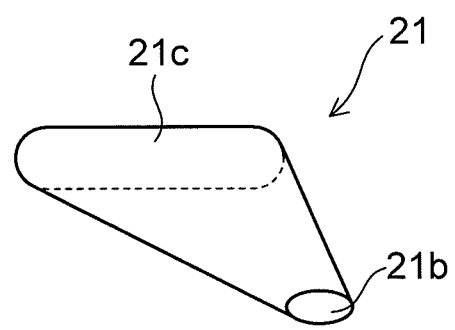
FIG. 42 is a perspective view showing the structure of a light condensing member in a first modified example of the invention.

Although the first to seventh embodiments presented above deal with examples where the light exit face of the light condensing member are formed in the shape of a rectangle, elongate hexagon, or the like, this is not meant to be any limitation. For example, as in a light condensing member 21 according to a first modified example of the invention shown in FIG. 42, the light exit face 21b may be formed in an elliptical shape. The light exit face may be formed to be asymmetric in both the up-down and left-right directions. The shape of the light exit face may be set such that it produces a desired light projection pattern.

Figure 43:
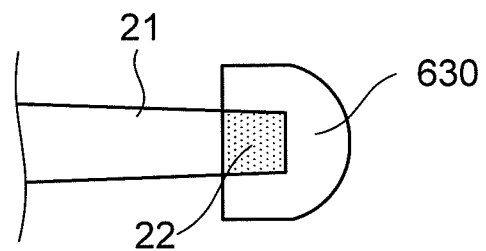
FIG. 43 is a diagram showing a part, around a lens, of a light projection apparatus in a second modified example of the invention.
Figure 44:
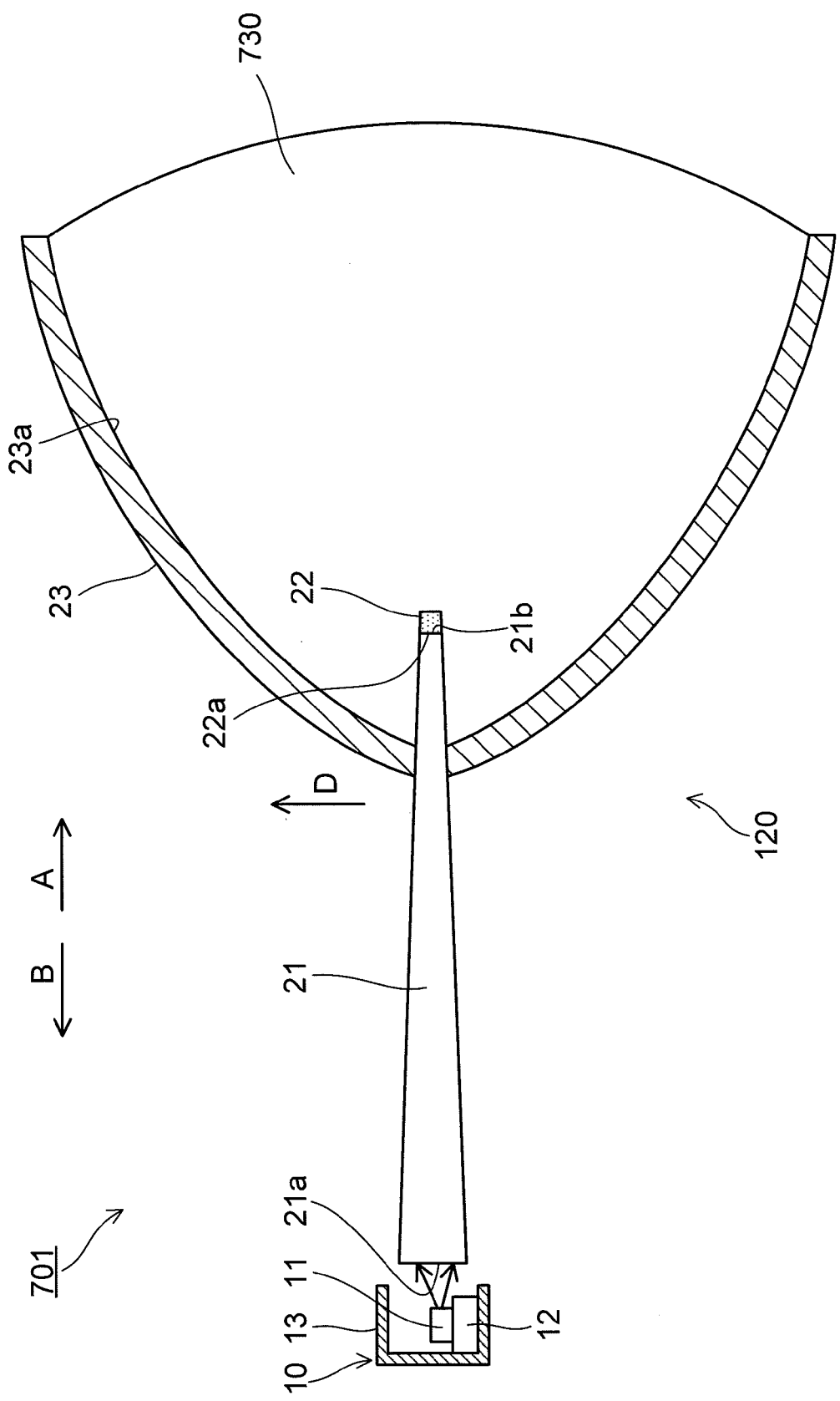
FIG. 44 is a sectional view showing the structure of a light projection apparatus in a third modified example of the invention.

Although the fifth to seventh embodiments presented above deal with examples where a lens is provided at a predetermined distance from the fluorescent member, this is not meant to be any limitation. For example, as in a light projection apparatus according to a second modified example of the invention shown in FIG. 43, a lens 630 (light projecting member) may be provided so as to cover the fluorescent member 22. With this design, the light emanating from the fluorescent member 22 passes through, and is refracted by, the lens 630 to be projected outside, producing an elongate light projection pattern. Or as in a light projection apparatus 701 according to a third modified example of the invention shown in FIG. 44, the hollow space inside the reflecting face 23a of the reflecting member 23 may be filled with resin, glass, or the like so as to form a lens 730. Or as in the fifth to seventh embodiments presented above, a projection lens (unillustrated) may be disposed in front of the fluorescent member 22. As a light projecting member, a prism or the like may be used instead of a reflecting member or a lens.

Although the first to seventh embodiments presented above deal with examples where the reflecting face of the reflecting member is formed as part of a paraboloid or part of an ellipsoid, this is not meant to be any limitation. The reflecting face may instead be formed as a multiple reflector composed of a number of curved surfaces (such as paraboloids), or as a free-form curved-surface reflector composed of a number of minuscule flat surfaces provided contiguously.

Figure 45:
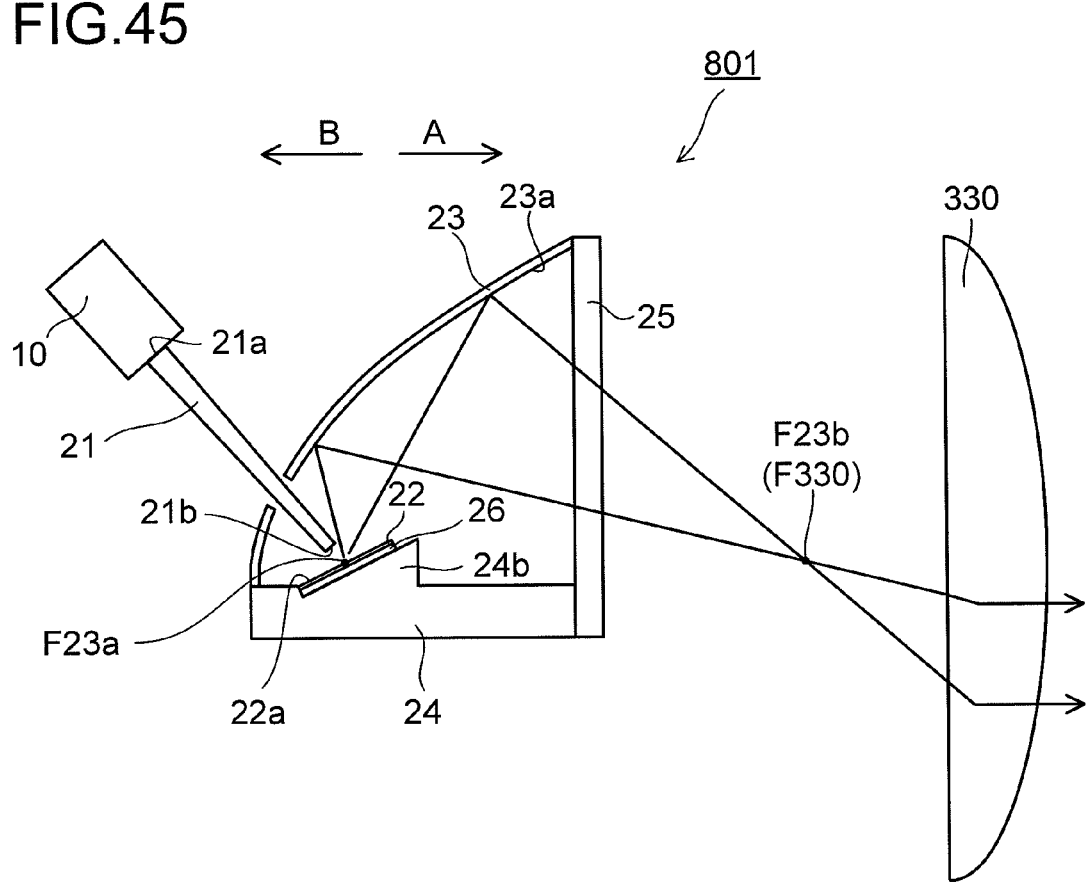
FIG. 45 is a sectional view showing the structure of a light projection apparatus in a fourth modified example of the invention.

Although the fifth embodiment presented above deals with an example where the reflecting face 23a of the reflecting member 23 is formed in a circular shape as seen from the light projection direction (direction A), this is not meant to be any limitation. For example, as in a light projection apparatus 801 according to a fourth modified example of the invention shown in FIG. 45, the reflecting face 23a of the reflecting member 23 may be formed so as to include part of an ellipsoid and substantially in a semicircular shape as seen from the light projection direction. In this light projection apparatus 801, as in the fifth embodiment presented above, the first focus F23a of the reflecting face 23a of the reflecting member 23 approximately coincides with the point Se in the irradiated region S on the fluorescent member 22. Moreover, the focus F330 of the lens 330 approximately coincides with the second focus F23b of the reflecting face 23a of the reflecting member 23. The upper half of the lens 330 may be omitted.

Figure 46:
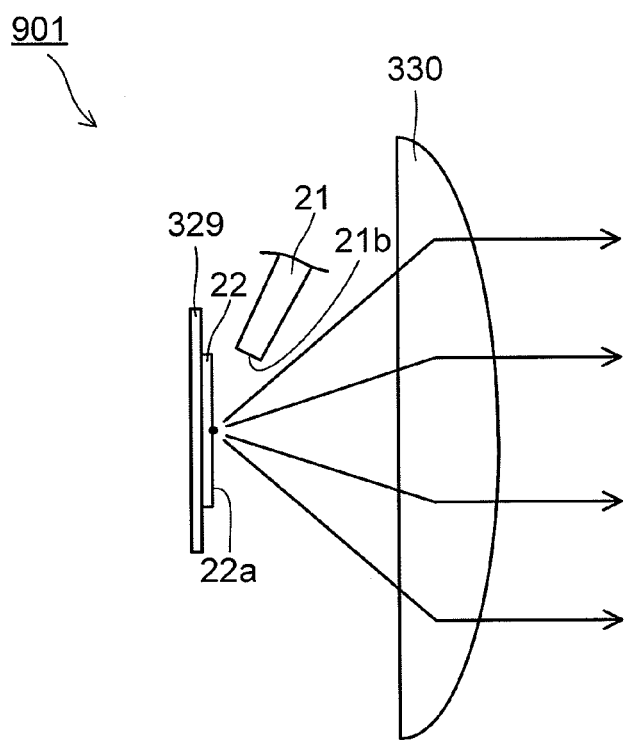
FIG. 46 is a sectional view showing the structure of a light projection apparatus in a fifth modified example of the invention.

Although the sixth embodiment presented above deals with an example where no reflecting member 23 is provided and instead the light emanating from the rear face of the fluorescent member 22 is projected by the lens 330, this is not meant to be any limitation. For example, as in a light projection apparatus 901 according to a fifth modified example of the invention shown in FIG. 46, the fluorescent member 22 may be irradiated with laser light from the lens 330 side so that the light emanating from the irradiated face 22a of the fluorescent member 22 may be projected by the lens 330 without the use of a reflecting member 23.

Although the fifth to seventh embodiments presented above deal with examples where no light shielding plate is used but instead the light projection pattern is formed in a shape having an upper right part thereof cut out, this is not meant to be any limitation. For example, a light shielding plate may be provided between a reflecting member (or fluorescent member) and a lens. With this design, illuminance can be changed more sharply at the edge of the light projection pattern, or a more complicated light projection pattern can be obtained. Forming the light exit face of the light condensing member in a shape corresponding to a light projection pattern as in the fifth to seventh embodiments described above makes it possible to set the shape of the irradiated region and the shape of the light projection pattern in advance, and thus helps reduce the amount of light shielded by the light shielding plate. This helps suppress lowering of the efficiency of use of light.

Although the fifth to seventh embodiments presented above deal with examples where, assuming application in left-hand traffic countries such as Japan, a light projection pattern having an upper right part thereof cut out is obtained, this is not meant to be any limitation. For application in right-hand traffic countries, the shape of the light exit face of the light condensing member may be reversed in the left-right direction to obtain a light projection pattern having an upper left part thereof cut out.

Although the first to seventh embodiments presented above deal with examples where a plurality of semiconductor laser elements are used as an exciting light source, this is not meant to be any limitation. A single semiconductor layer may instead be used as an exciting light source. Or a so-called semiconductor laser array provided with a plurality of light emitting portions may be used as an exciting light source.

Although the first to seventh embodiments presented above deal with examples where the laser light that has entered the light condensing member through the light entrance face is guided to the light exit face by being reflected on the top, bottom, and side faces, this is not meant to be any limitation. The light condensing member may be formed so that its refractive index smoothly or gradually decreases radially from center to edge, like a graded-index optical fiber, in order to alter the travel direction of the laser light inside the light condensing member so as to guide it to the light exit face.

Although the first to seventh embodiments presented above deal with examples where the fluorescent member is excited in a laterally elongate area (in a horizontally elongate shape), this is not meant to be any limitation. The fluorescent member may be excited, for example, in a longitudinally elongate area (a vertically elongate shape), or may be excited in an obliquely elongate shape.

The fifth to seventh embodiments presented above deal with examples where, in a light projection apparatus that produces an elongate light projection pattern, the focus of the light projecting member is located at the edge of the irradiated region. There, as described above, illuminance can be changed sharply at the part (cut-off lines) of the light projection pattern which corresponds to the edge of the irradiated region where the focus of the light projecting member is located. Also in a light projection apparatus that produces a light projection pattern other than rectangular, locating the focus of the light projecting member at the edge (or near the edge) of the irradiated region provides a similar effect. Specifically, in a light projection apparatus including a fluorescent member which is excited by exciting light and a light projecting member which reflects or transmits the light emanating from the fluorescent member to project it outside, wherein the fluorescent member includes an irradiated region which is irradiated with the exciting light and the light projecting member has its focus located at or near the edge of the irradiated region, at the part of the light projection pattern which corresponds to the edge of the irradiated region at which the focus of the light projecting member is located, illuminance can be changed sharply. Needless to say, this applies also in cases where the exciting light source is a light source other than a laser light source (for example, a light emitting diode).

Eighth Embodiment

Now, with reference to FIGS. 47 to 67, the structure of a light emitting apparatus 1001 according to an eighth embodiment of the invention will be described. For the sake of simple illustration, not all semiconductor laser elements 11 are always illustrated.

Figure 47:
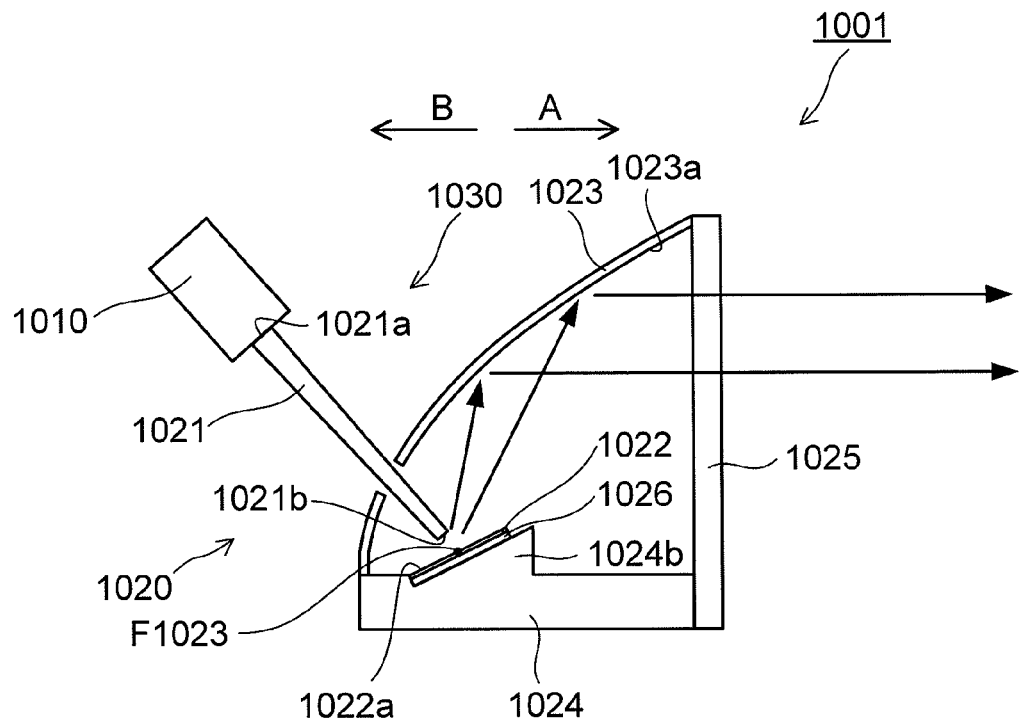
FIG. 47 is a sectional view showing the structure of a light emitting apparatus provided with a light condensing unit in an eighth embodiment of the invention.
Figure 48:
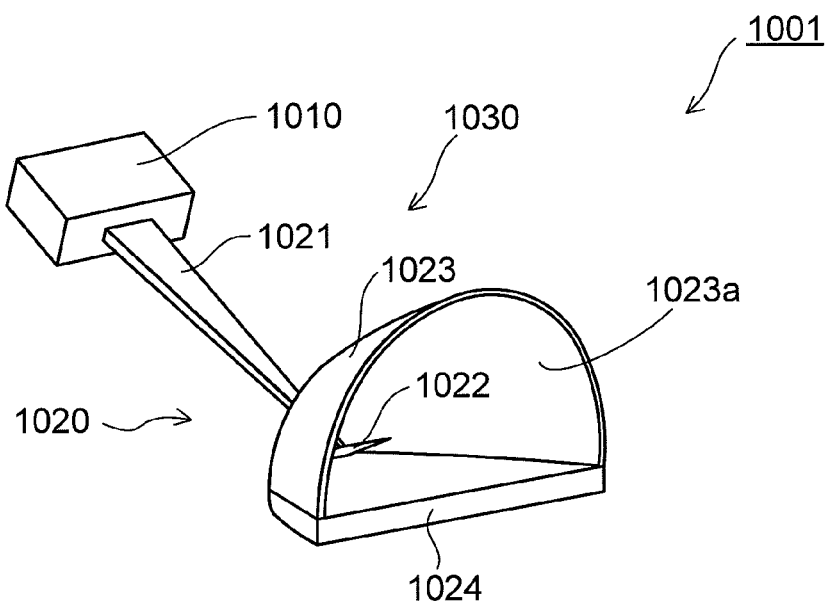
FIG. 48 is a perspective view showing the structure of a light emitting apparatus in the eighth embodiment of the invention.

The light emitting apparatus 1001 according to the eighth embodiment of the invention is used as a headlamp for illuminating ahead of, for example, an automobile or the like. As shown in FIGS. 47 and 48, the light emitting apparatus 1001 is provided with a laser generating device 1010 which functions as a laser light source (exciting light source) and a light projecting unit 1020 which, by using the laser light emanating from the laser generating device 1010, projects light in a predetermined direction (direction A). In FIG. 48, for the sake of easy understanding, a fitting portion 1024b, a filter member 1025, and a support plate 1026, which will be described later, of the light projecting unit 1020 are omitted.

Figure 49:
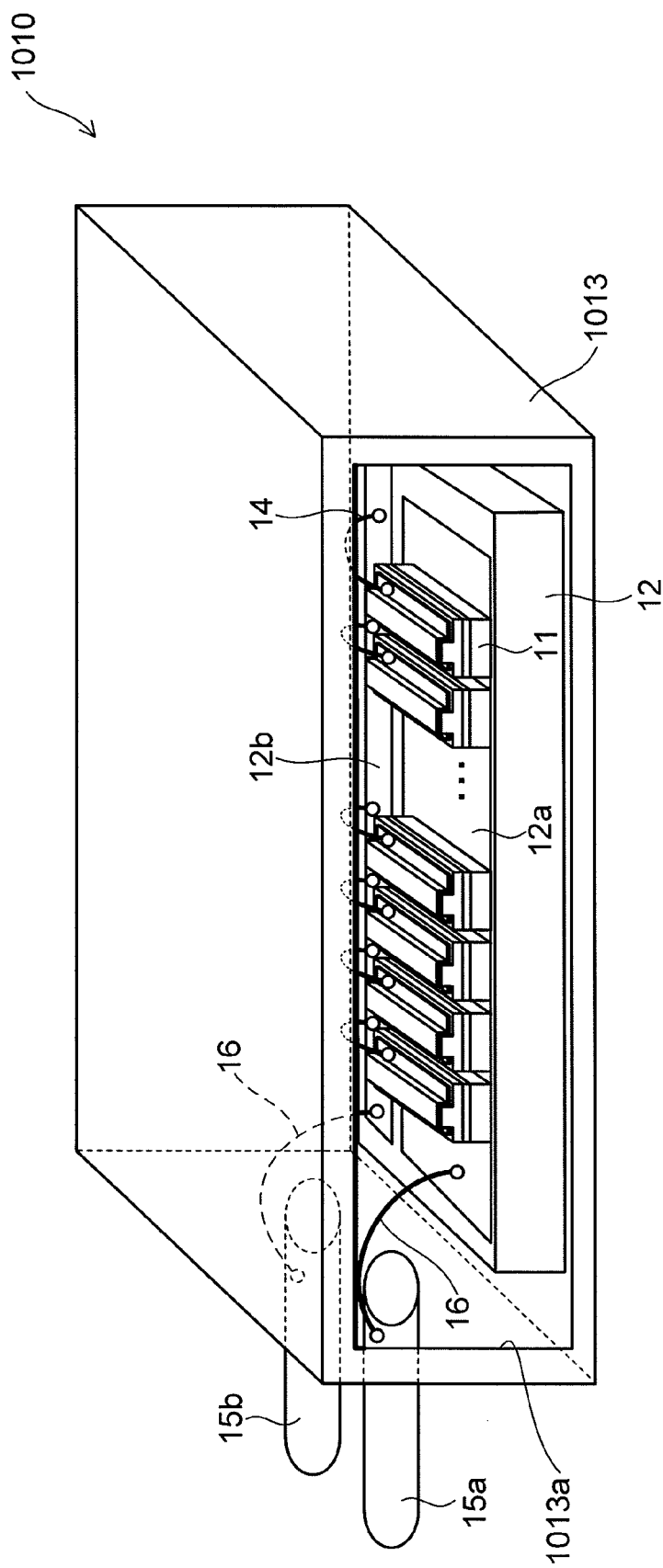
FIG. 49 is a perspective view showing the structure of a laser generating device in the eighth embodiment of the invention.
Figure 50:
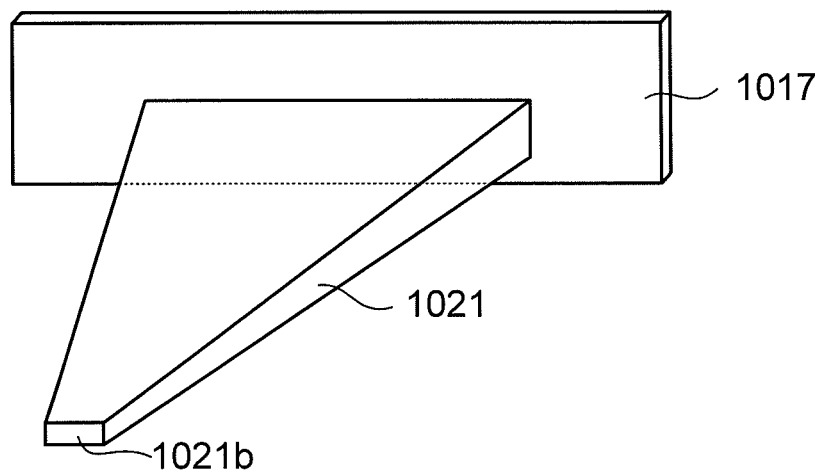
FIG. 50 is a perspective view showing the structure of a light condensing member and a glass plate in the eighth embodiment of the invention.
Figure 51:
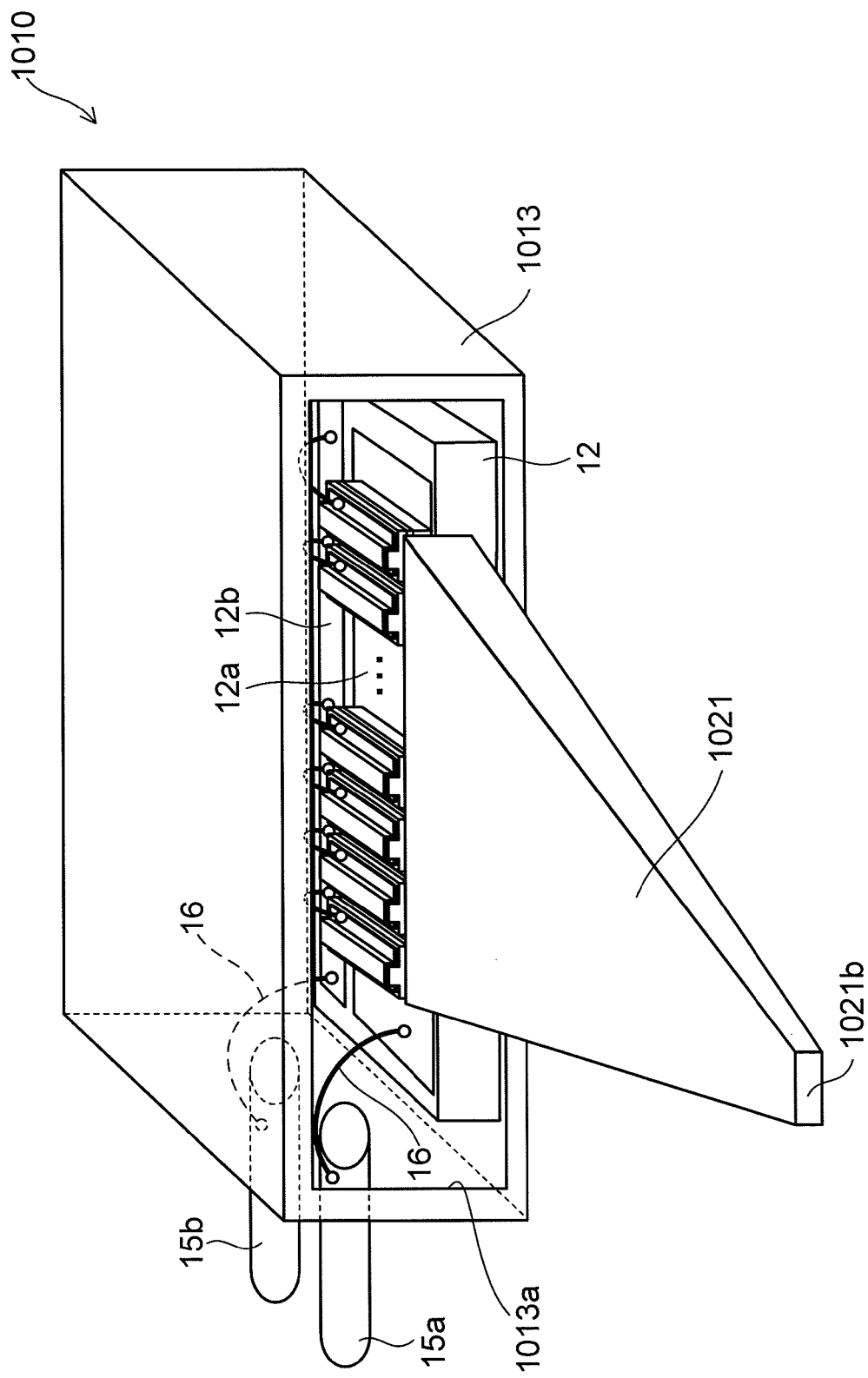
FIG. 51 is a perspective view showing a laser generating device fitted with a light condensing member in the eighth embodiment of the invention.

As shown in FIG. 49, the laser generating device 1010 includes a plurality of semiconductor laser elements 11 (laser generators), a heat spreader 12 on which the semiconductor laser elements 11 are mounted, and a metal casing 1013 (housing member) which houses them all. In FIGS. 49 and 51, a transparent plate 1017, which will be described later, is omitted.

The semiconductor laser elements 11 and the heat spreader 12 are formed in a similar manner as those in the first embodiment described previously. Specifically, The semiconductor laser elements 11 are, for example, broad area lasers, and emit laser light that functions as exciting light. The semiconductor laser elements 11 are designed to emit blue-violet laser light with a center wavelength of, for example, about 405 nm. The heat spreader 12 is formed, for example, as a flat plate of aluminum nitride, and is soldered to the bottom face of the housing member 13.

As shown in FIG. 49, the casing 1013 is formed in the shape of a box having an opening 1013a on the laser light exit side. The casing 1013 is penetrated by electrode pins 15a and 15b for supplying electric power to the semiconductor laser elements 11. These electrode pins 15a and 15b are electrically connected, via metal wires 16, to the electrode patterns 12a and 12b, respectively, on the heat spreader 12. The opening 1013a in the casing 1013 is fitted with a transparent plate 1017 (see FIG. 50) that is made of glass or the like and has a function of transmitting laser light, and the inside of the casing 1013 is filled with an inert gas. The casing 1013 may be fitted with heat dissipating fins or the like (unillustrated), and the casing 1013 may be, for example, air-cooled.

Figure 52:
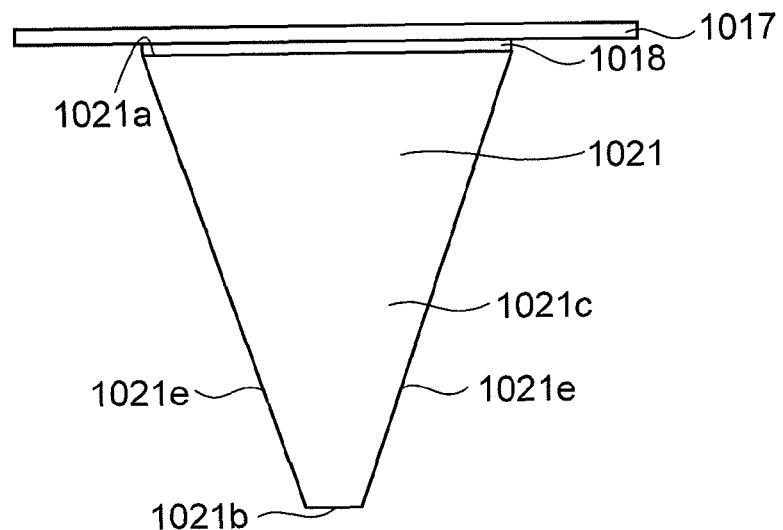
FIG. 52 is a top view showing the structure of a light condensing member and a glass plate in the eighth embodiment of the invention.

As shown in FIGS. 51 and 52, at a predetermined position on the transparent plate 1017 (see FIG. 52), a light condensing member 1021, which will be described later, of the light projecting unit 1020 is fixed (held) with an adhesive layer 1018 (see FIG. 52) in between that has a function of transmitting laser light. Thus, the laser light emanating from the semiconductor laser elements 11 enters the light condensing member 1021. As the adhesive layer 1018, for example, Optokleb (a trademark) manufactured by Adell Corporation may be used. Preferably, the adhesive layer 1018 is provided over the entire surface of the light entrance face 1021a, which will be described later, of the light condensing member 1021, in which case the transparent plate 1017 holds the light entrance face 1021a of the light condensing member 1021 over a plane via the adhesive layer 1018. Forming the adhesive layer 1018 with resin-based transparent adhesive makes it possible to give it a refractive index of, for example, about 1.5, that is, a refractive index close to that (for example, 1.52) of the light condensing member 1021. This helps greatly reduce reflection-induced loss of laser light at the light entrance face 1021a as compared with in a case where, for example, a layer of air (with a refractive index of 1) exists between the transparent plate 1017 and the light condensing member 1021. The adhesive layer 1018 may be provided only in a peripheral part (a no-passage region through which laser light does not pass) of the light entrance face 1021a of the light condensing member 1021. In that case, the adhesive layer 1018 does not need to have a function of transmitting laser light. Moreover, in that case, the transparent plate 1017 holds the light condensing member 1021 along lines. The transparent plate 1017 is an example of a "holding member" according to the invention.

The light condensing member 1021 can be fixed to (held on) the transparent plate 1017 without the adhesive layer 1018. Specifically, the light condensing member 1021 and the transparent plate 1017 may be fixed together by optical contact bonding or fusion. Optical contact bonding is a technology in which the surfaces of two optical members are polished with high precision and brought into intimate contact with each other so that the two optical members are joined together by intermolecular attraction.

The transparent plate 1017 and the light condensing member 1021 may be formed by integral molding. In other words, a part corresponding to the transparent plate 1017 may be formed in the light condensing member 1021. The part corresponding to the transparent plate 1017 may then be fitted into the opening 1013a of the casing 1013 so that the casing 1013 may support the light condensing member 1021. In that case, the casing 1013 holds the part corresponding to the side faces of the transparent plate 1017 along lines. The casing 1013 then holds the light condensing member 1021 in a no-passage region through which laser light does not pass. The part corresponding to the transparent plate 1017 may be formed larger than the opening 1013a of the casing 1013 so that the part corresponding to a peripheral part of the light entrance face of the transparent plate 1017 may be bonded to the casing 1013. Also in that case, the casing 1013 holds the light condensing member 1021 along lines. Moreover, the casing 1013 holds the light condensing member 1021 in the no-passage region through which laser light does not pass. In a case where a part corresponding to the transparent plate 1017 is formed in the light condensing member 1021, the casing 1013 serves as a "holding member" according to the invention.

As shown in FIG. 47, the light projecting unit 1020 includes a light condensing member 1021 which is disposed on the laser light exit side of the laser generating device 1010 (the semiconductor laser elements 11) and which guides the laser light from the laser generating device 1010 while condensing it, a fluorescent member 1022 which converts at least part of the laser light emanating from the light condensing member 1021 to emit fluorescence, a reflecting member 1023 which reflects the fluorescence emanating from the fluorescent member 1022 in a predetermined direction (direction A), a fitting member 1024 to which the fluorescent member 1022 is fixed, and a filter member 1025 which is disposed at an opening of the reflecting member 1023. In this embodiment, the light condensing member 1021, the fluorescent member 1022, and the reflecting member 1023 of the light projecting unit 1020 and the transparent plate 1017 and the adhesive layer 1018 of the laser generating device 1010 (or the casing 1013 of the laser generating device 1010) constitute a light condensing unit 1030.

Figure 53:
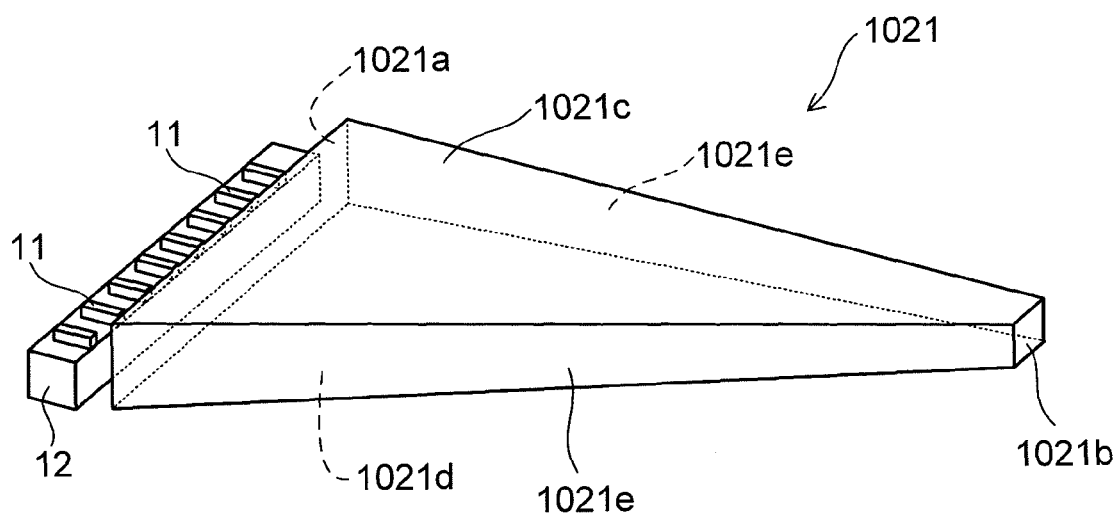
FIG. 53 is a perspective view illustrating the structure of a light condensing member in the eighth embodiment of the invention.

The light condensing member 1021 is formed as a member that transmits light, and is formed of a substance that has a higher refractive index than the environment (air) around the light condensing member 1021. Examples of the material for the light condensing member 1021 include glass, such as borosilicate crown glass (BK7) and artificial quartz, and resin. As shown in FIG. 53, the light condensing member 1021 includes a light entrance face 1021a through which the laser light emanating from the semiconductor laser elements 11 enters; a light exit face 1021b through which the laser light exits; and a top face 1021c, a bottom face 1021d, and a pair of side end faces 1021e which are located (connect) between the light entrance face 1021a and the light exit face 1021b. The top face 1021c, the bottom face 1021d, and the side end faces 1021e are an example of a "side face" according to the invention.

Figure 54:
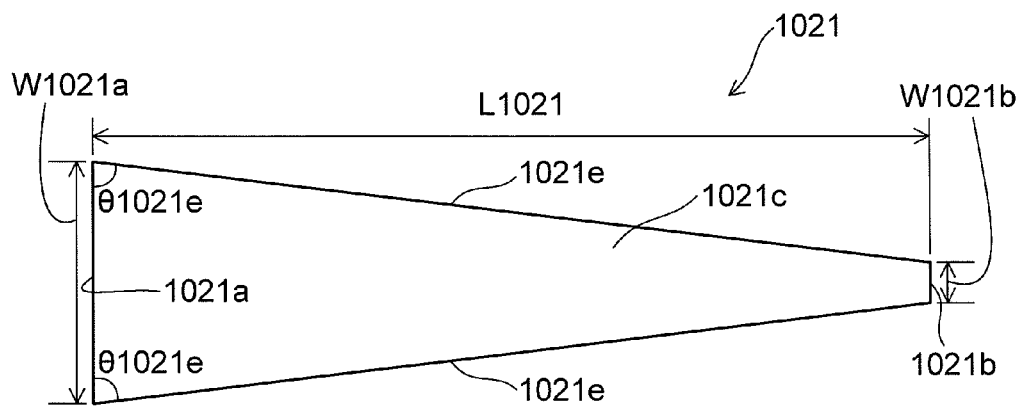
FIG. 54 is a top view showing the structure of a light condensing member in the eighth embodiment of the invention.
Figure 55:
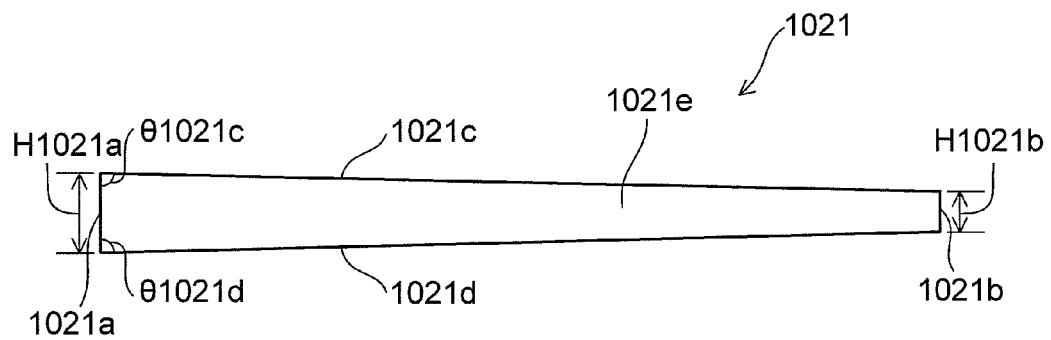
FIG. 55 is a side view showing the structure of a light condensing member in the eighth embodiment of the invention.

The light entrance face 1021a is formed as, for example, a substantially rectangular flat surface. The light exit face 1021b is formed as, for example, a substantially square (rectangular) flat surface, and has a smaller area than the light entrance face 1021a. Specifically, as shown in FIGS. 54 and 55, the light entrance face 1021a has a height (H1021a) of about 2.24 mm and a width (W1021a) of about 11.0 mm; the light exit face 1021b has a height (H1021b) of about 1.03 mm and a width (W1021b) of about 1.03 mm. Thus, the light condensing member 1021 is formed in a shape that tapers off both in its width and thickness directions. The light entrance face 1021a and the light exit face 1021b may be coated with an unillustrated anti-reflection (AR) film.

The light exit face 1021b may be formed as a coarse surface like the surface of ground glass or a so-called moth-eye surface. This, as experimentally verified, greatly improved the efficiency with which laser light is taken out of the light condensing member 1021 through the light exit face 1021b. In a case where the light exit face 1021b is a flat surface, when the laser light reaches the light exit face 1021b inside the light condensing member 1021, part of it is reflected on the inner side of the light exit face 1021b and thus cannot be taken out. By contrast, forming the light exit face 1021b as a coarse surface like the surface of ground glass or a so-called moth-eye surface helps suppress reflection on the inner side of the light exit face 1021b, and thus makes it possible to take out light efficiently.

The top face 1021c and the bottom face 1021d are formed in the same shape, and the two side end faces 1021e are formed in the same shape. The top face 1021c, the bottom face 1021d, and the side end faces 1021e all have a length (L1021) of about 50 mm. The angles ($\theta 1021c$ and $\theta 1021d$) of the top face 1021c and the bottom face 1021d, respectively, with respect to the light entrance face 1021a are larger than the angle ($\theta 1021e$) of the side end faces 1021e with respect to the light entrance face 1021a.

The top face 1021c, the bottom face 1021d, and the side end faces 1021e have a function of reflecting the laser light that has entered through the light entrance face 1021a to guide it to the light exit face 1021b.

Figure 56:
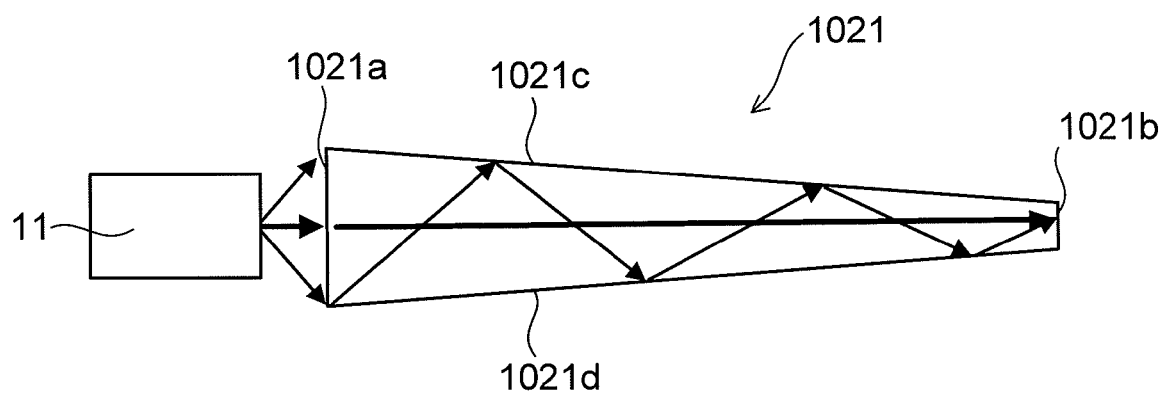
FIG. 56 is a side view illustrating the travel of laser light that has entered a light condensing member in the eighth embodiment of the invention.
Figure 57:
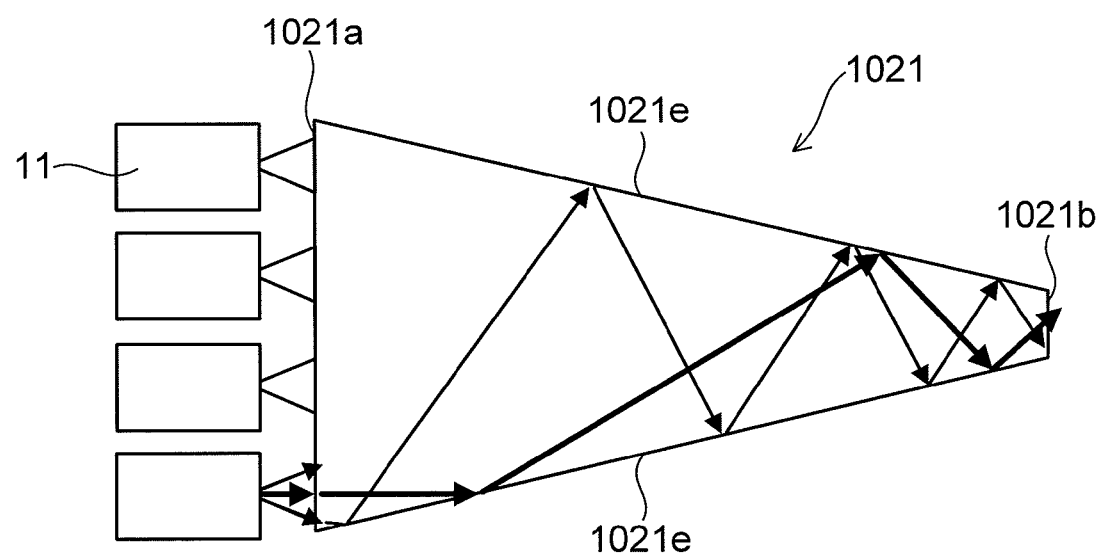
FIG. 57 is a top view illustrating the travel of laser light that has entered a light condensing member in the eighth embodiment of the invention.

Now, how the laser light that has entered the light condensing member 1021 travels will be described briefly. As shown in FIGS. 56 and 57, the laser light emanating from the semiconductor laser elements 11 travels while spreading in the major- and minor-axis directions, and enters the light condensing member 1021 through the light entrance face 1021a. The laser light is then subjected to repeated total reflection on the top face 1021c, the bottom face 1021d, and the side end faces 1021e so that it is, while being condensed, guided to the light exit face 1021b; the laser light then exits through the light exit face 1021b. Thus, the light condensing member 1021 has a function of guiding the laser light that has entered through the light entrance face 1021a to the light exit face 1021b while altering the travel direction of the laser light inside the light condensing member 1021. The laser light emanating from the semiconductor laser elements 11 has a larger spread angle in the major-axis direction than in the minor-axis direction, and thus the total reflection condition is more difficult to fulfill on the top face 1021c and the bottom face 1021d. To cope with this, the angles ($\theta 1021c$ and $\theta 1021d$; see FIG. 55) of the top face 1021c and the bottom face 1021d with respect to the light entrance face 1021a is made larger than the angle ($\theta 1021e$; see FIG. 54) of the side end faces 1021e with respect to the light entrance face 1021a, so that the total reflection condition is easier to fulfill on the top face 1021c and the bottom face 1021d.

Figure 58:
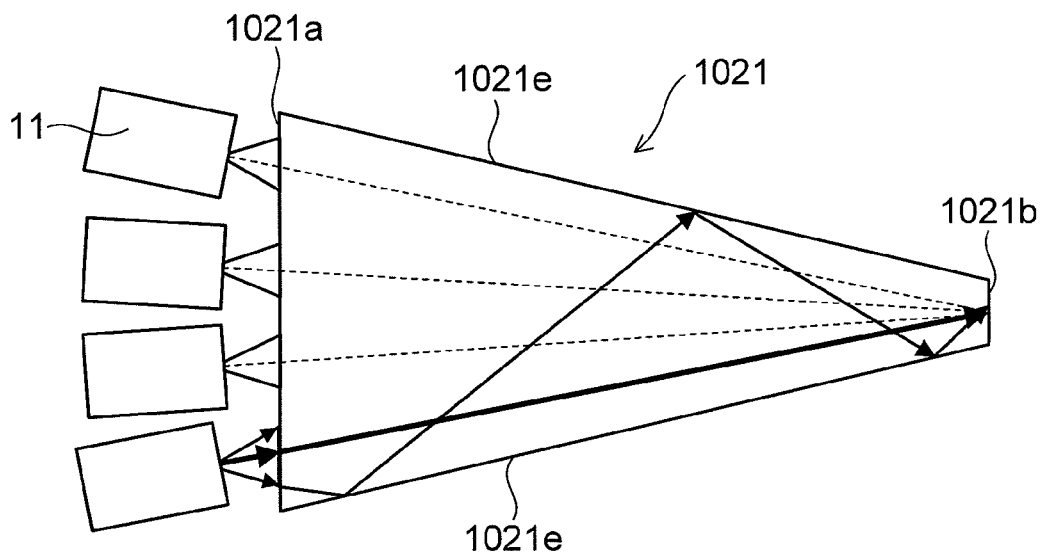
FIG. 58 is a top view showing a modified example of arrangement directions of semiconductor laser elements in the eighth embodiment of the invention.
Figure 59:
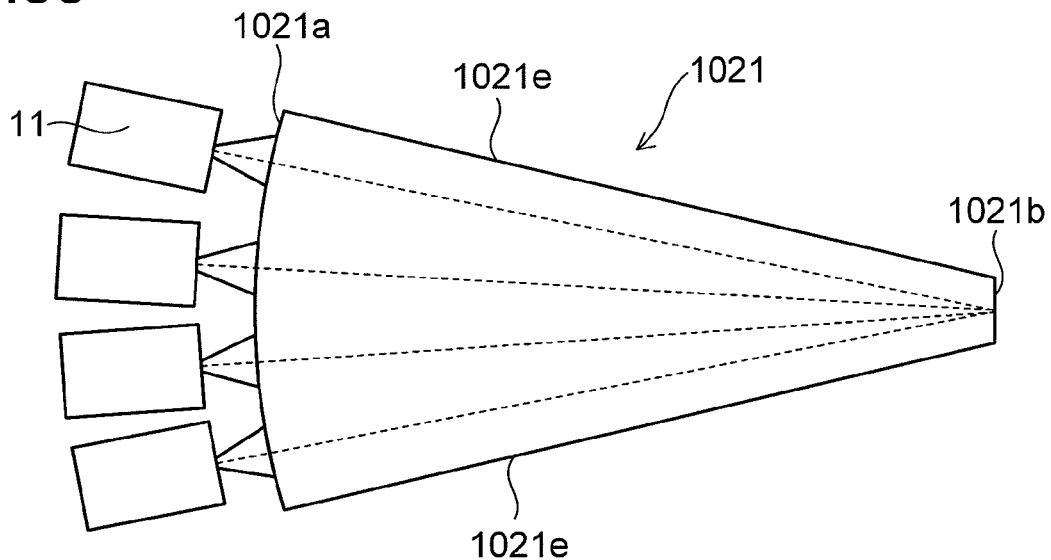
FIG. 59 is a top view showing a modified example of a light condensing member in the eighth embodiment of the invention.

As shown in FIG. 58, arranging the semiconductor laser elements 11 such that their respective laser light emission directions (the directions of the optical axes of the laser light they emit) point to about the center of the light exit face 1021b of the light condensing member 1021 is particularly effective, because doing so makes the total reflection condition easier to fulfill on the side end faces 1021e. In a case where the semiconductor laser elements 11 are arranged such that their respective laser light emission directions point to about the center of the light exit face 1021b, as shown in FIG. 59, the light entrance face 1021a may be formed so as to be perpendicular to those laser light emission directions. This helps suppress lowering in the efficiency with which laser light enters the light condensing member 1021.

Figure 60:
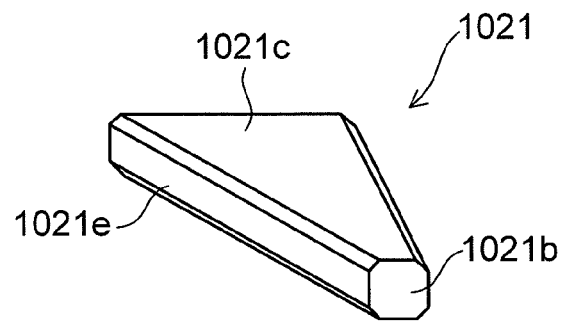
FIG. 60 is a perspective view showing a modified example of a light condensing member in the eighth embodiment of the invention.
Figure 61:
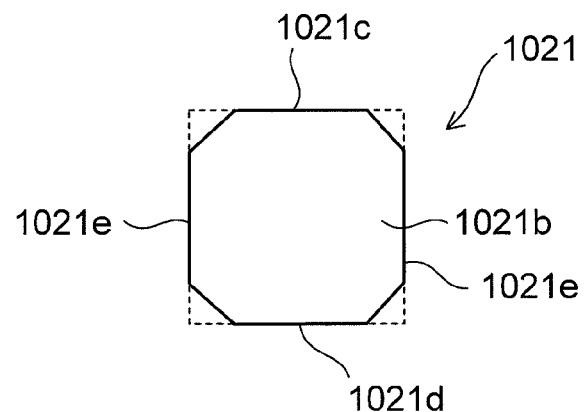
FIG. 61 is a front view showing the light exit face of the light condensing member shown in FIG. 60.
Figure 62:
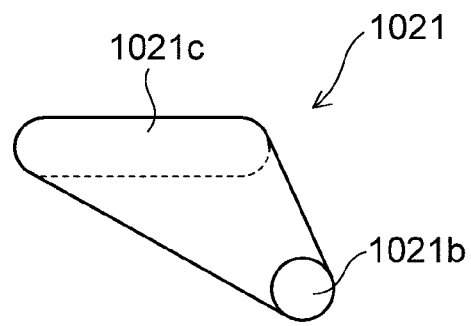
FIG. 62 is a perspective view showing a modified example of a light condensing member in the eighth embodiment of the invention.

As shown in FIGS. 60 to 62, the light condensing member 1021 may be chamfered at edges. Specifically, the light condensing member 1021 may be given, on a plane perpendicular to its light guide direction, a cross section in the shape of a rectangle chamfered at corners. In that case, as shown in FIGS. 60 and 61, the light condensing member 1021 may be flat-chamfered at edges (corners in the cross section) with a chamfer width of 0.3 mm; instead, as shown in FIG. 62, the light condensing member 21 may be round-chamfered at the edges so that the light exit face 1021b may be formed in a substantially circular shape. The light guide direction of the light condensing member 1021 denotes the direction pointing from the center of the light entrance face 1021a to the center of the light exit face 1021b. Giving the light condensing member 1021, on a plane perpendicular to its light guide direction, a rectangular shape chamfered at corners makes it possible to suppress scattering of laser light at edges (corners in the cross section) of the light condensing member 1021. This helps suppress leakage of laser light out of the light condensing member 1021, and thus helps improve the efficiency of use of laser light.

Figure 63:
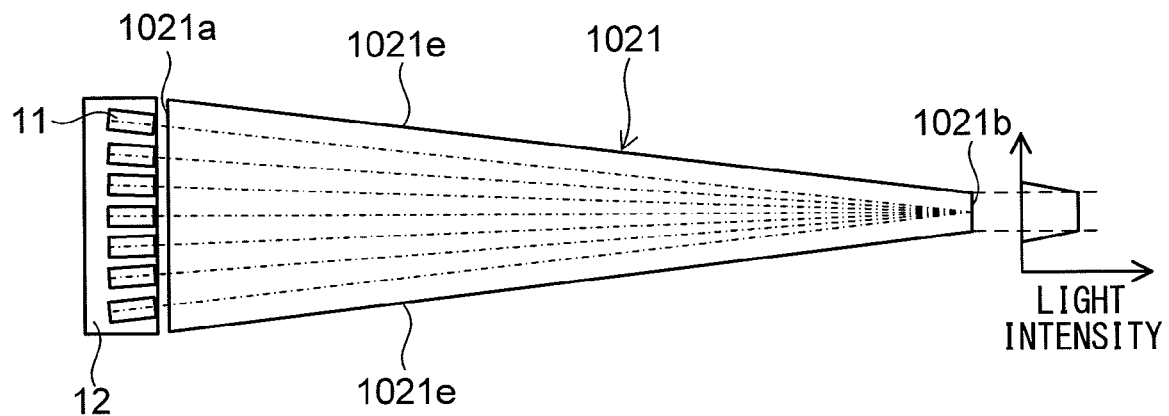
FIG. 63 is a diagram illustrating a light intensity distribution of laser light on the light exit face of a light condensing member in the eighth embodiment of the invention.

In this embodiment, the light intensity distribution of the laser light at the light exit face 1021b of the light condensing member 1021 is even as shown in FIG. 63. That is, the light intensity distribution of the laser light emanating from the light exit face 1021b is not Gaussian. This helps prevent excessive light density in part of the irradiated face 1022a, which will be described later, of the fluorescent member 1022. In this way, it is possible to prevent heat-induced deterioration, and deterioration through a light-induced chemical reaction, of the phosphor and binder contained in the fluorescent member 1022.

Figure 64:
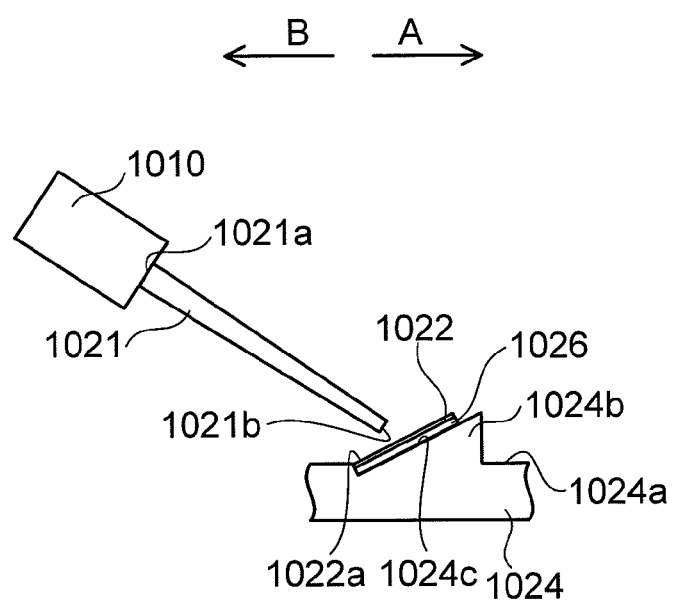
FIG. 64 is a diagram showing the structure of and around a fluorescent member in the eighth embodiment of the invention.

As shown in FIG. 64, the light condensing member 1021 is inclined in direction B (the direction opposite to the light projection direction (the predetermined direction, direction A)). Moreover, between the light exit face 1021b of the light condensing member 1021 and the irradiated face 1022a of the fluorescent member 1022, a gap (space) is formed.

Figure 65:
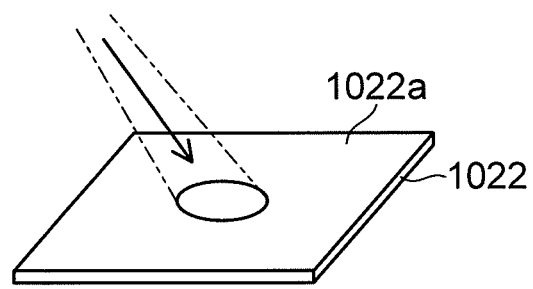
FIG. 65 is a perspective view showing a fluorescent member of which only a central part is irradiated with laser light.

The fluorescent member 1022 has an irradiated face 1022a which is irradiated with laser light. The rear face (the face opposite from the irradiated face 1022a) of the fluorescent member 1022 makes contact with the support plate 1026, which is made of aluminum. As shown in FIG. 65, a central part of the irradiated face 1022a of the fluorescent member 1022 is irradiated with the laser light condensed through the light condensing member 1021. Here, the region irradiated with laser light in the central part of the irradiated face 1022a has a diameter of about 2 mm. The fluorescent member 1022 may be formed to have a diameter of about 2 mm so that laser light may be shone onto the entire irradiated face 1022a of the irradiated face 1022a.

The fluorescent member 1022 is formed by use of particles of three kinds of phosphors (fluorescent or phosphorescent substances) that convert, for example, blue-violet light (exciting light) into red, green, and blue light respectively and emit the results. An example of the phosphor that converts blue-violet light into red light is CaAlSiN$_3$:Eu. An example of the phosphor that converts blue-violet light into green light is β-SiAlON:Eu. An example of the phosphor that converts blue-violet light into blue light is (Ba,Sr)MgAl$_{10}$O$_{17}$:Eu. These phosphors are bound together by an inorganic binder (such as silica or TiO$_2$). The red, green, and blue fluorescence emanating from the fluorescent member 1022 mixes to produce white light. Here, red light is light with a center wavelength of, for example, about 640 nm, green light is light with a center wavelength of, for example, about 520 nm, and blue light is light with a center wavelength of, for example, about 450 nm.

As shown in FIG. 47, the fluorescent member 1022 is disposed in a region on the reflecting member 1023 which includes the focus F1023 of the reflecting face 1023a, and the center of the irradiated face 1022a of the fluorescent member 1022 approximately coincides with the focus F1023 of the reflecting face 1023a. The fluorescent member 1022 may be disposed near the focus F1023 of the reflecting face 1023a on the reflecting member 1023. As shown in FIG. 64, the irradiated face 1022a of the fluorescent member 1022 is inclined upward in the light projection direction (direction A).

Figure 66:
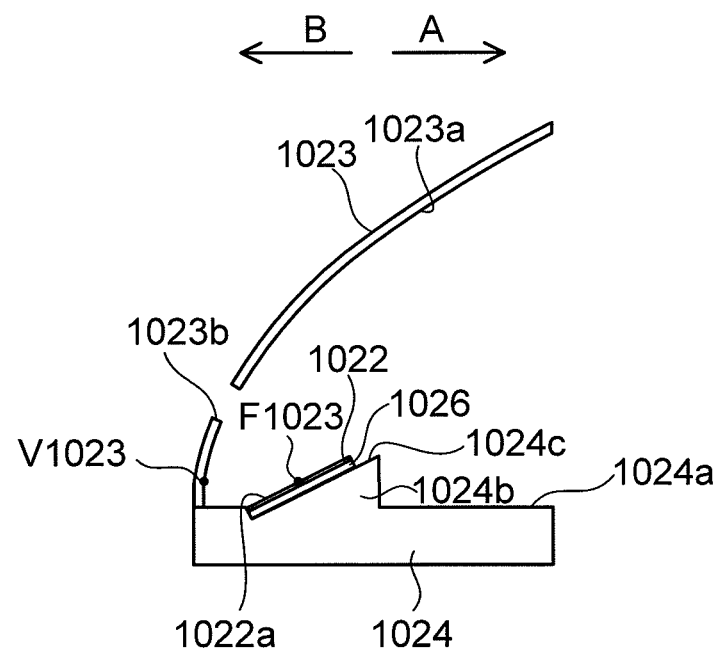
FIG. 66 is a sectional view illustrating the structure of a reflecting member in the eighth embodiment of the invention.
Figure 67:
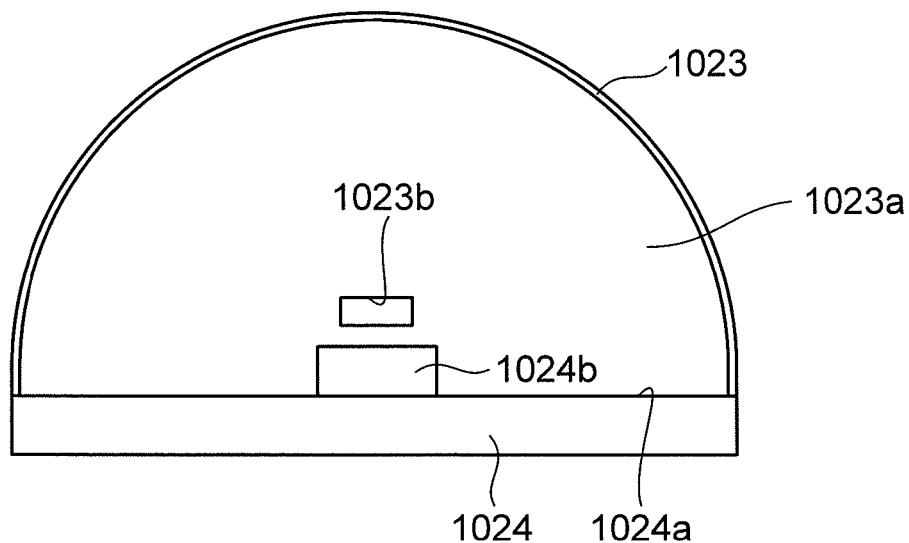
FIG. 67 is a front view illustrating the structure of a reflecting member in the eighth embodiment of the invention.

As shown in FIG. 66, the reflecting face 1023a of the reflecting member 1023 is disposed so as to face the irradiated face 1022a of the fluorescent member 1022. The reflecting face 1023a is formed so as to include, for example, part of a paraboloid. Specifically, the reflecting face 1023a is formed in the shape of a paraboloid that is split on the plane perpendicular to (crossing) the axis through its vertex V1023 and focus F1023 and that is further split on the plane parallel to the axis through the vertex V1023 and focus F1023. As shown in FIGS. 66 and 67, the reflecting face 1023a has a depth (length in direction B) of about 30 mm, and is formed substantially in a semicircular shape with a radius of about 30 mm as seen from the light projection direction (direction A).

The reflecting face 1023a has a function of reflecting, while making into parallel light, the light from the fluorescent member 1022 in a predetermined direction (direction A). In practice, the laser light spot region (the irradiated region) on the irradiated face 1022a has a certain size, and thus the light emanating from the reflecting member 1023 is not exactly parallel; in the present specification, however, for the sake of simple description, the light emanating from the reflecting member 1023 is occasionally referred to as being parallel.

In a part of the reflecting member 1023 deviated from the center of the fluorescent member 1022 in direction B, a through hole 1023b is formed. In the through hole 1023b, a tip-end part of the light condensing member 1021 is inserted.

The reflecting member 1023 may be formed of metal, or may be formed by coating the surface of resin with a reflective film.

To the reflecting member 1023, a fitting member 1024 is fixed. Preferably, the top face 1024a of the fitting member 1024 is formed so as to having a function of reflecting light. The fitting member 1024 is formed of metal with good thermal conductivity, such as Al or Cu, so as to having a function of dissipating the heat generated in the fluorescent member 1022. On the top face 1024a of the fitting member 1024, a fitting portion 1024b on which to fix the fluorescent member 1022 and the support plate 1026 is formed integrally. As shown in FIG. 64, the fitting face 1024c of the fitting portion 1024b is inclined upward in the light projection direction (direction A). Preferably, on the bottom face of the fitting member 1024, heat dissipating fins (unillustrated) are provided.

As shown in FIG. 47, the opening (the end in direction A) of the reflecting member 1023 is fitted with a filter member 1025 which shields (absorbs or reflects) exciting light (light with a wavelength of about 405 nm) but transmits the fluorescence (red, green, and blue light) resulting from the wavelength conversion by the fluorescent member 1022. Specifically, the filter member 1025 may be formed of a glass material such as, for example, ITY-418 manufactured by Isuzu Glass Co., Ltd., which absorbs light with wavelengths of 418 nm or less and transmits light with wavelengths more than 418 nm, or, for example, L42 manufacture by Hoya Corporation, which absorbs light with wavelengths of 420 nm or less and transmits light with wavelengths more than 420 nm. Providing the filter member 1025 at the opening of the reflecting member 1023 helps reduce leakage of laser light.

In this embodiment, as described above, the light condensing member 1021 is provided which includes the light entrance face 1021a through which laser light enters and the light exit face 1021b which has a smaller area than the light entrance face 1021a and through which the laser light exits, and the light condensing member 1021 includes the side faces (the top face 1021c, the bottom face 1021d, and the side end faces 1021e) which reflect the laser light that has entered through the light entrance face 1021a to guide it to the light exit face 1021b. Thus, the laser light that has entered through the light entrance face 1021a is, while being reflected on the side faces, guided to the light exit face 1021b, and then exits through the light exit face 1021b in a condensed state. This helps increase the density of the laser light emanating from the light condensing member 1021. Moreover, the laser light that has entered through the light entrance face 1021a travels inside the light condensing member 1021 while being totally reflected on the side faces and exits through the light exit face 1021b with an even light intensity distribution. That is, the light intensity distribution of the laser light emanating from the light exit face 1021b is not Gaussian. This helps prevent excessively high light density in part of the irradiated face of the fluorescent member 1022. Thus, it is possible to prevent heat-induced deterioration, and deterioration through a light-induced chemical reaction, of the phosphor and binder contained in the fluorescent member 1022.

Moreover, as described above, the transparent plate 1017 which holds the light condensing member 1021 holds the light entrance face 1021a. Thus, when laser light is reflected on the side faces, it is not absorbed by the transparent plate 1017. This helps suppress lowering in the efficiency of use of laser light.

Moreover, as described above, the transparent plate 1017 has a function of transmitting laser light. This helps suppress absorption of laser light by the transparent plate 1017, and permits the transparent plate 1017 to be disposed so as to cover the light entrance face 1021a. Thus, the light entrance face 1021a can easily be held by the transparent plate 1017.

Moreover, as described above, a part corresponding to the transparent plate 1017 may be integrally formed with the light condensing member 1021 so that the light condensing member 1021 may be held by the casing 1013.

Moreover, as described above, by use of the light condensing member 1021 into which the laser light emanating from the semiconductor laser elements 11 is shone, the laser light emanating from the semiconductor laser elements 11 can easily be condensed. Thus, using the light condensing member 1021 is particularly effective in cases where a plurality of semiconductor laser elements 11 are used as a laser light source.

Moreover, as described above, forming the light exit face 1021b as a coarse surface or a moth-eye surface helps reduce reflection on the inner side of the light exit face 1021b, and thus makes it possible to take out light efficiently.

Moreover, as described above, in a case where a part corresponding to the transparent plate 1017 is formed integrally with the light condensing member 1021, the casing 1013 holds the light condensing member 1021 in a no-passage region through which laser light does not pass. This prevents laser light from being absorbed by the casing 1013, and thus helps suppress lowering in the efficiency of use of light.

Ninth Embodiment

As a ninth embodiment, with reference to FIGS. 68 to 72, a description will be given of a case where, unlike in the eighth embodiment described previously, a holding member 1110 holds a side face of the light condensing member 1021.

Figure 68:
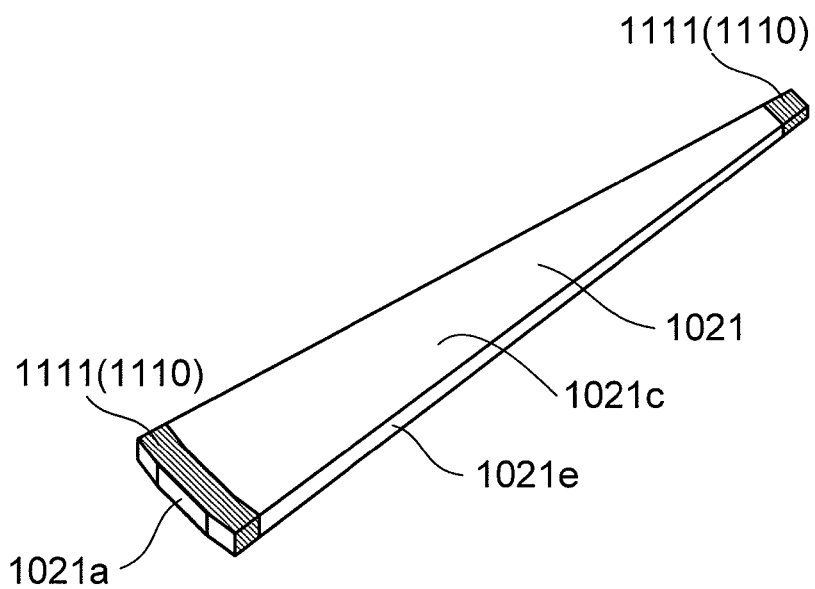
FIG. 68 is a perspective view showing the structure of a light condensing member and metal belts in a ninth embodiment of the invention.

As shown in FIG. 68, the light condensing unit according to the ninth embodiment of the invention includes a light condensing member 1021 and a holding member 1110 which holds the light condensing member 1021. In FIG. 68, hatching indicates metal belts 1111, which will be described later, of the holding member 1110. The light condensing member 1021 is disposed at a predetermined distance (gap) from the transparent plate 1017 of the laser generating device 1010, and the holding member 1110 is provided as a separate member from the laser generating device 1010.

Figure 69:
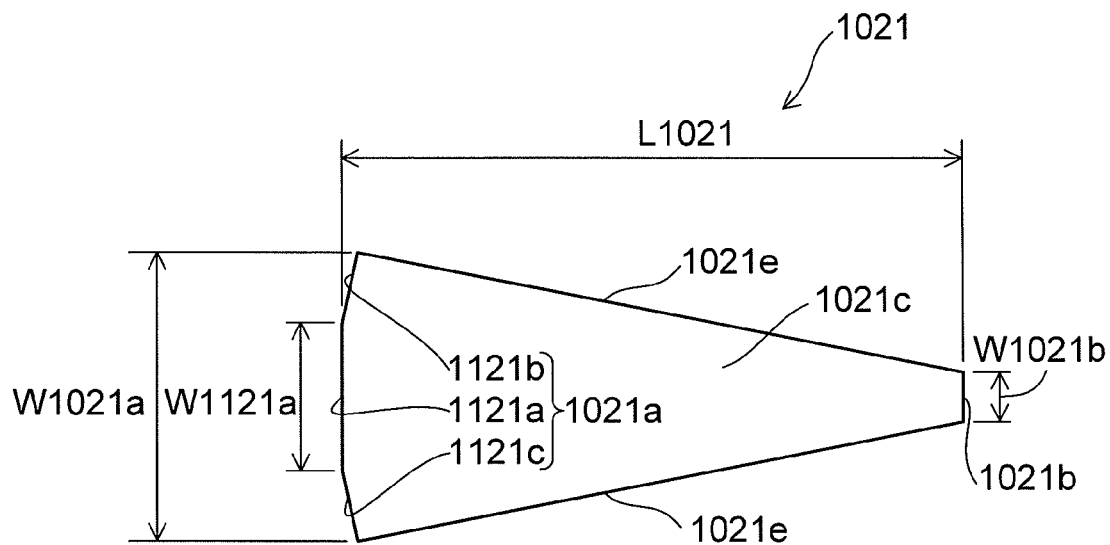
FIG. 69 is a top view showing the structure of a light condensing member in the ninth embodiment of the invention.
Figure 70:
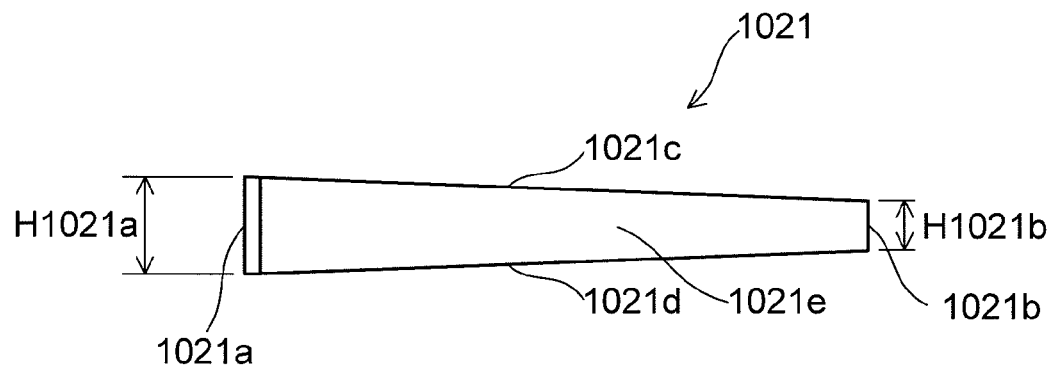
FIG. 70 is a side view showing the structure of a light condensing member in the ninth embodiment of the invention.

As shown in FIGS. 69 and 70, in the light condensing member 1021 in this embodiment, the light entrance face 1021a has a height (H1021a) of about 6.0 mm and a width (W1021a) of about 23.4 mm. The light entrance face 1021a divides into three parts 1121a, 1121b, and 1121c. The part 1121a has a width (W1121a) of about 11.44 mm. The parts 1121b and 1121c are inclined by about 5.46 degrees toward the light exit face 1021b with respect to the part 1121a.

The light exit face 1021b has a height (H1021b) of about 2.66 mm and a width (W1021b) of about 2.66 mm. The side end faces 1021e are inclined by about 4.96 degrees in the light guide direction. The top face 1021c and the bottom face 1021d have a length (L1021) of about 120 mm.

Figure 71:
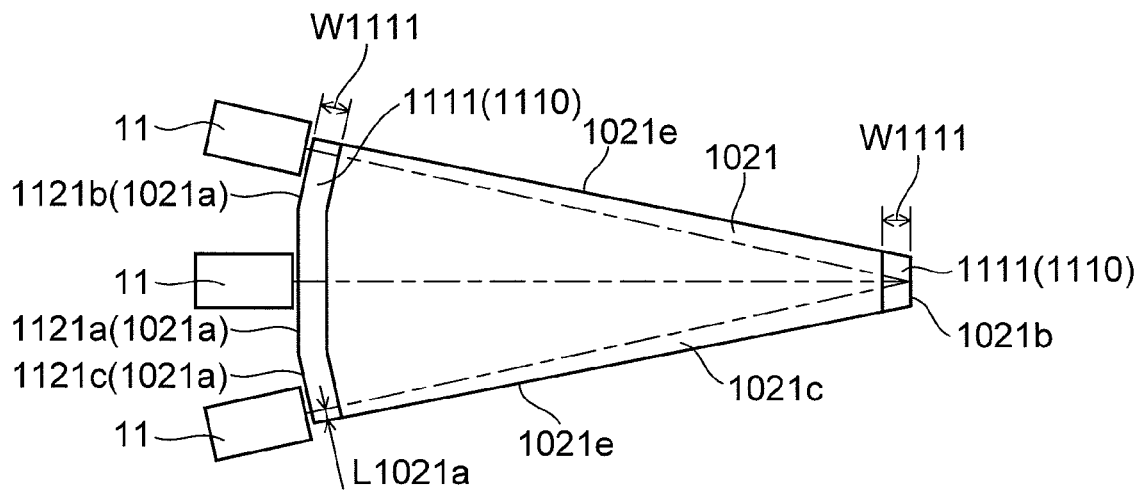
FIG. 71 is a top view showing the structure of a light condensing member and semiconductor laser elements in the ninth embodiment of the invention.

In this embodiment, as shown in FIG. 71, as a laser light source, three semiconductor laser elements 11 are provided. The semiconductor laser elements 11 are disposed one for each of the three parts 1121a to 1121c of the light entrance face 1021a. Moreover, the semiconductor laser elements 11 are disposed so that the directions in which they respectively emit light point to about the center of the light exit face 1021b of the light condensing member 1021. On the light entrance face 1021a, the distance (L1021a) from the center axes of the semiconductor laser elements 11 disposed at both ends to the respective side end faces 1021e is about 0.3 mm.

As shown in FIG. 68, the holding member 1110 includes a plurality of metal belts 1111 (line contact portions) that make line contact with the light condensing member 1021. These metal belts 1111 are made of metal, and has a function of reflecting light. The metal belts 1111 are provided on a light entrance face 1021a side end part and a light exit face 1021b end part of the side faces (the top face 1021c, the bottom face 1021d, and the side end faces 1021e). Each belt 1111 is formed with a width (W1111; see FIG. 71) of, for example, 5 mm or less. The metal belts 1111 may be formed by bending a metal plate, or may be deposited as a thin film on the surface of the light condensing member 1021.

The holding member 1110 includes a member like a body portion 1212 in the tenth embodiment described later, and this member couples to the metal belts 1111. The holding member 1110 holds the side faces of the light condensing member 1021 along lines.

In other respects, the structure of the ninth embodiment is similar to that of the eighth embodiment described previously.

In this embodiment, as described above, the holding member 1110 holds the side faces (the top face 1021c, the bottom face 1021d, and the side end faces 1021e) of the light condensing member 1021 along lines. This helps sufficiently reduce the contact area between the light condensing member 1021 and the holding member 1110. This helps suppress absorption of laser light by the holding member 1110 as a result of laser light exiting into the holding member 1110 due to the total reflection condition failing to be fulfilled at where the light condensing member 1021 and the holding member 1110 make contact with each other. That is, it is possible to reduce the amount of laser light absorbed by the holding member 1110. This helps suppress lowering in the efficiency of use of laser light.

Moreover, as described above, the holding member 1110 holds a light entrance face 1021a side part and a light exit face 1021b part of the side faces (the top face 1021c, the bottom face 1021d, and the side end faces 1021e). This makes it possible to stably hold the light condensing member 1021.

Moreover, as described above, the holding member 1110 includes the metal belts 1111 which make line contact with the light condensing member 1021. This helps further reduce the amount of laser light absorbed by the holding member 1110.

In other respects, the benefits of the ninth embodiment are similar to those of the eighth embodiment described previously.

Next, with reference to FIG. 72, a description will be given of experiments conducted to verify the effects described above.

In the experiments, the output (amount of light) of the laser light on the light exit face 1021b of the light condensing member 1021 was determined through simulation with the following examples: Example 1, in which the light entrance face 1021a of the light condensing member 1021 was held (corresponding to the eighth embodiment), and Examples 2-1 to 2-3, which corresponded to the ninth embodiment.

In Example 1, the light condensing member 1021 and the transparent plate 1017 were fixed together by optical contact bonding. In other respects, the structure was similar to that of the ninth embodiment described above. That is, Example 1 corresponded to the ninth embodiment with all the metal belts 1111 given a width (W1111) of 0 mm.

In Example 2-1, the metal belts 1111 were given a width (W1111) of about 1.6 mm. In Example 2-2, the metal belts 1111 were given a width (W1111) of about 3.1 mm. In Example 2-3, the metal belts 1111 were given a width (W1111) of about 5.1 mm. In other respects, the structure was similar to that of the ninth embodiment described above.

Figure 72:
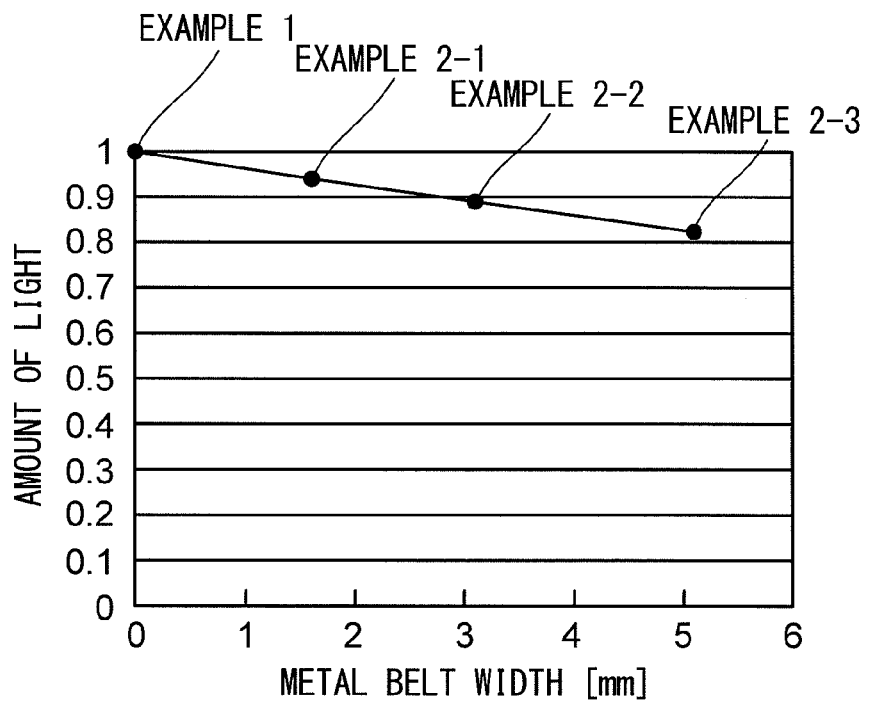
FIG. 72 is a diagram illustrating experiments conducted to verify the effect of a holding member in the ninth embodiment of the invention.

With each of Examples 1 and 2-1 to 2-3, the amount of light of the laser light on the light exit face 1021b of the light condensing member 1021 was determined and was normalized assuming that the value obtained with Example 1 was "1." The results are shown in FIG. 72.

FIG. 72 reveals the following. Increasing the width of the metal belts 1111 resulted in lowering the amount of light of the laser light on the light exit face 1021b. It was thus found that the metal belts 1111 that made contact with the side faces of the light condensing member 1021 caused loss of light, and thus that, by reducing the contact area between the light condensing member 1021 and the holding member 1110 (the width of the metal belts 1111), it was possible to suppress lowering in the efficiency of use of laser light. It was also found that, in a case where metal belts 1111 were used, they should better be given a small width, and that, by giving the metal belts 1111a width of about 1 mm or less, it was possible to reduce the loss of light to about 5% or less. Specifically, the amount of light in Example 2-1 was about 0.94, indicating a loss of about 6% in the amount of light; the amount of light in Example 2-2 was about 0.89, indicating a loss of about 11% in the amount of light; the amount of light in Example 2-3 was about 0.83, indicating a loss of about 17% in the amount of light.

Tenth Embodiment

As a tenth embodiment, with reference to FIGS. 73 to 77, a description will given of a case where, unlike in the ninth embodiment described previously, a holding member 1210 holds a side face of the light condensing member 1021 at points.

Figure 73:
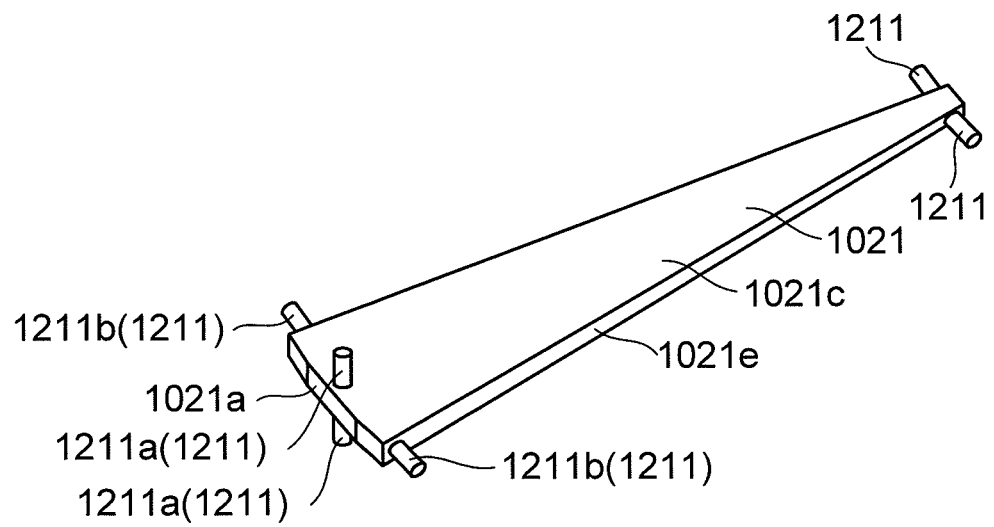
FIG. 73 is a perspective view showing the structure of a light condensing member and a holding member in a tenth embodiment of the invention.
Figure 74:
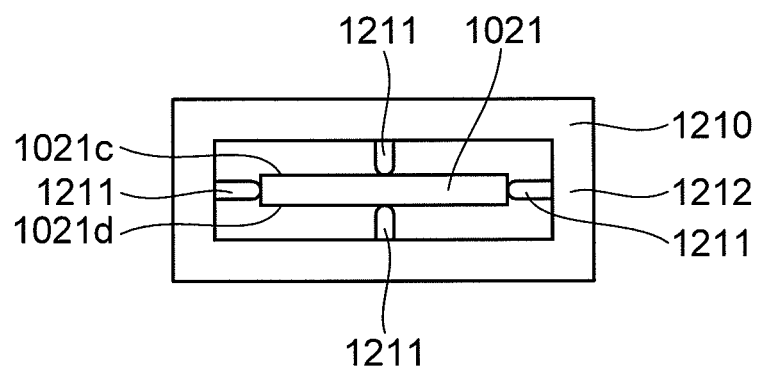
FIG. 74 is a sectional view showing the structure of a light condensing member and a holding member in a tenth embodiment of the invention.

As shown in FIGS. 73 and 74, a light condensing unit according to the tenth embodiment of the invention includes a light condensing member 1021 and a holding member 1210 (see FIG. 74) which holds the light condensing member 1021. In FIG. 73, for the sake of easy understanding, a body portion 1212 and restricting portions 1213, which will be described later, of the holding member 1210 are omitted.

The holding member 1210 includes a plurality of posts 1211 (point contact portions) which make point contact with the light condensing member 1021, a body portion 1212 (see FIG. 74) to which the posts 1211 are fitted, and restricting portions 1213 (see FIG. 77), which will be described later. The posts 1211 are provided in a light entrance face 1021a side end part and a light exit face 1021b side end part of the side faces (the top face 1021c, the 1021d, and the side end faces 1021e) of the light condensing member 1021. For example, in the light entrance face 1021a side end part, posts 1211 are provided one on each of the top face 1021c, the bottom face 1021d, and the side end faces 1021e; in the light exit face 1021b side end part, posts 1211 are provided one on each of the top face 1021c, the bottom face 1021d, and the side end faces 1021e.

Each post 1211 is formed substantially in a cylindrical shape, and its part at which it makes contact with the light condensing member 1021 is formed in a hemispherical shape (with a curved surface). Thus, the posts 1211 make point contact with the light condensing member 1021, and thus the holding member 1210 holds the light condensing member 1021 at points. The posts 1211 have lower hardness than the light condensing member 1021, and are formed of, for example, resin. The part of the posts 1211 at which they make contact with the light condensing member 1021 does not necessarily have to be hemispherical but may be flat. In that case, the posts 1211 should better be fine.

As shown in FIG. 74, the posts 1211 are fitted in a plurality of insertion holes (unillustrated) provided in the body portion 1212. The amount of protrusion of the posts 1211 may be made adjustable by forming screw threads on them.

Figure 75:
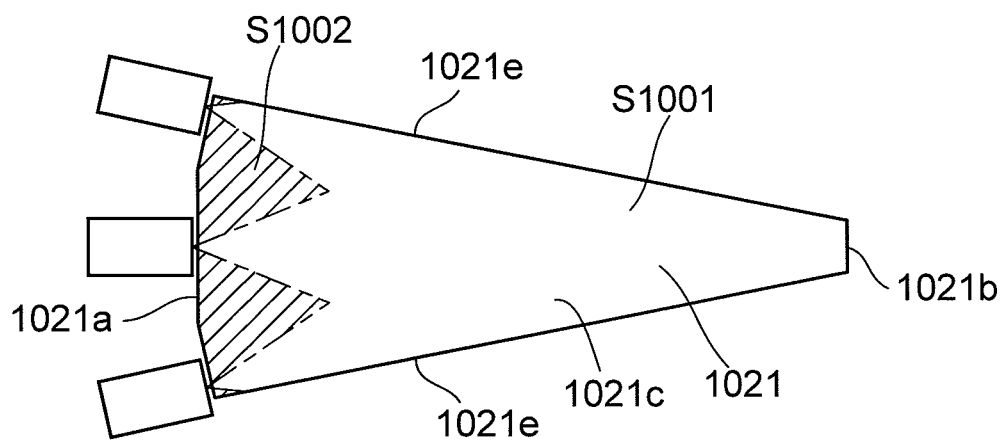
FIG. 75 is a top view showing the structure of a light condensing member and semiconductor laser elements in the tenth embodiment of the invention.
Figure 76:
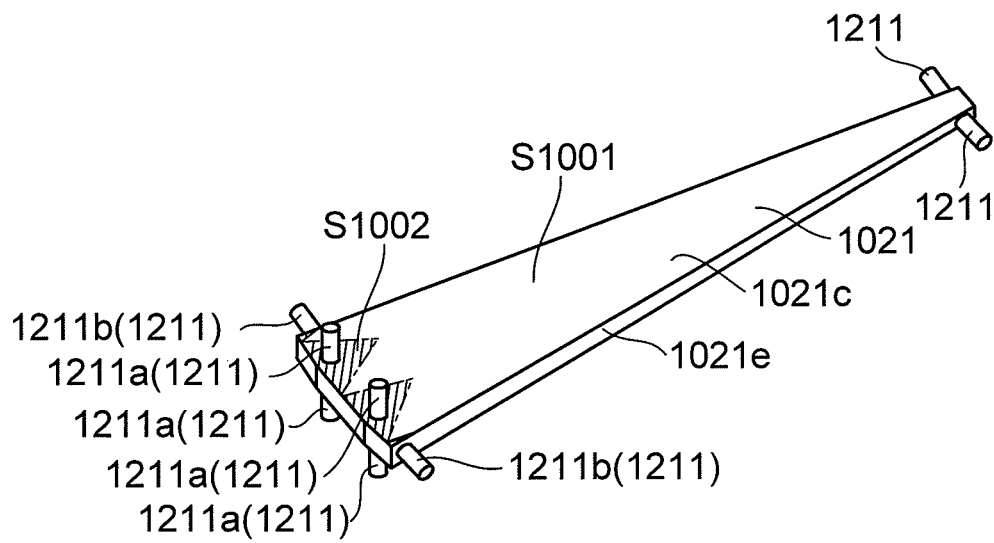
FIG. 76 is a perspective view showing a modified example of a holding member in the tenth embodiment of the invention.

Here, as shown in FIG. 75, the light condensing member 1021 includes a passage region S1001 through which laser light passes and a no-passage region S1002 (hatched in FIG. 75) through which laser light does not pass. In FIG. 73, in the light entrance face 1021a side end part, posts 1211a are disposed on the passage region S1001, and posts 1211b are disposed on the no-passage region S1002. Instead, as shown in FIG. 76, the posts 1211a too may be disposed on the no-passage region S1002. In that case, no laser light is absorbed by the holding member 1210, and this helps further suppress lowering in the efficiency of use of laser light. This design is particularly effective in cases where the part of the posts 1211 at which they make contact with the light condensing member 1021 is flat.

Figure 77:
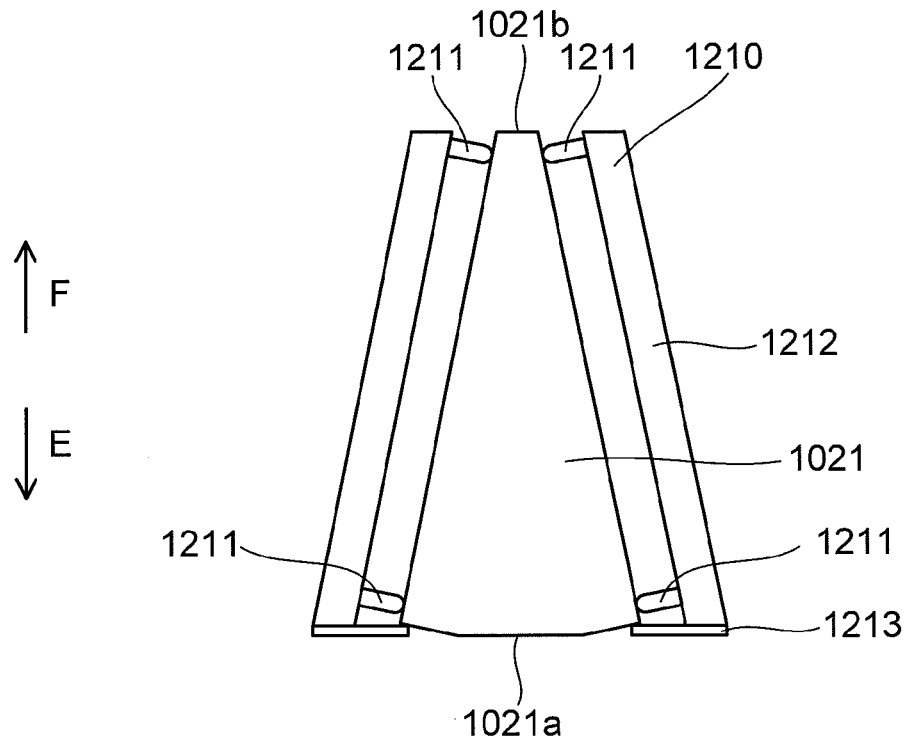
FIG. 77 is a sectional view showing the structure of a light condensing member and a holding member in the tenth embodiment of the invention.

As shown in FIGS. 74 and 77, the body portion 1212 is formed in a tubular shape such as to cover the side faces of the light condensing member 1021. Inside the body portion 1212, the light condensing member 1021 and the posts 1211 are disposed.

As shown in FIG. 77, at the rear end of the body portion 1212, restricting portions 1213 are provided which prevent the light condensing member 1021 from moving rearward (direction E). Since the light condensing member 1021 is formed in a shape that tapers off toward the tip end, the light condensing member 1021 does not move frontward (direction F).

In other respects, the structure of the tenth embodiment is similar to that of the ninth embodiment described previously.

In this embodiment, as described above, the holding member 1210 includes posts 1211 that make point contact with the light condensing member 1021, and the posts 1211 have lower hardness than the light condensing member 1021. This helps suppress damage inflicted on the light condensing member 1021 by the posts 1211 on the holding member 1210.

Moreover, as described above, forming the part of the posts 1211 at which they make contact with the light condensing member 1021 in a hemispherical shape (with a curved surface) helps make the contact area between the holding member 1210 and the light condensing member 1021 extremely small, and thus helps further suppress lowering of the efficiency of use of laser light.

Moreover, as described above, the holding member 1210 is formed so as to cover the side faces (the top face 1021c, the bottom face 1021d, and the light projection apparatus side end faces 1021e). This helps suppress leakage of the laser light exiting through the side faces of the light condensing member 1021 out of the light condensing unit 1030, and thus helps suppress adverse effects of laser light on the human eye etc.

In other respects, the benefits of the tenth embodiment are similar to those of the eighth and ninth embodiments described previously.

Eleventh Embodiment

As an eleventh embodiment, with reference to FIGS. 78 and 79, a description will be given of a case where, unlike in the ninth and tenth embodiments described previously, metal wires 1311 of a holding member 1310 hold the side faces of the light condensing member 1021.

Figure 78:
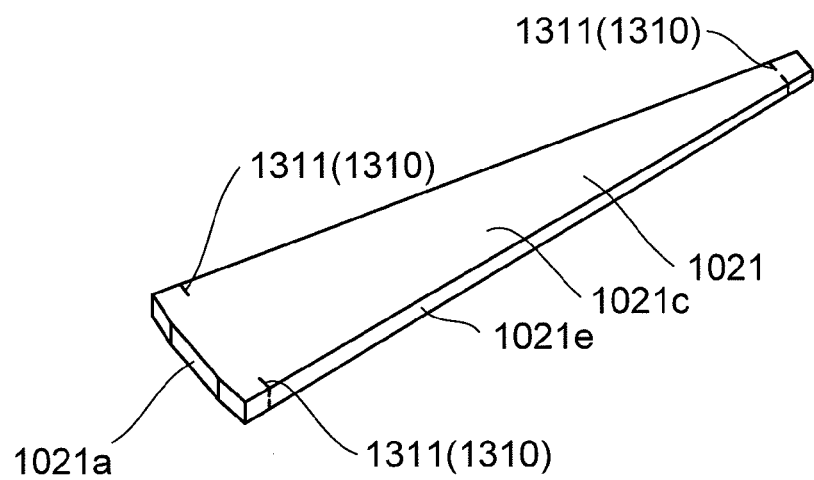
FIG. 78 is a perspective view showing the structure of a light condensing member and a holding member in an eleventh embodiment of the invention.
Figure 79:
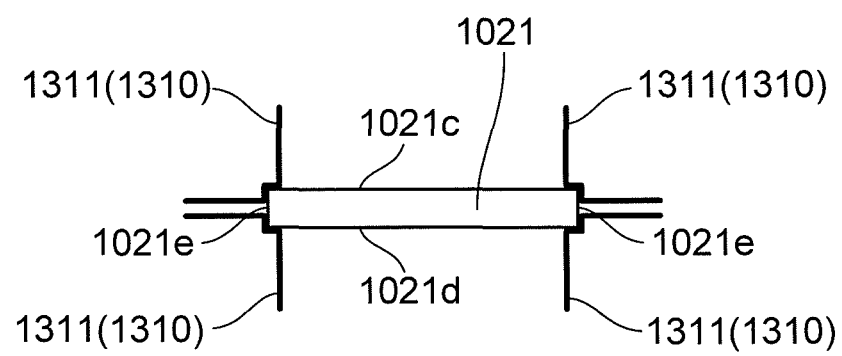
FIG. 79 is a sectional view showing the structure of a light condensing member and a holding member in the eleventh embodiment of the invention.

As shown in FIGS. 78 and 79, a light condensing unit according to the eleventh embodiment of the invention includes a light condensing member 1021 and a holding member 1310 which holds the light condensing member 1021. The holding member 1310 includes a plurality of metal wires 1311 (line contact portions) which make line contact with the light condensing member 1021. In FIGS. 78 and 79, for the sake of easy understanding, the part of the holding member 1310 other than the metal wires 1311 is omitted. As shown in FIG. 79, the metal wires 1311 are each bent so as to make contact with two contiguous ones of the side faces of the light condensing member 1021.

The holding member 1310 includes, though not shown, a member like the body portion 1212 in the tenth embodiment described previously, and this member couples to the metal wires 1311. The holding member 1310 holds the side faces of the light condensing member 1021 along lines.

In other respects, the structure and benefits of the eleventh embodiment are similar to those of the ninth and tenth embodiments described previously.

Twelfth Embodiment

As a twelfth embodiment, with reference to FIG. 80, a description will be given of a case where, unlike in the ninth to eleventh embodiments described previously, a holding member 1410 makes contact only with the vertices of the cross section of the light condensing member 1021.

Figure 80:
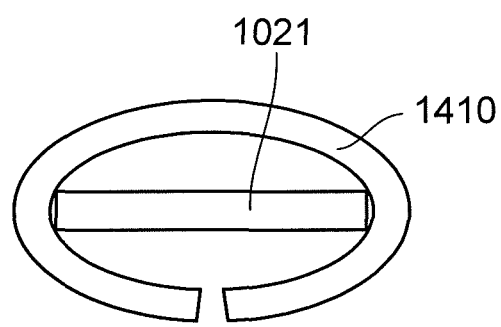
FIG. 80 is a sectional view showing the structure of a light condensing member and a holding member in a twelfth embodiment of the invention.

As shown in FIG. 80, a light condensing unit according to the twelfth embodiment of the invention includes a light condensing member 1021 and a holding member 1410 which holds the light condensing member 1021. The holding member 1410 is formed so as to have a C-shaped cross section in the shape of an ellipse having a part thereof cut out. Thus, spreading the holding member 1410 and inserting the light condensing member 1021 into it results in the inner surface of the holding member 1410 making contact with the vertices (in the diagram, four vertices) of the light condensing member 1021 in its section perpendicular to the light guide direction. Here, the holding member 1410 holds the light condensing member 1021 along lines.

The holding member 1410 covers the side faces of the light condensing member 1021. Moreover, the holding member 1410 is formed so as to have lower hardness than the light condensing member 1021, and is formed of, for example, resin.

In other respects, the structure of the twelfth embodiment is similar to that of the ninth to eleventh embodiments described previously.

In this embodiment, as described above, the holding member 1410 makes contact with a plurality of vertices in the cross section of the light condensing member 1021 perpendicular to the light guide direction. Thus, the holding member 1410 can be brought into line contact with the light condensing member 1021, and this helps reduce the amount of laser light absorbed by the holding member 1410. Moreover, the laser light guided inside the light condensing member 1021 is less likely to reach the vertices of the cross section of the light condensing member 1021. That is, the density of laser light at the vertices of the light condensing member 1021 is lower than the density of laser light elsewhere. This helps further reduce the amount of laser light absorbed by the holding member 1410.

In other respects, the benefits of the twelfth embodiment are similar to those of the eighth to eleventh embodiments described previously.

It should be understood that the eighth to twelfth embodiments presented above are in every respect only illustrative and not restrictive. The scope of the present invention is defined not by the description of the eighth to twelfth embodiments presented above but by the appended claims, and encompasses all variations and modifications made within the spirit and scope equivalent to the claims.

For example, although the eighth to twelfth embodiments presented above deal with examples where a light emitting apparatus according to the invention is used as a headlamp of an automobile, this is not meant to be any limitation. A light emitting apparatus according to the invention may be used as a headlamp of an airplane, ship, robot, motorcycle, bicycle, or any other mobile body.

Although the eighth to twelfth embodiments presented above deal with examples where a light emitting apparatus according to the invention is applied to a headlamp, this is not meant to be any limitation. A light emitting apparatus according to the invention may be applied to a downlight, spotlight, or any other type of light projection apparatus.

Although the eighth to twelfth embodiments presented above deal with examples where the exciting light is converted into visible light, this is not meant to be any limitation; the exciting light may instead be converted into any light other than visible light. For example, a design that converts the exciting light into infrared light finds application in, for example, night vision illumination apparatus for surveillance CCD cameras.

Although the eighth to twelfth embodiments presented above deal with examples where the exciting light source (semiconductor laser element) and the fluorescent member are designed to emit white light, this is not meant to be any limitation. The exciting light source and the fluorescent member may be designed to emit light other than white light.

Although the eighth to twelfth embodiments presented above deal with examples where the fluorescent member is disposed near the tip end of the light condensing member and is excited to obtain a point light source, this is not meant to be any limitation; the fluorescent member does not necessarily have to be disposed near the tip end of the light condensing member. In that case, for example, the light emitting apparatus may be used as a light source for melting a soldering material placed near the tip end of the light condensing member. Light of a wavelength of 405 nm is suitable for melting Au, and thus allows easy laser welding. For another example, the light emitting apparatus may be used as an exposing light source for exposing a photosensitive material placed near the tip end of the light condensing member. This helps greatly shorten the exposure time of the photosensitive material. For yet another example, the light emitting apparatus may be used as a light source in an ultraviolet microscope for inspection of the shapes of objects under ultraviolet light.

Although the eighth to twelfth embodiments presented above deal with examples where a semiconductor laser element is used as a laser generator for emitting laser light, this is not meant to be any limitation; any laser generator other than a semiconductor laser element may instead be used.

All specific values mentioned above in connection with the eighth to twelfth embodiments presented above are merely examples, and are not meant to be any limitation.

In the eighth to twelfth embodiments presented above, the center wavelength of the laser light emitted by the semiconductor laser element, and the kind of phosphor used in the fluorescent member, may be changed as desired. For example, in cases where laser light can be used safely as illumination light, it is possible to use a semiconductor laser element that emits blue laser light with a center wavelength of about 450 nm in combination with a phosphor that converts part of the blue laser light into yellow light in order to obtain white light. In that case, no filter member for shielding the exciting light needs to be provided. One example of the phosphor that converts part of blue laser light into yellow light is $(Y_{1-x-y}Gd_xCe_y)_3Al_5O_{12}$ ($0.1 \leq x \leq 0.55$, $0.01 \leq y \leq 0.4$). This is not meant to be any limitation; the center wavelength of the laser light emitted by the semiconductor laser element may be selected as desired within the spectrum ranging from ultraviolet to visible light.

Although the eighth to twelfth embodiments presented above deal with examples where the light emanating from the irradiated face of the fluorescent member is used as illumination light, this is not meant to be any limitation; the light emanating from the rear face (the face opposite from the irradiated face) or a side face of the fluorescent member may be used as illumination light.

Although the eighth to twelfth embodiments presented above deal with examples where the reflecting face of the reflecting member is formed as part of a paraboloid, this is not meant to be any limitation; the reflecting face may instead be formed as part of an ellipsoid. In that case, disposing the fluorescent member at the focus of the reflecting face makes it easy to condense the light emitted from the light emitting apparatus. The reflecting face may even be formed as a multiple reflector composed of a number of curved surfaces (such as paraboloids), or as a free-form curved-surface reflector composed of a number of minuscule flat surfaces provided contiguously.

Although the eighth to twelfth embodiments presented above deal with examples where a plurality of semiconductor laser elements are used as an exciting light source, this is not meant to be any limitation. A single semiconductor laser element may instead be used as an exciting light source. Or a so-called semiconductor laser array provided with a plurality of light emitting portions may be used as an exciting light source.

Figure 81:
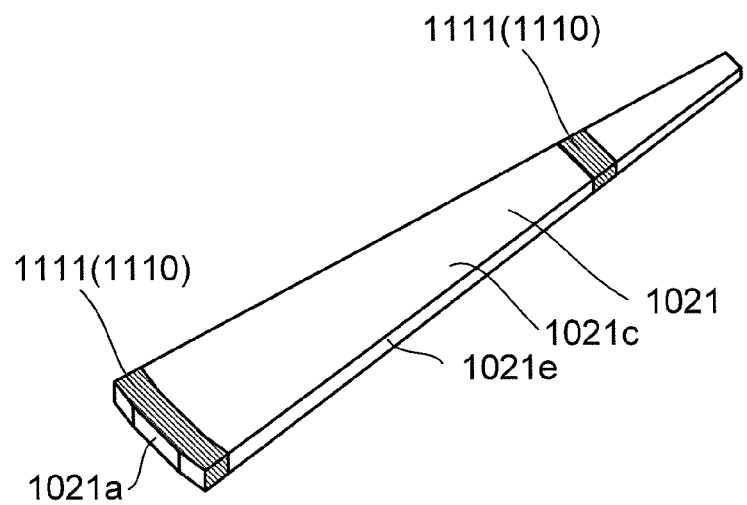
FIG. 81 is a perspective view illustrating a holding member in a sixth modified example of the invention.

Although, for example, the ninth embodiment presented above deals with an example where metal belts are provided in a light entrance face side end part and a light exit face side end part of a light condensing member, this is not meant to be any limitation. For example, as in a holding member 1110 according to a sixth modified example of the invention shown in FIG. 81, it is possible to provide metal belts 1111, on the light entrance face 1021a side, in an end part of the light condensing member 1021 and, on the light exit face 1021b side, away from the end part (the light exit face 1021b). In FIG. 81, hatching indicates the metal belts 1111. The closer to the light exit face 1021b, the higher the density of laser light inside the light condensing member 1021. Thus, disposing a metal belt 1111 away from the light exit face 1021b permits the metal belt 1111 to hold a part where the light density is lower. This helps reduce loss of laser light. The same applies equally to the tenth to twelfth embodiments presented above.

For another example, a metal belt 1111 may be provided only in a light entrance face 1021a side part, or only in a light exit face 1021b side part, of the light condensing member 1021. The light condensing member 1021 is bulkier and heavier in its light entrance face 1021a side part than in its light exit face 1021b side part; therefore, holding the light entrance face 1021a side part allows more stable holding of the light condensing member 1021. Moreover, less laser light reaches the side faces in the light entrance face 1021a side part of the light condensing member 1021 than in its light exit face 1021b side part. Thus, holding the light entrance face 1021a side part helps further reduce the amount of laser light absorbed by the metal belts 1111.

Figure 82:
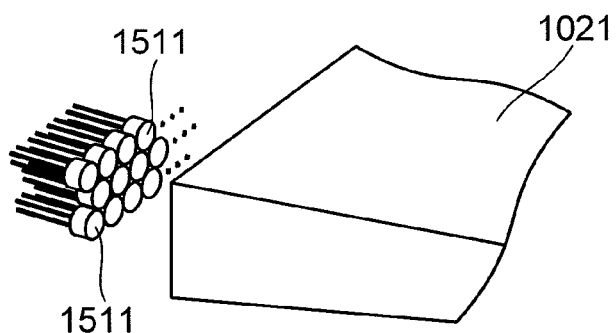
FIG. 82 is a perspective view showing the structure of a light emitting apparatus in a seventh modified example of the invention.
Figure 83:
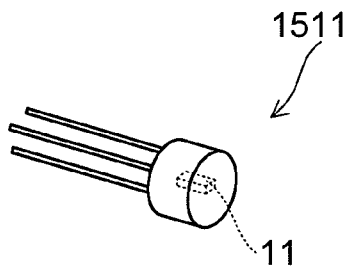
FIG. 83 is a perspective view showing the structure of a miniature package in a light emitting apparatus in the seventh modified example of the invention.

Although the eighth to twelfth embodiments presented above deal with examples where semiconductor laser elements 11 are arranged in a row, this is not meant to be any limitation; for example, a light emitting apparatus may be designed like one according to a seventh modified example of the invention shown in FIG. 82. Specifically, semiconductor laser elements 11 (see FIG. 83) in miniature packages 1511 may be arranged in a closest-packed fashion in two or three tiers (in FIG. 82, three tiers).

Figure 84:
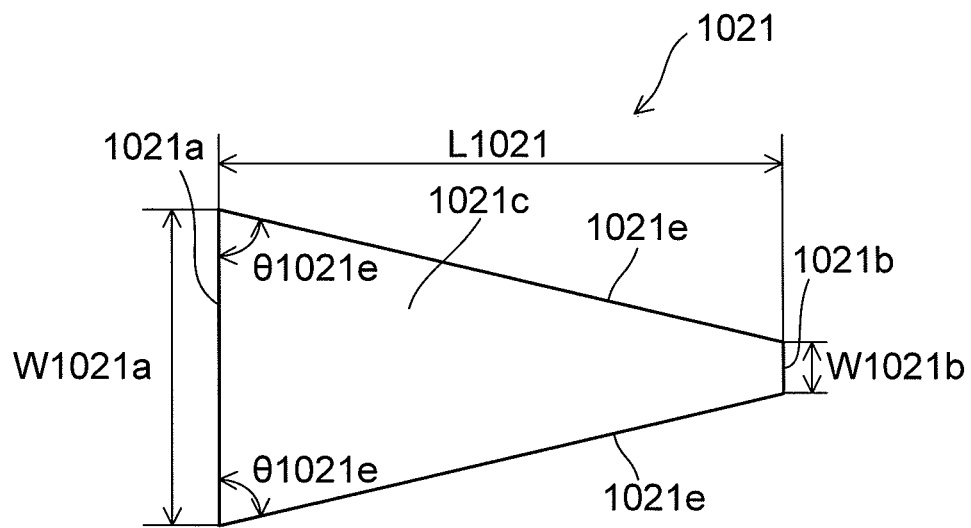
FIG. 84 is a top view showing the structure of a light condensing member in an eighth modified example of the invention.
Figure 85:
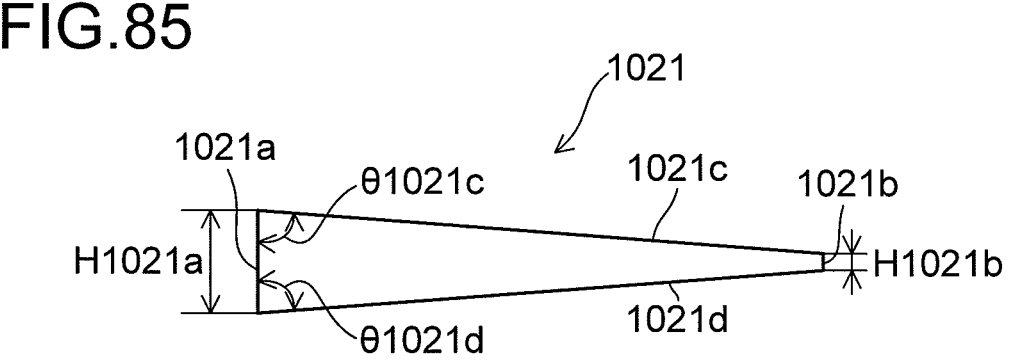
FIG. 85 is a side view showing the structure of a light condensing member in the eighth modified example of the invention.

The shape of the light condensing member is not limited to those in the eighth to twelfth embodiments presented above, but may instead be as in a light condensing member 1021 in an eighth modified example of the invention as shown in FIGS. 84 to 86. Specifically, in a case where the light condensing member 1021 is formed of BK7, the relevant dimensions may be as follows: the height (H1021a) of the light entrance face 1021a, about 3 mm; the width (W1021a) of the light entrance face 1021a, about 10 mm; the height (H1021b) of the light exit face 1021b, about 2 mm; the width (W1021b) of the light exit face 1021b, about 2 mm; the length (L1021) of the top face 1021c, the bottom face 1021d, and the side end faces 1021e, about 50 mm; the angle (θ1021c and θ1021d) of the top face 1021c and the bottom face 1021d with respect to the light entrance face 1021a, about 88.9 degrees; the angle (θ1021e) of the side end faces 1021e with respect to the light entrance face 1021a, about 80.9 degrees. In a case where the light condensing member 1021 is formed of artificial quart, the relevant dimensions may be as follows: the height (H1021a) of the light entrance face 1021a, about 6 mm; the width (W1021a) of the light entrance face 1021a, about 24 mm; the height (H1021b) of the light exit face 1021b, about 3 mm; the width (W1021b) of the light exit face 1021b, about 3 mm; the length (L1021) of the top face 1021c, the bottom face 1021d, and the side end faces 1021e, about 120 mm; the angle (θ1021c and θ1021d) of the top face 1021c and the bottom face 1021d with respect to the light entrance face 1021a, about 88.6 degrees; the angle (θ1021e) of the side end faces 1021e with respect to the light entrance face 1021a, about 80.1 degrees. Depending on the material used, the refractive index of the light condensing member 1021 varies, and accordingly the shape (dimensions) of the light condensing member 1021 that efficiently guides light vary.

Figure 87:
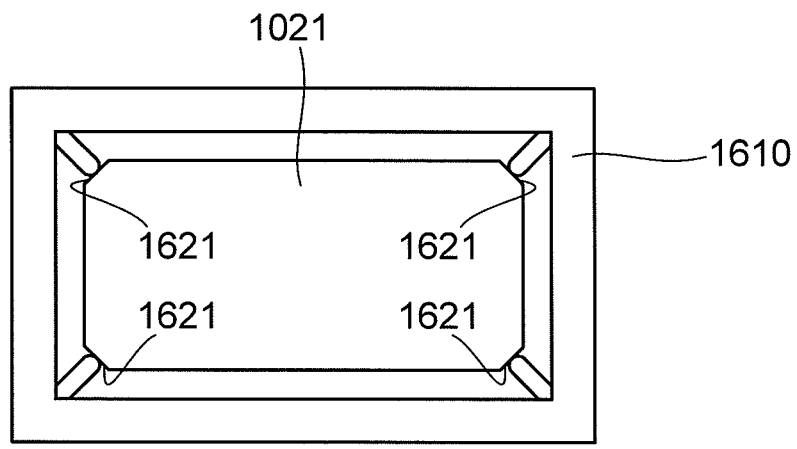
FIG. 87 is a sectional view showing the structure of a light condensing unit in a ninth modified example of the invention.

In a case where the light condensing member is chamfered at edges, for example as in a light condensing unit according to a ninth modified example of the invention shown in FIG. 87, the chamfered faces of the light condensing member 1021 may be held by a holding member 1610. Specifically, when the light condensing member 1021 is chamfered at the four corners, its cross section perpendicular to the light guide direction has an octagonal (polygonal) shape with eight sides and is line-symmetric both in the up-down and left-right directions. Here, the four sides (chamfered faces) 1621 at the corners are the shortest sides. These four sides 1621 are inclined, for example, at 45 degrees with respect to the side faces. The holding member 1610 holds the light condensing member 1021 by making contact with at least one of the four sides 1621. For stable holding of the light condensing member 1021, it is preferable that the holding member 1610 hold two or more of the sides 1621, and more preferably all the four sides 1621. Holding the chamfered faces of the light condensing member 1021 with the holding member 1610 in this way makes it easy to hold the light condensing member 1021 stably. The holding member 1610 may hold the light condensing member 1021 along lines in the directions in which the sides 1621 extend (the direction approximately perpendicular to the plane of paper), or may be arranged at predetermined intervals in the direction in which the sides 1621 extend and hold the light condensing member 1021 at points. Needless to say, by use of the holding member 1410 of the twelfth embodiment presented above, the light condensing member 1021 in FIG. 87 may be held at a plurality of vertices.

Figure 88:
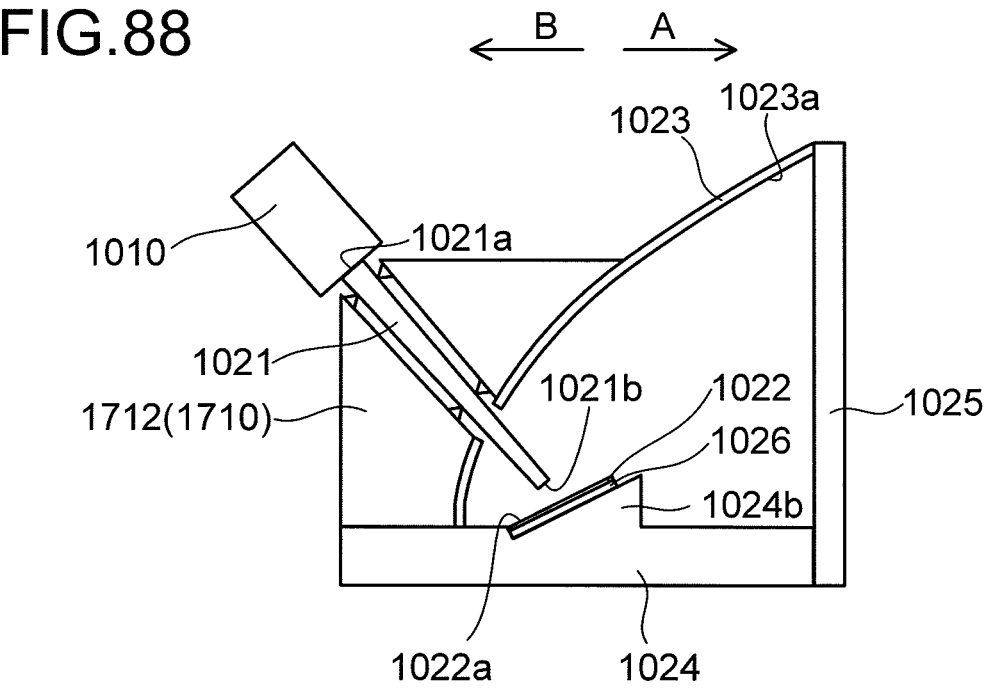
FIG. 88 is a sectional view showing the structure of a light emitting apparatus in a tenth modified example of the invention.

Although, for example, the tenth embodiment presented above deals with an example where the body portion 1212 of the holding member 1210 is provided so as to cover the light condensing member 1021 up to a tip-end part thereof (a part thereof near the light exit face 1021b), this is not meant to be any limitation. For example, as in a light emitting apparatus according to a tenth modified example of the invention shown in FIG. 88, the tip-end part of the light condensing member 1021 may protrude from a body portion 1712 of a holding member 1710. With this design, when the holding member 1710 is incorporated in the light emitting apparatus 1001 of the eighth embodiment presented above, the holding member 1710 can be disposed outside the reflecting member 1023. This helps prevent the light emanating from the fluorescent member 1022 from being shielded by the holding member 1710, and thus helps further reduce loss of light. The holding member 1710 may be fixed to the reflecting member 1023 or the fitting member 1024. The same is true with the ninth, eleventh, and twelfth embodiments presented above.

The invention encompasses in its technical scope any designs obtained by appropriately combining together features from different ones of the embodiments and modified examples presented above.

What is claimed is:

1. A light projection apparatus, comprising:
   a fluorescent member which is excited with exciting light; and
   a light projecting member which reflects or transmits light emanating from the fluorescent member to project the light outside, wherein
   the fluorescent member includes an irradiated face, and
   the irradiated face includes an irradiated region which is irradiated with the exciting light such that a length of the irradiated region in a first direction is greater than a length of the irradiated region in a second direction perpendicular to the first direction and parallel to the irradiated face of the fluorescent member.

2. The light projection apparatus according to claim 1, further comprising a light condensing member which includes a light entrance face through which the exciting light enters and a light exit face that has a smaller area than the light entrance face and through which the exciting light exits, wherein
   a length of the light exit face in the first direction is greater than a length of the light exit face in the second direction.

3. The light projection apparatus according to claim 1, wherein
   the irradiated region has a rectangular, elliptical, or elongate hexagonal shape.

4. The light projection apparatus according to claim 1, wherein
   the light projecting member includes a reflecting member which reflects the light emanating from the fluorescent member to project the light outside.

5. The light projection apparatus according to claim 1, wherein
   the exciting light includes laser light.

* * * * *